(12) United States Patent
Nakamura et al.

(10) Patent No.: US 6,215,914 B1
(45) Date of Patent: Apr. 10, 2001

(54) PICTURE PROCESSING APPARATUS

(75) Inventors: Yasuhisa Nakamura, Joyo; Yoshihiro Kitamura, Osaka; Hiroshi Akagi, Nara; Masashi Hirosawa, Tenri; Kazuyuki Nako, Tenri; Mituaki Nakamura, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/103,877

(22) Filed: Jun. 24, 1998

(30) Foreign Application Priority Data

Jun. 24, 1997 (JP) .................................................. 9-167746
Sep. 25, 1997 (JP) .................................................. 9-260407

(51) Int. Cl.⁷ .............................. G06K 9/00; G06K 9/36; G06K 9/40; H04N 9/74; H04N 1/387
(52) U.S. Cl. ................ 382/284; 382/167; 382/254; 382/255; 382/274; 382/275; 348/584; 348/598; 358/450
(58) Field of Search ................ 382/181, 190, 382/282, 284, 167, 275, 254, 255, 274; 348/584, 598; 358/450

(56) References Cited

U.S. PATENT DOCUMENTS

| 5,465,163 | 11/1995 | Yoshihara et al. | 358/444 |
| 5,625,720 | * 4/1997 | Miyaza et al. | 382/284 |
| 5,757,980 | * 5/1998 | Sugiura | 382/284 |
| 5,768,439 | * 6/1998 | Suzuka | 382/254 |
| 5,920,657 | * 7/1999 | Bender et al. | 382/284 |
| 5,974,198 | * 10/1999 | Hamburg et al. | 382/284 |
| 5,982,951 | * 11/1999 | Katayama et al. | 382/284 |
| 5,991,444 | * 11/1999 | Burt et al. | 382/232 |
| 6,005,987 | * 12/1999 | Nakamura et al. | 382/294 |

FOREIGN PATENT DOCUMENTS

| 63-64180 | 3/1988 | (JP) . |
| 4-314263 | 11/1992 | (JP) . |
| 5-3538 | 1/1993 | (JP) . |
| 5-260264 | 10/1993 | (JP) . |
| 5-342344 | 12/1993 | (JP) . |
| 6-181518 | 6/1994 | (JP) . |
| 6-261333 | 9/1994 | (JP) . |
| 6-301775 | 10/1994 | (JP) . |

\* cited by examiner

*Primary Examiner*—Phuoc Tran
*Assistant Examiner*—Daniel G. Mariam
(74) *Attorney, Agent, or Firm*—David G. Conlin; Peter J. Manus; Dike, Bronstein, Roberts & Cushman, LLP

(57) ABSTRACT

A picture processing apparatus which can reduce matching errors and shorten a processing time for matching. In the picture processing apparatus, a binarization circuit individually binarizes a pair of object picture signals to generate line picture signals. A feature point extract circuit extracts a plurality of feature point pixels for each reference area in the reference side line picture. A transforming circuit widens a line width of the search side line picture. A correlation computation circuit, for each reference area, finds a correlation between each pixel within a search area in the line picture whose line width has been widened and the feature point pixels. A composition processing section composites the pair of object picture signals based on the correlations. A picture processing apparatus which can adjust density and color tone of two pictures to be composited. At first, the picture processing apparatus finds overlapping areas of the two pictures to be processed and finds typical values typifying distributions of density values of pixels in the overlapping area of each picture, respectively. Next, it adjusts overall lightness of the two pictures by multiplying the density value of each pixel of one picture by a ratio of the typical value of the other picture to the typical value of one picture.

16 Claims, 33 Drawing Sheets

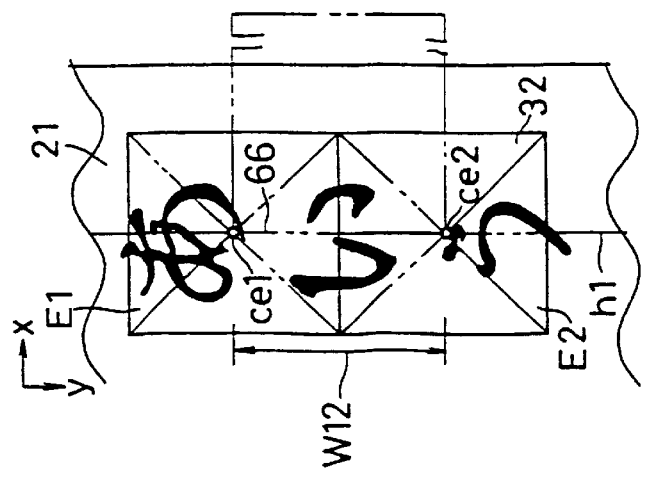
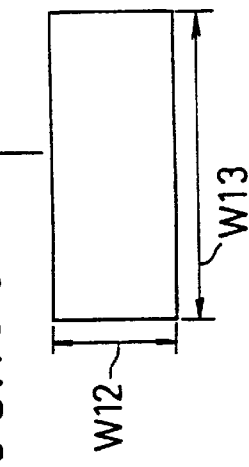

81  87

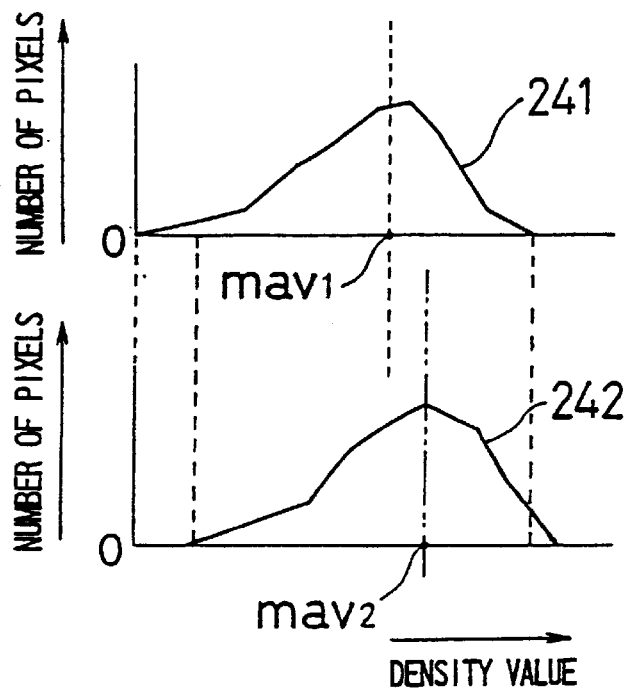
FIG. 30A
FIG. 30B
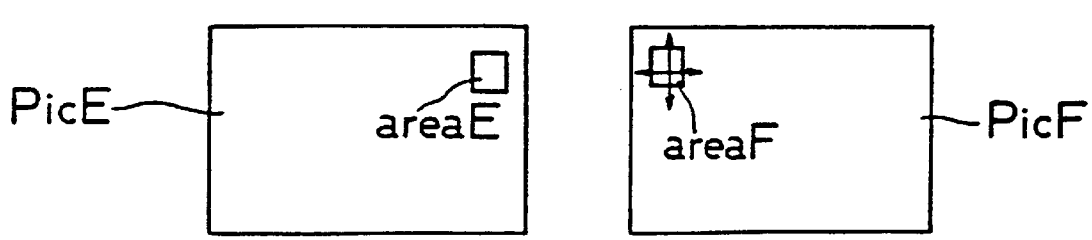
FIG. 31

*FIG. 34*
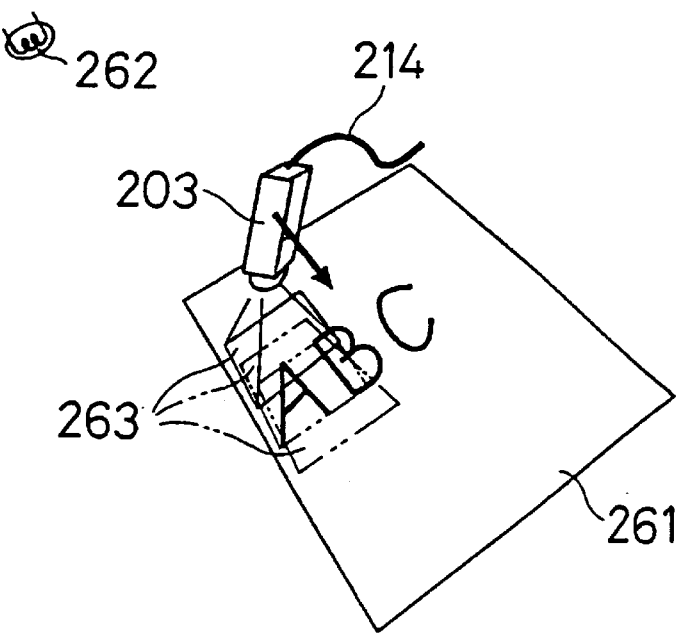
*FIG. 35A*   *FIG. 35B*
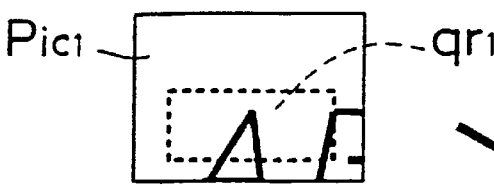
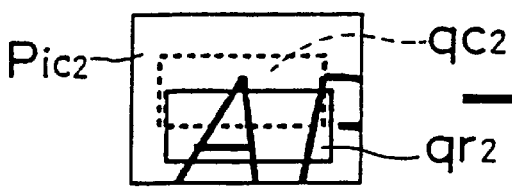
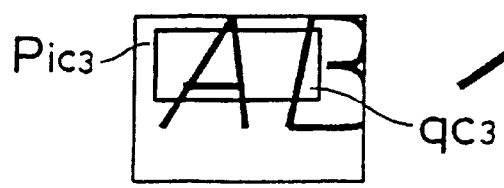
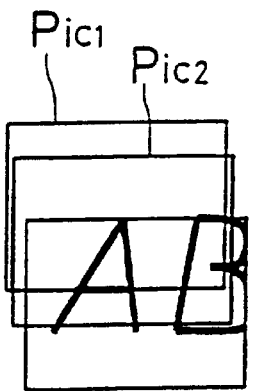

FIG. 43A
PRIOR ART
FIG. 43B
PRIOR ART
FIG. 43C
PRIOR ART
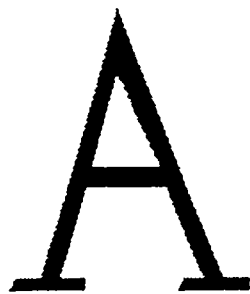 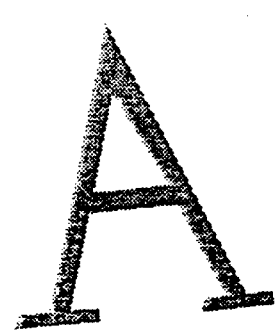 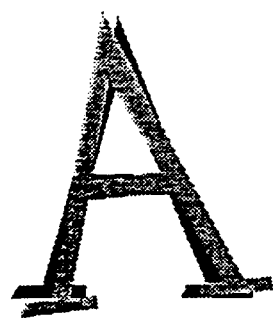
FIG. 44A
PRIOR ART
FIG. 44B
PRIOR ART
FIG. 44C
PRIOR ART
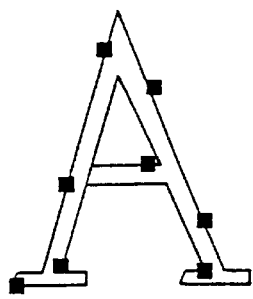 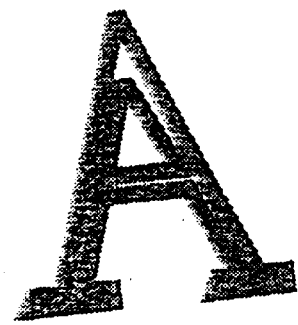 

PICTURE PROCESSING APPARATUS

BACKGROUND OF THE INVENTION

1. Field of the Invention

The present invention relates to a picture processing apparatus aiming at processing a plurality of pictures. In particular, the invention relates to a picture processing apparatus for detecting a mismatch of images within two pictures as well as to a picture processing apparatus for obtaining a composite picture high resolution or a picture of wide angle/wide range having a greater number of pixels than a picture obtained by an image pickup device by one time of image pickup operation. The invention also relates to a picture processing apparatus for compensating a density value of pixels of each picture so that the overall lightness of two or more pictures is equalized, and for correctly compensating color tone of the composite picture.

2. Description of Related Art

A picture processing apparatus used as a so-called scanner is provided with a one-dimensional image pickup device like a CCD line sensor in which a plurality of photo-receiving areas are arrayed in a row. This picture processing apparatus produces an output picture, by picking up images of a subject at a plurality of positions while moving the image pickup device with respect to the subject in a direction orthogonal to a direction in which the photo-receiving areas are arrayed on a two-dimensional plane. The apparatus then composites the pictures obtained by the respective image pickup operations such that they are arrayed on the two-dimensional plane in a relationship of a position identical to a position of the image pickup device in picking up each image, to produce a single output picture. As compared to a picture obtained directly by the image pickup device, though the number of pixels arrayed in the same direction as a moving direction of the image pickup device increases in the picture obtained by this apparatus, the number of pixels in a direction orthogonal to the moving direction is no different. As a method for increasing the number of pixels of the picture in the above-mentioned orthogonal direction, there has been a method of compositing the plurality of above-mentioned output pictures by arraying along the orthogonal direction.

As a first prior art technology using the above-mentioned method, there may be cited a method disclosed in Japanese Unexamined Patent Publication JP-A 63-64180 (1988). According to an apparatus using the picture image compositing method disclosed in this publication, a one-dimensional image pickup device is provided within a manually movable hand scanner. According to this method, at first, an original picture to be input is divided into areas of a size readable by one time of scan by using the hand scanner, and a picture of each area is obtained by picking up its image by moving the hand scanner along a center axial line of the areas with the scanner contacted on the surface of the original picture. The picture of each area is equivalent to the output picture of the above-mentioned apparatus using the one-dimensional image pickup device and each image has an overlapping area where the same part of the original picture has been read. Next, the overlapping areas of the respective areas are matched by way of the template matching method to find a positional mismatch of the images having the same shape and the same distribution of brightness between the respective images. Finally, based on the positional mismatch of the images, each picture is moved in parallel and superimposed so that those images overlap to obtain a composite picture image.

In this picture image compositing method, since an operator of the apparatus manually moves the hand scanner containing the image pickup device, an unintentional movement of the hands of the operator may be applied to the hand scanner when the scanner is moved. A relative position between the image pickup device within the hand scanner and the center axial line of the above-mentioned areas of the original picture to be input may also incline for the same reason. Further, a pair of rollers are provided within a part of the hand scanner where it contacts with the original picture so that the hand scanner moves smoothly on the surface of the original picture, and the moving speed of the hand scanner may differ between parts thereof near one roller and near the other roller, when the smoothness of the pair of rollers is different from each other. When these things happen, a distortion of an image including a mismatch of the image in a direction different from a direction of the parallel movement and a partial compression of the image occurs within the pictures. Because the images of the subject in the plurality of pictures having such a distortion are not smoothly joined just by horizontally moving the pictures, the image distorts in the composited picture.

In order to compensate this mismatch, the applicant of the present invention has proposed, in Japanese Unexamined Patent Publication JP-A 5-260264 (1993), a technology for obtaining an output picture composed of a more number of pixels than a number of photo-receiving areas of an image pickup device by using a two-dimensional image pickup device in which photo-receiving areas are arrayed in a matrix. This technology will be explained below as a second prior art technology. According to a picture processing apparatus disclosed in this publication, an operator holds means for inputting an image, i.e. a so-called CCD imaging apparatus, and shoots a subject while horizontally moving the imaging apparatus at a position distant from the subject by a predetermined distance to obtain a plurality of pictures. A processing circuit within the above-mentioned picture processing apparatus matches a new picture with a composite picture by way of, e.g., the block matching method every time when the new picture is obtained to find a positional mismatch of the same image within both the pictures. Next, based on this mismatch, the new picture is transformed and the transformed image is finally composited with the composite picture to obtain a new composite picture.

Because the image inputting means of this picture processing apparatus is supported only by the hands of the operator of the apparatus and is held in air, a relative position between the subject and the image pickup device is liable to shift. Due to that, a distortion of the image including a mismatch of the image in a direction other than a direction in which the image inputting means is moved horizontally, an inclination of the image and a different magnification factor, occurs between the images in the two pictures to be composited. Although the picture processing apparatus composites the pictures while compensating this distortion of the image when compositing, all distortions may not be compensated and some distortion remain due to, e.g., a matching error and a compensation error which will be described later. Further, arithmetic processing for this compensation is complicated and a processing amount of the compensation increases.

As a third prior art technology, there may be cited a technology disclosed in Japanese Unexamined Patent Publication JP-A 4-314263 (1992). A picture processing apparatus disclosed in this publication first extracts features such as an edge of an image from data sets of a plurality of pictures to be composited which have been input from a scanner. Then, it obtains a composite picture by generating address information for joining the picture data sets based on the features and by joining the plurality of data sets at positions specified by the address information.

The applicant of the present invention has also proposed a technology for automatically compositing and copying images such as maps printed across a plurality of pages in Japanese Unexamined Patent Publication JP-A 6-181518 (1994). This technology will be explained below as a fourth prior art technology. According to a picture processing apparatus of the disclosure, a predefined symbol is previously marked at a part of a plurality of originals to be read containing an overlapping image. Then, a plurality of original data sets are created at first by reading those originals individually by a CCD sensor constituting a reading section of a copying machine. Next, a combination for joining the respective original data sets and joints within the original data sets are recognized by extracting the above-mentioned symbol by retrieving an outer peripheral part of each original data set. Finally, they are composited by rearranging the original data sets of the recognized combination so that the joints face to each other and by aligning them so that the images at the joints coincide.

In addition to the picture processing apparatus described in JP-A 4-314263, U.S. Pat. No. 5,465,163, i.e. a fifth prior art technology, has disclosed a picture processing apparatus which performs the following process. When a size of an original is larger than a size readable at one time by the picture processing apparatus, a plurality of picture areas which overlap each other are set on the original and a scanner of the picture processing apparatus reads the respective picture areas. Patterns of a plurality of picture data sets to be composited obtained as a result are then matched and based on address information obtained as a result, the plurality of picture data sets are joined.

U.S. Pat. No. 5,465,163 has also disclosed a picture processing apparatus which performs the following process. When the size of the original is larger than the readable size, an operator puts marks at the original with a color marker in advance. Then, a plurality of picture areas each containing the above-mentioned mark are created on the original and the scanner reads the respective picture areas. Further, when a plurality of originals which overlap partially from each other are to be read, the operator puts marks at the above-mentioned part in each original with the color marker and then the scanner reads the plurality of originals. Patterns of the marks respectively imaged on the pictures represented by the plurality of picture data sets to be composited obtained as a result are matched and based on address information obtained as a result, the plurality of picture data sets are joined.

Because a scanner and a reading section of a copying machine are used as a reading device in the third through fifth prior art picture processing apparatuses, and the subject and the reading device are fixed respectively at predetermined positions, so that the positional relationship between both the is always kept constant. Accordingly, the above-mentioned imaginal distortion which is otherwise caused by the mismatch of the positional relationship barely occurs in the picture data set and the original data set. Therefore, no means for correcting the imaginal distortion is provided in the above-mentioned picture processing apparatuses. Accordingly, the imaginal distortion may remain in the composited picture when the pictures obtained by the same method as the first and second prior art technologies are composited by the same method as the third and fourth prior art technologies.

By the way, the first and second prior art picture processing apparatuses find the imaginal mismatch by way of pattern matching. In the pattern matching method, an operation of superimposing a pair of pictures to calculate a correlation between the pair of pictures at that time is repeated by a plurality of times while the position where they are superimposed is changed and a positional mismatch of the pictures when the pictures are superimposed when the correlation is maximum is detected as an imaginal mismatch. This pattern matching method includes a typical point matching method and a block matching method.

The typical point matching method is a method that a plurality of pixels discretely arrayed and at predefined positions among pixels of one picture of a pair of pictures are set as typical points in advance, differences of brightness between each typical point and a pixel of the other picture overlapping with that typical point are cumulatively added, and its sum is obtained as a value representing the correlation. However, a difference of magnitude of the correlation cannot be obtained by the typical point matching method when the brightness of the plurality of pixels where the respective typical points are overlapped one by one does not change when the position for superimposing the pair of pictures is moved because the value representing the correlation does not change. Accordingly, when a monochromic picture like a document picture is to be processed, it becomes difficult to precisely detect an imaginal mismatch because the change in brightness is small at all of the typical points and it becomes hard to detect the position where the correlation is maximum.

The pattern matching method is a method that a reference area having a predefined size is set within one picture of a pair of pictures and a difference of brightness between each pixel within the reference area and a pixel in the other picture which overlaps with that pixel are cumulatively added when the pair of pictures are superimposed to obtain its sum as a value representing the correlation. When an image whose shape and whose distribution of brightness are equal to those of the image within the reference area is contained in the other picture, the sum turns out to be zero and the correlation is assumed to be maximum when the pair of pictures are superimposed so that the images overlap.

When the pair of pictures are pictures obtained by the methods described in the first and second prior art technologies at this time, the shape and distribution of brightness of the images representing the same subject are different in the pair of pictures due to the aforementioned imaginal distortion. Suppose that an image "A" in FIG. 43A is contained in one picture and an image "A" in FIG. 43B is contained in the other picture for example. Although both the images represent the same character "A", their shape and brightness are different. Even if the pair of pictures are superimposed so that their centers coincide and the images almost overlap, there arise parts which do not overlap each other within the pictures. Because values of brightness of overlapping pixels do not coincide in these parts, the aforementioned sum obtained at this position may be greater than a sum obtained at position other than the above-mentioned position. Accordingly, it becomes difficult to detect the imaginal mismatch by the magnitude of the sums and hence to superimpose the pair of pictures reliably in compositing them.

The block matching method is a method that a difference of brightness between all pixels in the reference area and pixels in the other picture overlapping with each pixel in the reference area is found per pixel to find its sum. Therefore, because there are a large number of pixels whose difference of brightness is to be found in one time of computation of the correlation, it requires an extremely large amount of processing for obtaining the imaginal mismatch and hence takes much time for the arithmetic processing. For instance, when the mismatch of the pair of pictures is to be detected to detect the unintentional movement of the hand by using the block matching method, it is necessary to increase a processing speed of an arithmetic processing circuit for performing the block matching to the extreme.

Further, as another matching method, there is a method that a plurality of feature points within one picture are extracted in advance, a correlation between the feature point and a point within the other picture is found per feature point, and a mismatch is detected by a difference of magnitude of the sum of the correlation. Such a matching method will be referred to as a feature point matching method hereinafter. For instance, an edge of the image shown in FIG. 43A is extracted and a plurality of feature points are extracted from among points on the edge as shown in FIG. 44A. In FIG. 44A, a thin line represents the edge of the image and black square marks represent the feature points. When a mismatch between the image of FIG. 43A and the image of FIG. 44B is to be found by the feature point matching method, the image of FIG. 44B and the feature points of FIG. 44A are overlapped to individually find the correlation between each feature point and a point overlapping with the feature point within the image of FIG. 44B. The correlation is maximized when all of the overlapping points are the points on the edge of the image of FIG. 44B.

When the pair of pictures have the imaginal distortion due to the above-mentioned reason in this case, the shape of the edge of the images within the pair of pictures are not congruent. Therefore, even when the pair of pictures are superimposed so that one feature point overlaps with a point corresponding to that feature point within the edge of the image, other feature points do not overlap with points corresponding to that feature points. The corresponding point is a point representing the same part as the part of the subject represented by the feature point in the image within the other picture among the images representing the same subject as the subject represented by the image of one picture within the other picture.

Accordingly, the correlation in this state may be smaller than the correlation in a state that the pair of pictures are superimposed as described above when the images are congruent and may not be maximized among a plurality of correlations found by changing the superimposing state one by one. Therefore, when the mismatch is found based on this correlation, an error of the mismatch may increase because the correlation in a state that the images do not overlap at all is maximized and the mismatch of the pictures at that time is detected as an imaginal mismatch. That is, the precision of the matching drops. Those are the problematic points caused by the imaginal mismatch of the plurality of pictures in compositing them.

Further, the prior art picture processing apparatus finds an overlapping area where a pair of pictures overlap each other at first for compositing both the pictures represented by picture signals. It then composites the picture signals each representing each picture so that the pair of pictures are arranged so that the overlapping areas overlap to generate a picture signal representing a composite picture.

In order to obtain the pair of pictures, one imaging apparatus comprising a CCD image sensor and an AGC (Auto Gain Control) circuit for example is used and a subject is shot twice in succession. Because the AGC circuit automatically changes a gain of the CCD image sensor corresponding to shooting conditions such as brightness around the subject at this time, overall lightness of each picture, i.e. density and tone of each picture, may differ from each other. This happens remarkably when the shooting is performed under a light source such as a fluorescent lamp whose brightness changes continuously. The whole lightness of each picture may also differ from each other due to characteristic differences of image pickup devices of respective imaging apparatuss when the pair of pictures are to be obtained by shooting the subject with the plurality of imaging apparatuss at the same time.

When such pair of pictures are composited, density of pixels in the composite picture may change sharply at the part according to the joint of both the pictures in the composite picture and thereby a boarder line of the density and tone may appear within the composite picture. Then, in order to smooth the changes of density of pixels within the composite picture, a gradation process, for example, is implemented in compositing picture signals. In deciding the density of each pixel in the composite picture by the gradation process, a ratio of each picture contributing to the decision of the density is changed stepwise or continuously corresponding to a distance between the part corresponding to the joint within the composite picture and the pixel to be processed. The gradation process can be used when a difference of the overall lightness between both the pictures is small, and the change of density of the composite picture is hardly smoothed when this difference is large even when the gradation process is used.

There are also methods of adjusting the overall lightness of a pair of pictures before compositing picture signals in order to smoothly change the density of pixels of the composite picture. As the density compensating methods for adjusting the overall lightness of the pair of pictures, there have been known methods of histogram coincidence and linear density transformation.

The histogram coincidence method is a method that a histogram of values of density of pixels in an overlapping area of each picture is respectively found, and referring to the found histogram, the density of pixels of the whole of each picture is converted so that the histograms of both the overlapping areas coincide. This histogram coincidence method is described in "Handbook on Image Analysis" (University of Tokyo Press, Editorial Supervisors: Mikio Takagi & Yohisa Simoda), pp., 463, 478 and 479.

As a prior art technology using the histogram coincidence method, there may be cited a picture processing method and a picture processing system disclosed in Japanese Unexamined Patent Publication JP-A 5-342344 (1993). According to this picture processing method, a plurality of color components of two color pictures to be pasted, i.e. a plurality of data sets representing their hue, saturation and lightness, are generated at first and then an area common to both the color pictures, i.e. an overlapping area, is designated. Next, a histogram of each color component in the common area is found, a histogram of each color component of one color picture is transformed such that the histogram of each color component of one color picture coincides with a histogram of each color component of the other color picture, and colors of pixels of the color picture are corrected according to the content of the transformation.

Such picture processing method requires to perform a subdivision of a density value, i.e. to distribute a plurality of pixels having the same density or color component each other to a plurality of other values of density or color components, so that the histograms of both the pictures coincide. This subdivision is performed by distributing the plurality of pixels of the same density by random number or by ranking the plurality of pixels of the same density according to an average density value of the plurality of pixels around those pixels to distribute according to that ranking for example. The process of the density compensating method using the histogram coincidence method is complicated because this subdivision has to be performed.

In the linear density transformation method, it is supposed that a linear transformation holds between density of a pair of corresponding pixels in an overlapping area of a pair of pictures, a density value PL each representing the density of all pixels of one picture of the pair of pictures is transformed to a density value PL* based on the following Expression (1). Coefficients a and b in the expression are decided by the method of least square based on the values of density of the above-mentioned plurality of pairs of pixels. This linear density interpolation method is described in "Handbook on Image Analysis" pp., 463 and 464.

$$PL^* = aPL^* + b \quad (1)$$

When the pair of pictures are to be obtained by the above-mentioned imaging apparatus, an image of a subject on the picture image may distort partially due to a lens and other factors of the imaging apparatus. Further, due to an error in finding the overlapping area, the found overlapping area may deviate from an area where the pictures actually overlap. Thereby, the correspondence between the pixels in the overlapping areas may shift. Due to that, it becomes difficult to correctly estimate the coefficients in Expression (1) even when the method of least square is used.

Still more, although the density compensating methods using the histogram coincidence method and the linear density transformation method allow the overall lightness of two or three pictures to be adjusted, it is difficult to adjust the overall lightness of 10 or more pictures for example due to the following reason.

For example, when a plurality of pictures are to be obtained by shooting a subject by plural times while a shooting range of the imaging apparatus is moved, reflection of the surface of or shadow of the subject may enter within the shooting range. When the shooting range is moved so that the positional relationship among the subject, the imaging apparatus and a light source barely changes, a moving speed of the shooting range is greater than a moving speed of position of the reflection and shadow. Due to that, the reflection and shadow are present almost at the same position in each picture. Further, in general, lightness at the peripheral part of the picture may be darkened as compared to that at the center part, due to dispersion of sensitivity of a plurality of photo-receiving areas of the image pickup device and due to shading of the lens and the image pickup device in general.

A position of the overlapping area with respect to an outer frame of one picture of a pair of pictures shifts from a position of the overlapping area with respect to an outer frame of the other picture, according to the moving speed of the shooting range. Due to that, there is a case where the reflection exists in the overlapping area of one picture and the shadow exists in the overlapping area of the other picture. Further, there is a case where the overlapping area of one picture is located at the center of the picture and the overlapping area of the other picture is located at the peripheral part of the picture. When these two problems arise, the distribution of density of the pixels in both the overlapping areas differ even though the same subject is imaged in the overlapping area of both the pictures.

In compensating the overall lightness of a plurality of pictures, the picture processing apparatus selects two pictures having an overlapping area among the plurality of pictures at first and corrects the values of density of pixels of these two pictures by using the above-mentioned density compensating method. Next, it selects one picture of the two corrected pictures and another picture having an overlapping area with that one picture and corrects the lightness so that the overall lightness of the other picture is equalized with the overall lightness of the one picture by using the above-mentioned density compensating method. It further performs the latter compensating process repeatedly to the remaining pictures one by one.

When the plurality of pictures have either one of the above-mentioned two problems at this time, the picture processing apparatus determines that the distribution of values of density of the overlapping area of one picture is different from that of the other picture. It then corrects the density value of the pixels of the other picture to be lighter or darker than the density value of the pixels of one picture even when the overall lightness of the pictures are almost the same. Accordingly, when this correction is repeatedly performed, the effect of the reflection, shadow and shading becomes greater in the pictures corrected later, so that the overall lightness of the other corrected picture is darkened or lightened gradually as compared to the overall lightness of the initially selected picture. Thereby, the overall lightness of the plurality of pictures do not coincide after the correction.

Although the effect of the above-mentioned problem is small when the number of the pictures to be processed is two or three, the more the number of the pictures becomes, the greater the effect of the above-mentioned problem becomes and the mismatch of the overall lightness may be clearly observed even by human eyes when the number of pictures to be processed is around ten. Due to that, when these pictures are composited, a joint appears in the composited picture because the density and tone of the composite picture vary partially.

As one prior art technology concerning to the transformation of values of density for compositing and processing pictures, there may be cited a picture compositing apparatus disclosed in Japanese Unexamined Patent Publication JP-A 5-3538 (1993). This picture compositing apparatus forms a composite picture by optically scanning two pictures to read as a plurality of kinds of color signals and by mixing the respective color signals so that those two pictures overlap within the same area in a digital copying machine and the like. At this time, it performs a compensating process such as correction of density value of the composite picture based on the color signals of one or more color among the color signals of one picture.

Because this compensating process is performed in order not to saturate the density value of pixels of the composite picture and to clarify the picture, its purpose is different from that of the process for compensating the density value in the process for compositing pictures by joining two pictures as described above. Further, while the density value of the two pictures is either cut into a half uniformly or is changed variably in performing the compensating process, it is not described how its correction factor should be defined. Accordingly, it is difficult to adjust the overall lightness of two pictures precisely when the compensating process is performed in the picture compositing process for joining two pictures by using the above-mentioned compensating process.

Further, as another prior art technology concerning the transformation of values of density of pictures, there may be cited a picture processing apparatus disclosed in Japanese Unexamined Patent Publication JP-A 6-301775 (1994). This picture processing apparatus finds a variance of a value of pixel (density value) of each pixel of an input picture to be processed, and finds an average value and a maximum value of those variances. The pixels are binarized based on the variance when the average value is almost equal to the maximum value and the pixels of a picture obtained by removing a background from the input picture are binarized when they are not equal. This picture processing method is performed to favorably and readily binarize the input picture in which lines, shading and density are mixed and the method is different from the density compensating process for adjusting the overall lightness of two pictures. Therefore, it is difficult to adjust the overall lightness of the two pictures by using this picture processing method.

Further, the above-mentioned imaging apparatus may be provided with an AWB (Auto White Balance) circuit of a picture signal detecting system for automatically compensating color tone of the whole picture based only on picture signals. However, it is difficult to correctly correct the tone by the AWB circuit when the color of pixels composing the picture is almost one and the same. In particular, it is difficult to correctly correct the tone of pictures to be composited because only a part of a subject is often imaged on the pictures and the color of the pixels is liable to be one-sided to a specific color because a magnification factor in shooting them is often large as compared to pictures in other uses.

Still more, as a prior art technology using the white balance correction, there may be cited a imaging apparatus disclosed in Japanese Unexamined Patent Publication JP-A 6-261333 (1994). This imaging apparatus obtains a plurality of pictures to be composited by dividing a subject into a plurality of areas and by shooting the respective areas. It then integrates characteristics of a picture signal of each picture and based on an integrated value thereof, corrects the white balance and density value of the picture signal. Because the pictures represented by the respective picture signals are what the respective different area are shot, values of density and color tones of pixels on both the sides of a boarder which corresponds to the joint of the pictures within the composite picture may not coincide when the pictures corrected by the white balance correction are composited. These are the problematic points caused by the difference of the overall lightness among the plurality of pictures in composing the pictures.

SUMMARY OF THE INVENTION

Accordingly, it is an object of the present invention to provide a picture processing apparatus which detects an imaginal mismatch with less error and with less computing amount. Another object of the invention is to provide a picture processing apparatus which allows a picture whose distortion is small and whose resolution is higher than that of an image pickup device or a picture whose distortion is small and whose angle/range is wider than that of the image pickup device to be obtained with less computing amount. A still other object of the invention is to provide a picture processing apparatus which allows a difference of overall lightness among a plurality of pictures to be readily and correctly corrected and which allows color tone of a composite picture obtained by compositing a plurality of pictures to be correctly corrected.

In a first aspect of the invention, a picture processing apparatus comprises:

picture signal storage means for storing reference side and search side picture signals individually representing reference side and search side pictures containing images representing the same subject;

feature point extracting means for reading the reference side picture signal from the picture signal storage means and extracting a plurality of points which are on an edge of the image as feature points from among a plurality of points within the reference side picture;

line picture signal generating means for reading the search side picture signal from the picture signal storage means and extracting an edge of the image from the search side picture to generate a line picture signal representing a line picture containing a line showing the edge of the image;

transforming means for transforming the line picture signal generated by the line picture signal generating means and widening a width of the line showing the edge of the image; and mismatch detecting means for finding individual correlations between the feature points extracted by the feature point extracting means and each of a plurality of points within the line picture represented by the line picture signal transformed by the transforming means, and detecting a mismatch of the images within the reference side and search side pictures based on the correlations.

According to the first aspect of the invention, the picture processing apparatus detects the mismatch of the images within the reference side and search side pictures. This mismatch shows a difference of relative positions of the images representing the same subject with respect to a reference position of each picture in the reference side and search side pictures. Then the reference position is, for example, a point in an outer frame of each picture. This mismatch corresponds to a mismatch between the reference side picture and the search side picture, when they are superimposed so that parts of the images representing the same subject overlap.

At first, the picture processing apparatus extracts the points on the edge of the image as the feature points by the feature point extracting means. These points are, for example, typical points of pixels composing the picture, and may also be points at positions different from the typical points. The edge of an image corresponds to an outline of the image and indicates, for example, a point where a difference of brightness between two adjacent points is large. This edge of an image can be obtained by, for example, processing a picture signal by a sovel filter. It may be also obtained by differentiation of a picture signal. Therefore, the feature points are set on the outline of the image within the reference side picture.

Next, the line picture signal generating means generates the above-mentioned line picture signal. The line picture represented by this line picture signal includes the line showing the edge of the image, so that the line picture turns out to be a picture in which only the outline of the image of the search side picture is described. In the image representing the same subject as the subject represented by the image of the reference side picture, a point representing the same part as the part of the subject represented by the feature point in the image within the reference side picture will be referred to as a corresponding point to that feature point. When the images in the reference side picture and in the search side picture are congruent, this corresponding point overlaps the feature point in a state that the reference side picture and the search side picture are superimposed so that the images coincide. Therefore, since the feature point is a point on the edge of the image in the reference side picture, the corresponding point is also a point on the edge of the image in the search side picture.

In succession, the line picture signal is transformed by the transforming means as described above. The mismatch detecting means finds a correlation by the aforementioned feature point matching method by using the transformed line picture signal, and detects a mismatch based on the correlation. For instance, the correlation between the feature point and the points composing the line is larger than the correlation between the feature point and the remaining points other than the points composing the line. A mismatch of the outer frame in a state where the reference side picture is superimposed on the search side picture when the correlation is maximum corresponds to a mismatch of the images.

As compared to a so-called typical point matching method, the feature point matching method allows the mismatch of the images to be reliably detected due to the following reason. In the typical point matching method, the typical point is set regardless of a change in brightness of an image. For instance, when a correlation is found by the typical point matching method with respect to a pair of pictures in which the change in brightness is small in the background part which is a part other than an edge of an image like a picture in which characters are printed, the typical point is liable to be set in the background part and its corresponding point is also set in the background part, so that almost no change in brightness occurs in the vicinity of the corresponding point. Therefore, the correlation barely changes even when the superimposed state of the pair of pictures is changed. Meanwhile, since the point on the edge of the image is set as the feature point in the feature point matching method, the corresponding point is also located on the edge of the image within the search side picture, and brightness of each point largely changes in the vicinity of the edge of the image more than the background part other than the edge. Accordingly, when the correlation is sequentially found by changing a point for finding the correlation with the feature point from the corresponding point to a point in the vicinity thereof, the change in the correlations becomes fully large for finding the mismatch of the images, differing from the case of finding the same number of correlations by the typical point matching method. Accordingly, the feature point matching method allows the mismatch of the images to be reliably detected.

Further, according to the feature point matching method, one or a plurality of feature points are scattered within the reference side picture to individually find the correlations between each feature point and a point corresponding to that feature point. Since the number of feature points is less than the number of all points within the reference area used in a so-called block matching method, the feature point matching method requires a less amount of operation as compared to the block matching method. Accordingly, since the picture processing apparatus allows the operation amount for detecting the mismatch to be reduced, it allows a calculation time to be shortened and the calculation to be quickened even when an operation circuit having the same operation speed as used in the block matching method is used.

The prior art picture processing apparatus using the feature point matching method finds the correlation between a point in a line picture before transformed which is represented by a line picture signal generated by the line picture generating means and a feature point to detect a mismatch from this correlation. In this case, when the images in the reference side and search side pictures contain a distortion of images due to the reason explained in the description of the prior art, the matching accuracy has dropped due to the reason explained in the description of the prior art.

According to the picture processing apparatus of the invention, the correlation between a point within the line picture after transformed which is represented by the line picture signal transformed by the transforming means and the feature point. In this case, the correlation between a feature point and a corresponding point to that feature point, or the correlation between a feature point and a point which is in the vicinity of the corresponding point and which composes the line within the line picture represented by the transformed line picture signal, becomes maximum. Widening the width of the line corresponds to widening a permissible range in which the point whose correlation with the feature point can be maximum exists within the line picture. That is, it is equivalent to widening the permissible range in which a corresponding point of a feature point can exist.

Thereby, even when the feature point and its corresponding point do not overlap due to the above-mentioned distortion of the images, the correlation is maximized when a distance between a point overlapping the feature point and the corresponding point of that feature point is small within the search side picture, because the overlapping point becomes a point composing the line. Accordingly, when the two images representing the same subject in the reference side picture and in the search side picture are not congruent due to the distortion of the images, the correlation is maximized when they are superimposed such that the overlapping point locates in the vicinity of the corresponding point of that feature point. Therefore, because the correlation increases as long as that overlapping point exists in the vicinity of the corresponding point even when the feature point does not overlap the corresponding point, the correlation in a first state in which the feature point does not overlap the corresponding point only due to the distortion of the images is fully larger than the correlation in a second state in which the images themselves do not overlap.

Accordingly, the mismatch detecting means detects the mismatch of the outer frame in the first case as a mismatch of images. At this time, since the distance between the overlapping point and the corresponding point is small, the reference side picture and the search side picture are superimposed such that the images representing the same subject almost overlap while shifted by a degree of the distortion of the images. Accordingly, an error of the mismatch of the images is small in this state. Thus, the picture processing apparatus according to the first aspect of the invention allows the error of the detected mismatch to be lessened even when the distortion occurs in the images as described above by using the feature point matching method capable of quickening the calculation. Accordingly, it allows the calculation for detecting the mismatch to be quickened and the accuracy of the calculation to be improved. Further, it allows the operation amount for detecting the mismatch to be reduced as well as improves the accuracy of the calculation.

In a second aspect of the invention, a picture processing apparatus comprises:

picture signal storage means for storing reference side and search side picture signals individually representing reference side and search side pictures containing images representing the same subject;

feature point extracting means for reading the reference side picture signal from the picture signal storage means and extracting a plurality of points which are on an edge of the image as feature points from among a plurality of points within the reference side picture;

line picture signal generating means for reading the search side picture signal from the picture signal storage means and extracting an edge of the image from the search side picture to generate a line picture signal representing a line picture containing a line showing the edge of the image;

transforming means for transforming the line picture signal generated by the line picture signal generating means and widening a width of the line showing the edge of the image;

mismatch detecting means for finding individual correlations between the feature points extracted by the feature point extracting means and each of a plurality of points within the line picture represented by the line picture signal transformed by the transforming means, and detecting a mismatch of the images within the reference side and search side pictures based on the correlations; and compositing means for reading the reference side and search side picture signals stored in the picture signal storage means and compositing the signals so as to superimpose the images while partly deforming the reference side and search side pictures so that the mismatch detected by the mismatch detecting means is offset, to generate a composite picture signal representing a single composite picture.

According to the second aspect of the invention, the picture processing apparatus detects the mismatch of the images of the reference side and search side pictures by using the same mismatch detecting method as the picture processing apparatus according to the first aspect of the invention. Thereby, it allows the calculation to be quickened, the operation amount to be reduced and the accuracy for detecting the mismatch to be improved by the same reason as mentioned in the first aspect of the, invention. Based on the mismatch, the compositing means composites the reference side and search side picture signals as described above to generate the composite picture signal. The composite picture represented by this composite picture signal corresponds to the picture obtained by superimposing the reference side picture and the search side picture by shifting the pictures by the degree of the mismatch and transforming so as to offset the distortion of the images. Accordingly, the picture processing apparatus according to the second aspect of the invention allows the reference side picture and the search side picture to be reliably composited so that the images representing the same subject overlap each other even when they have the above-mentioned distortion of the images. Accordingly, it allows the accuracy of the composition to be improved. It also allows the operation amount of the whole compositing process to be reduced, because the operation amount for detecting the mismatch is reduced. Further, it allows the operation for the compositing process to be quickened when the same computation circuit as used in the prior art picture compositing unit is used. Still more, it allows the processing time of the whole picture compositing process to be shortened.

In a third aspect of the invention, the picture processing apparatus according to the second aspect of the invention is characterized in that the line picture signal generating means reads the search side picture signal from the picture signal storage means and extracts the edge of the image from the search side picture, to generate the line picture signal representing the line picture in which a plurality of points are arrayed in the same arrangement as the search side picture, which signal contains pixel data sets individually corresponding to each of the points, and in which signal the pixel data set corresponding to the point on the edge has a first value and the pixel data set corresponding to remaining point other than the point on the edge has a second value.

According to the third aspect of the invention, the line picture signal generating means generates the line picture signal as described above from the search side picture signal. This generating method is equivalent to a method of binarizing the search side picture signal in response to whether or not each point in the search side picture is a point on the edge. This operation method allows a burden of an operation circuit which realizes the line picture signal generating means to be lessened, and the time of arithmetic process to be shortened, because the method is very easy. Thereby, the amount of data of the line picture signal becomes small as compared to that of the search side picture signal. In particular, when, in the search side picture signal, brightness of each point is stored as a stepwise value of three or more stages or as a continuous value, the data amount of the line picture signal can be extremely reduced as compared to the data amount of the search side picture signal. Accordingly, it allows the storage capacity of the memory for handling the line picture signal to be lessened. Further, since the amount of the handled data decreases also in the transforming means and mismatch detecting means, the circuit burden in handling the line picture signal can be reduced.

In a fourth aspect of the invention, in the line picture signal generated by the line picture signal generating means, the transforming means transforms pixel data sets corresponding to all points in a predefined area within the line picture which contains a point corresponding to the pixel data set having the first value, to pixel data sets having the first value.

According to the fourth aspect of the invention, the transforming means transforms the line picture signal as described above. The point in which the corresponding pixel data set has the first value, in the line picture before transformed which is represented by the line picture signal generated by the line picture signal generating means, corresponds to the point on the edge of the image. Therefore, a line is composed of the points in which the corresponding pixel data set has the first value when they adjoin and lie in a row within the line picture before transformed. In the transformed line picture represented by the line picture signal transformed by the transforming means, the pixel data sets corresponding to all of the points within the above-mentioned area containing the point corresponding to the edge of the image have the first value, so that these points compose the line. Thereby, the transforming means can transform the line picture signal so that the width of the line of the line picture before transformed is widened just by rewriting the pixel data corresponding to the points within the above-mentioned area. Thereby, the transforming means allows the operation amount to be reduced, because it can transform the line picture signal in the very easy computation process. Therefore, the burden of the operation circuit realizing the transforming means can be reduced.

In a fifth aspect of the invention, the transforming means transforms a value of each pixel data set of the line picture signal generated by the line picture signal generating means, to an average value of the value of said pixel data set and a value of a pixel data set corresponding to a point adjacent to a point corresponding to said pixel data set within the line picture.

According to the fifth aspect of the invention, the transforming means transforms the line picture signal as described above. This computation process is a so-called binary-multi-valued transformation, and the respective pixel data sets of the transformed line picture signal have different values of three or more stages. At this time, the first value is affixed to the point on the edge of the image within the line picture represented by the line picture signal before transformed. When the first value is greater than the second value, the pixel data set corresponding to the point corresponding to the edge of the image within the line picture represented by the transformed line picture signal becomes greater than the pixel data set corresponding to a point in the vicinity of the edge of the image. Accordingly, in the distribution of the values of the pixel data sets, the value of the point on the line corresponding to the edge of the image becomes maximum, and the farther from the line, the smaller the value becomes gradually.

When the correlation between the point within the line picture represented by such transformed line picture signal and the feature point is detected, the correlation between the point on the edge of the image and the feature point is greater than the correlation between the point in the vicinity of the edge of the image and the feature point. Thereby, when the above-mentioned two kinds of correlations are obtained when the width of the line is widened, the correlation between the point on the edge of the image and the feature point becomes maximum, so that the mismatch of the images is detected by that correlation. Accordingly, even when the line is widened, the correlation between the edge of the image and the feature point is likely to become maximum.

When the distortion of the images is fully small, the correlation between the point on the edge of the image and the feature point becomes almost equal to the correlation between the point in the vicinity of the edge of the image and the feature point in the picture processing apparatus according to the fourth aspect, so that it is difficult to determine just by the magnitude of the correlation, that a state where the point on the edge of the image overlaps the feature point is the best state of picture overlapping. Meanwhile, in the picture processing apparatus according to the fifth aspect of the invention, the correlation between the point on the edge of the image and the feature point becomes larger than the correlation between the point in the vicinity of the edge of the image and the feature point in the above case, so that the mismatch of the images can be detected from the image overlapping state when the former correlation is found. Accordingly, an error of the mismatch of the images can be further reduced.

In a sixth aspect of the invention, the picture processing apparatus further comprises deleting means for deleting pixel data sets corresponding to a plurality of points arrayed at a predefined space which is larger than a space between adjacent points within a line picture in the line picture signal transformed by the transforming means, wherein the mismatch detecting means finding individual correlations between the feature points extracted by the feature point extracting means and the each of a plurality of points within the line picture represented by the line picture signal from which the pixel data sets are deleted by the deleting means.

According to the sixth aspect of the invention, as compared to the apparatus according to the second aspect of the invention, the picture processing apparatus according to the sixth aspect of the invention interposes the above-mentioned deleting means between the transforming means and the mismatch detecting means, and replaces the mismatch detecting means of the second aspect of the invention with the above-mentioned mismatch detecting means. In the line picture represented by the line picture signal in which the pixel data sets are deleted, rows and columns of points within the picture are thinned as compared to the line picture represented by the transformed line picture signal. That is, a part of the pixel data sets in the transformed line picture signal is deleted by the transforming means. Thereby, the number of all points within the line picture represented by the line picture signal in which the pixel data sets are deleted decreases as compared to the number of all points in the line picture represented by the transformed line picture signal. Because the mismatch detecting means finds the correlation by using such a line picture signal in which the pixel data set is deleted, an operation amount of the operation process for finding the correlation can be reduced further than that of the mismatch detecting means in the picture processing apparatus according to the second aspect of the invention. Still more, this processing time of the operation process can be shortened more than that of the mismatch detecting means in the picture processing apparatus according to the second aspect of the invention.

In a seventh aspect of the invention, the line picture signal generating means reads the search side picture signal from the picture signal storage means and extracts a plurality of points whose gradient of changes in brightness is equal or more than a predefined threshold value from among all points within the search side picture, to generate a line picture signal representing a line picture containing a line composed of a string of the points.

According to the seventh aspect of the invention, the picture processing apparatus uses the above-mentioned line picture signal generating means in place of the line picture signal generating means of the picture processing apparatus according to the second aspect of the invention. The line picture signal generating means extracts the points in accordance with the magnitude of the gradient of changes in brightness as described above. These points turn out to be, for example, points on the edge of the image. Accordingly, the line picture signal can be generated from the search side picture signal in response to the gradient of changes in brightness. Since the method for calculating the gradient of changes in brightness requires, for example, only to discriminate whether or not a difference of brightness of two adjacent points is a predefined value, the discrimination is very easy. Since the method for extracting the edge of the image is very easy, the operation amount of the operation process of the line picture generating means can be further reduced. Furthermore, when the operation explained in the third aspect of the invention is to be performed by the line picture generating means according to the seventh aspect of the invention, the line picture signal can be generated by defining a value of the pixel data set corresponding to the magnitude of the gradient of changes in brightness, extracting the points on the edge of the image and binarizing the search side picture signal by the discriminating guideline which facilitates the operation process.

In an eighth aspect of the invention, the picture processing apparatus further comprises change point extract means for reading the reference side picture signal from the picture signal storage means and extracting a plurality of change points whose gradient of changes in brightness is equal or more than a predefined threshold value from among all points within the reference side picture, wherein the feature point extracting means extracts as feature points, a plurality of points which are separated by equal or more than a predefined distance within the reference side picture from among the change points extracted by the change point extract means.

According to the eighth aspect of the invention, the picture processing apparatus uses the above-mentioned feature point extracting means in place of the feature point extracting means of the picture processing apparatus according to the second aspect of the invention and interposes the change point extract means between the feature point extracting means and the picture signal storage means. The change point extract means extracts the change points as described above. Since the change point is a point whose gradient of changes in brightness exceeds the predefined threshold value, it corresponds to the point on the edge of the image. The feature point extracting means extracts the feature points from among the change points as described above. Thereby, the feature points are the points on the edge of the image and are separated from each other by a predefined distance. Therefore, since the feature points are scattered within the reference side picture in a state of being separated from each other by the predefined distance, the feature points will not concentrate in one part within the picture. It is preferable that the feature points are scattered, because it allows the mismatch of the images to be reliably detected in the feature point matching method. Accordingly, the picture processing apparatus of the eighth invention can reliably detect the mismatch of the images.

Further, the operation of the above-mentioned change point detecting means is equivalent to the method for extracting the points composing the line in the line picture signal generating means described in the seventh aspect of the invention. Accordingly, the line picture signal representing the line picture composed of the line representing the edge of the image may be generated from the reference side picture signal by the line picture signal generating means and the feature point extracting means may extract the feature points based on this line picture signal. It allows the structure of the picture processing apparatus to be simplified.

In a ninth aspect of the invention, the feature point extracting means reads the reference side picture signal from the picture signal storage means and extracts as feature points, a plurality of points which are separated from each other by equal or more than a predefined distance from among points in which an average value of brightness of all points in the reference side picture is contained within a range having brightness of two adjacent points as both ends, among the points of the reference side picture; and the line picture signal generating means reads the search side picture signal from the picture signal storage means and extracts a plurality of points in which an average value of brightness of all points in the search side picture is contained within a range having brightness of two adjacent points as both ends, among the points of the search side picture, to generate the line picture signal representing the line picture containing the line composed of a string of the points.

According to the ninth aspect of the invention, the picture processing apparatus uses the above-mentioned feature point extracting means and the line picture signal generating means, in place of the feature point extracting means and the line picture signal generating means of the picture processing apparatus according to the second aspect of the invention. The line picture signal generating means extracts the feature points as described above. It allows the feature points to be extracted even when the gradient of changes in brightness between the respective points is small among the reference side picture and the search side picture. The line picture signal generating means also extracts the points under the same condition as the feature point extracting means, to generate the line picture signal. Thereby, a point on the line or a point in the vicinity of the point in the line picture turns out to be a corresponding point to the feature point. Accordingly, even when the gradient of changes in brightness between the respective points is small among the reference side picture and the search side picture, for the same reason as the first aspect of the invention, it allows the calculation to be quickened or the operation amount to be reduced and the accuracy for detecting a mismatch to be improved, by using the feature point matching method. Accordingly, as compared to the prior art picture processing apparatus, this picture processing apparatus also allows the operation amount for the compositing process to be reduced and the processing time of the compositing process to be shortened. It then allows the mismatch of the images to be found by using the feature point matching method even when the gradient of changes in brightness between the respective points is small.

In a tenth aspect of the invention, a picture processing apparatus comprises:

picture signal storage means for storing reference side and search side picture signals individually representing reference side and search side pictures containing images representing the same subject;

feature point extracting means for reading the reference side picture signal from the picture signal storage means and setting a plurality of reference areas having a predefined size within the reference picture, to individually extract a plurality of points which are on an edge of the image as feature points from among a plurality of points within each reference area;

line picture signal generating means for reading the search side picture signal from the picture signal storage means and extracting an edge of the image from the search side picture to generate a line picture signal representing a line picture containing a line showing the edge of the image;

mismatch detecting means for, per reference area, setting a search area which is larger than the reference area within the line picture represented by the line picture signal generated by the line picture signal generating means and finding correlations between the feature points extracted by the feature point extracting means within the reference area and each of a plurality of points within the search area in the line picture, to individually detect mismatches of the images within the search area and the reference area based on the correlations;

rotational transforming means for reading the reference side and search side picture signals from the picture signal storage means and finding an inclination of the images between the reference side and search side pictures based on the plurality of mismatches detected by the mismatch detecting means, to rotationally transform each picture signal so that each picture is relatively and angularly displaced in a direction of offsetting the inclination; and compositing means for compositing the reference side and search side picture signals rotationally transformed by the rotational transforming means so as to superimpose the images while partly deforming the reference side and search side pictures so that the mismatch detected by the mismatch detecting means is offset, to generate a composite picture signal representing a single composite picture.

According to the tenth aspect of the invention, the picture processing apparatus sets a plurality of reference areas within the reference side picture and a plurality of search areas within the search side picture, and detects the mismatch of the images per group of the reference area and the search area, by using the feature point matching method explained in the first and second aspects of the invention. Thereby, for the reasons explained in the second aspect of the invention, it can detect the mismatch reliably more than the case of using the typical point matching method, and it can also reduce the operation amount for detecting the mismatch and shorten the processing time for detecting the mismatch more than the case of using the block matching method. Further, since there are a plurality of groups of the reference area and search area, the inclination of the reference side picture to the search side picture can be found from the mismatch of the images obtained by the group of reference and search areas set at the different positions among both the pictures.

According to the picture processing apparatus of this invention, after the mismatch is detected, the reference side picture signal and the search side picture signal are rotationally transformed by the rotational transforming means as described above, to composite the reference side and search side picture signals that are rotationally transformed, by the compositing means as described above,. It is for the following reason. The prior art picture processing apparatus using the feature point matching method composites the reference side picture signal and the search side picture signal as they are after detecting the mismatch. In general, when pictures are moved in order to find the correlation in a state where a plurality of pictures are superimposed, the reference side and search side pictures are relatively moved in parallel to the array of pixels within said pictures. In this case, when a distortion of the images including an image rotation exists between the image in the reference side picture and the image in the search side picture, an angle between a center line of the image in the reference side picture and a straight line parallel to the array direction of the pixels is different from an angle between a center line of the image in the search side picture and the above-mentioned straight line, for example. When the pictures are moved to find the correlation at this time as described above, it is considered that the image is distorted due to the inclination of the images even when the images in both the pictures are congruent. At this time, since the compositing means composites the picture signals so that the picture is deformed so as to offset this distortion, the search side picture sometimes requires to be deformed considerably.

In the picture processing apparatus of the tenth invention, the reference side and search side picture signals are composited after rotationally transforming the reference side and search side picture signals by the rotational transforming means. Thereby, since the inclination of the images among the distortions of the images can be offset by the rotational transformation, the distortion of the images to be offset by deforming the picture becomes small when the reference side and search side picture signals that are rotationally transformed are composited. Accordingly, a degree of deformation of the picture becomes smaller. Thus, the picture processing apparatus according to the tenth aspect of the invention allows the degree of deformation of the picture to be small, so that the images can be smoothly joined within the composite picture.

In an eleventh aspect of the invention, the picture processing apparatus further comprises:

image pickup means for shooting the subject by dividing the subject into a pair of first areas which partially overlap and by further dividing each first area into a plurality of second areas which overlap each other, to generate original picture signals representing original pictures containing images representing the subject within the second areas; and initial compositing means for, per first area, compositing each original picture signal generated by the image pickup means so that parts which represent areas of the images overlapping in the original picture represented by the original picture signal are superimposed on each other, and for generating the reference side and search side picture signals to store in the picture signal storage means.

According to the eleventh aspect of the invention, the picture processing apparatus further comprises the above-mentioned image pickup means and the initial compositing means. By these means, the reference side and search side picture signals are generated. The picture obtained in such a method is, for example, a picture obtained by a hand scanner comprising a one-dimensional image pickup device or a picture obtained by sequentially joining the original pictures obtained by the image pickup means including a two-dimensional image pickup device. A mismatch of the images including an inclination of the images is liable to occur between the images in the reference side picture and search side picture due to an error in moving the image pickup device as described in the description of the prior art. However, the reference side picture and the search side picture that are obtained as described above are composited by the picture processing apparatus according to the tenth aspect of the invention, with the result that the inclination of the images between the reference side picture and the search side picture is offset and a degree of deformation of the pictures is reduced to composite both the pictures.

Further, when, within the original pictures, an edge which constitutes an overlapping part for sequentially joining the original pictures by the picture signal compositing means is made crossing at right angles with an edge which constitutes an overlapping part for superimposing the reference side picture and the search side picture, the original pictures are sequentially superimposed in two directions orthogonal to each other, by the initial compositing process performed by the initial compositing means and the compositing process performed by the compositing means. Accordingly, the picture processing apparatus of the eleventh invention allows the original picture to be extended in two directions. Accordingly, it allows a composite picture whose definition is higher in two directions than the original picture obtained by the image pickup means, or a composite picture whose angle and range is wider than the original picture to be obtained. The image pickup means and the initial compositing means may be added also to the picture processing apparatus of the second invention. Thereby, the composite picture whose definition is high in two directions or the composite picture whose angle and range is wide can be obtained for the above-mentioned reason.

In a twelfth aspect of the invention, a picture processing apparatus comprises:

picture signal storage means for storing reference side and search side picture signals individually representing reference side and search side pictures containing images representing the same subject;

feature point extracting means for reading the reference side picture signal from the picture signal storage means and setting a plurality of reference areas having a predefined size within the reference picture represented by the reference side picture signal, to extract a plurality of points which are on an edge of the image as feature points from among a plurality of points within each reference area;

line picture signal generating means for reading the search side picture signal from the picture signal storage means and extracting an edge of the image from the search side picture to generate a line picture signal representing a line picture containing a line showing the edge of the image;

transforming means for transforming the line picture signal generated by the line picture signal generating means and widening the width of the line showing the edge of the image;

mismatch detecting means for, for each reference area, setting a search area which is larger than the reference area within the line picture represented by the line picture signal transformed by the transforming means and for finding correlations between the feature points extracted by the feature point extracting means within the reference area and each of a plurality of points within the search area in the line picture, to detect mismatches of the images within the reference area and the search area based on the correlations;

rotational transforming means for reading the reference side and search side picture signals from the picture signal storage means to find a rotation angle of the images between the two pictures based on the plurality of mismatches detected by the mismatch detecting means and to rotationally transform each picture signal so that each picture is relatively and angularly displaced in a direction of offsetting that rotation angle; and compositing means for compositing the reference side and search side picture signals rotationally transformed by the rotational transforming means so as to superimpose the images while partially deforming the respective pictures so that the mismatches detected by the mismatch detecting means are offset, to generate a composite picture signal representing a single composite picture.

According to the twelfth aspect of the invention, the picture processing apparatus is equivalent to what the rotational transforming means according to the tenth aspect of the invention is added to the picture processing apparatus according to the second aspect. This apparatus allows the calculation to be quickened or the operation amount to be reduced and the accuracy for detecting the mismatch to be improved for the same reason described in the first aspect of the invention. Further, as described in the tenth aspect of the invention, it allows the degree of deformation of the picture to be reduced, so that images can be joined smoothly within the composite picture. Thereby, the picture processing apparatus according to the twelfth aspect of the invention allows the composition accuracy to be improved more than the picture processing apparatuses according to the second and tenth aspects. Still more, by adding the image pickup means and the initial compositing means of the eleventh aspect of the invention to the picture processing apparatus according to the twelfth aspect of the invention, a picture whose angle and range are wider than those of an original picture in two directions or a picture whose definition is higher than that of the original picture may be produced at high precision.

In a thirteenth aspect of the invention, a picture processing apparatus comprises:

overlapping area deciding means for finding overlapping areas where two pictures composed of a plurality of pixels overlap each other;

density value statistic means for finding typical values typifying a distribution of density values of the pixels in the overlapping area of each picture; and density value compensating means for multiplying the density value of each pixel of one picture by a ratio of the typical value of the other picture to the typical value of one picture.

According to the thirteenth aspect of the invention, the picture processing apparatus calculates the ratio of the typical values as a compensation factor, and compensates the density values of the pixels of the pair of pictures by multiplying the density value of each pixel of one picture individually by the compensation factor. Thereby, overall lightness of the pair of pictures can be adjusted. Since this process is simpler than the histogram coincidence method and the linear density transformation method, the picture processing apparatus according to the thirteenth aspect of the invention allows the overall lightness of the pair of pictures to be compensated simply and reliably more than the prior art picture processing apparatus.

In a fourteenth aspect of the invention, each typical value is an average value of the density values of the pixels in the overlapping area of each picture.

According to the fourteenth aspect of the invention, the average value is used as the typical value. A numerical value of the average value is not so different in both cases where there is a small number of pixels whose density value extremely differs from that of other pixels and where no such small number of pixels exist, within the overlapping area. Accordingly, the density value can be stably compsensated by using the typical value as the average value.

In a fifteenth aspect of the invention, the overlapping area deciding means finds a mismatch of origins of coordinate systems of the respective pictures when parts having the same distribution of the density values within the two pictures are overlapped with each other and regards all areas that overlap when the two pictures are overlapped with each other by shifting the origins of the coordinate systems by the found mismatch, as overlapping areas, and the density value statistic means finds typical values of density values of pixels in areas further inside of the overlapping areas.

According to the fifteenth aspect of the invention, the picture processing apparatus finds the typical value as described above for the following reason. In the pictures, for instance, there is a case where the density value of a part of the pixels is missing or where a pixel affected by a signal distortion is contained, based on a characteristic of the imaging apparatus and the picture input unit both for generating the pictures. In this case, a position where the pixel is missing or where the pixel affected by the distortion exists is defined univocally by the imaging apparatus and the picture input unit. When the overlapping area is defined as described above, there is a case where the overlapping area contains the pixels at the above-mentioned position. In this case, the picture processing apparatus defines the above-mentioned area inside the overlapping area, avoiding those pixels at that position and defines the typical value based on pixels within that area. Thereby, the missing pixel and an effect of the signal distortion can be removed from the typical value.

In a sixteenth aspect of the invention, the picture processing apparatus is characterized in that the density value statistic means finds the typical value of the density values of pixels the number of which is smaller than that of all pixels in the overlapping area.

According to the sixteenth aspect of invention, the picture processing apparatus defines the typical value as described above. It is equivalent, for example, to a process of finding the typical value after thinning pixels composing the overlapping area. Since the number of pixels to be operated decreases as compared to the case of finding the typical value by using all pixels in the overlapping area, it can be realized that the operation process for finding the typical value to be quickened.

As described above, according to the sixteenth aspect of the invention, the picture processing apparatus defines the typical value by using only a part of the pixels in the overlapping area. Thereby, the operation process for finding the typical value can be simplified and the picture processing can be quickened.

In a seventeenth aspect of the invention, the density value is composed of predefined three color components; and the density value statistic means and the density value compensating means perform processing for each component of the density value.

According to the seventeenth aspect of the invention, each means of the picture processing apparatus performs the processing for each component of the density value. It allows the density value to be corrected readily and accurately more than the prior art picture processing apparatus even when the pictures are color pictures.

In an eighteenth aspect of the invention, a picture processing apparatus comprises:

overlapping area deciding means for finding overlapping areas where a pair of pictures overlap each other, respectively among from a plurality of pictures composed of a plurality of pixels;

density value statistic means for finding typical values typifying a distribution of density values of pixels in the overlapping areas of the respective pair of pictures;

compensation factor computing means for respectively finding a ratios of a density value of each pixel in each remaining picture among the plurality of pictures in which either one picture of the plurality of pictures is set to be standard, based on a ratio of the typical values of the respective pair of pictures;

correction factor computing means for finding correction factors of each ratio based on the distribution of a plurality of ratios; and density value compensating means for compensating the density value of each pixel per picture, based on the ratio of the each picture and the each correction factor.

According to the eighteenth aspect of the invention, the picture processing apparatus firstly combines the plurality of pictures by two, to calculate the typical values of the respective pair of pictures, and based on the ratio of the typical values, finds the ratio of the density values. This ratio of the density values contains an error in estimation of the density value due to the effect of reflection, shadow and shading as explained in the description of the prior art technologies. Therefore, the correction factor is found by assuming a rate of errors in estimation based on the ratio of density values, and the ratio of density values is corrected in a manner that the error in estimation is removed by the correction factor. Finally, the density value of pixels in the pictures is compensated based on the corrected ratio of the density values. Thereby, it is possible to prevent the effect of the error in estimation of the density value in compensating the density value so that overall lightness of a number of pictures, for example, about ten is equalized. Accordingly, the picture processing apparatus according to the eighteenth aspect of the invention allows the overall lightness of the plurality of pictures to be compensated reliably by the process simpler than that of the prior art picture processing apparatus.

In a nineteenth aspect of the invention, the picture processing apparatus further comprises:

a table for storing the plurality of ratios; and correcting means for correcting each ratio stored in the table based on the each correction factor, wherein the density value compensating means compensates the density value of each pixel based on the corrected ratio stored in the table per picture.

According to the nineteenth aspect of the invention, the compensation factor computing means stores the ratio to be corrected and the corrected ratio in the table before the density value is compensated by the density value compensating means. Thereby, the amount of operation performed by the density value compensating means at the point of compensating the density value of the pixel can be reduced as compared to a case where no table exists. It then allows the amount of operation performed by the picture processing apparatus at the point of compensating the density value of pixel to be reduced and the process to be simplified.

In a twentieth aspect of the invention, the correction factor computing means approximates a relationship between an arrangement order of the pictures when arranged by sequentially overlapping the overlapping areas and a ratio of each picture, by a predefined approximate expression, and defines each correction factor based on a constant of the approximate expression and the arrangement order.

According to the twentieth aspect of the invention, the correction factor computing means finds the correction factor by the procedure described above. It then allows the rate of the errors in estimation in the ratios of the density values to be reliably found.

In a twenty-first aspect of the invention, the approximate expression is an exponential function ($y=a^x$) and the constant is a base a of the exponential function.

According to the twenty-first aspect of the invention, the approximate function is an exponential function. When, for example, a plurality of pictures to be processed are obtained under a condition in which a positional relationship among a light source, a subject and a imaging apparatus is almost fixed and pixels which are affected by the reflection and shadow of the subject and shading within the picture appear at almost the same position, the effect exponentially increases as the arrangement order increases, so that the relationship between the plurality of ratios of density values and the arrangement order can be approximated by the exponential function. Accordingly, the rate of the errors in estimation can be found reliably in the above-mentioned case by rendering the approximate expression to be the exponential function. Further, even when the rate of the errors in estimation decreases, the rate will not be below 0, though it approaches to 0. Even in such a case, the relationship between the plurality of ratios of density values and the arrangement order can be approximated reliably by setting the base a of the exponential function to be a value greater than 0 and less than 1 ($0<a<1$). It then allows the rate of the errors in estimation to be found reliably when the positional relationship among the subject, the light source and the imaging apparatus is almost fixed and the picture is affected by the reflection and shadow of the subject and by the shading.

In a twenty-second aspect of the invention, the density value is composed of predefined three color components; and the density value statistic means, the compensation factor computing means, the correction factor computing means and the density value compensating means perform processing for each component of the density value.

According to the twenty-second aspect of the invention, each means of the picture processing apparatus performs the processing for each component of the density value. Thereby, the picture processing apparatus can compensate the overall lightness of the pictures simply and reliably more than the prior art picture processing apparatus even when the pictures are color pictures.

In a twenty-third aspect of the invention, in addition to the apparatus according to the eighteenth aspect of the invention, the picture processing apparatus further comprises compositing means for compositing the pictures in which the density value of each pixel is compensated, by sequentially overlapping the overlapping areas.

According to the twenty-third aspect of the invention, the picture processing apparatus composites a plurality of pictures by the above-mentioned compositing means. Since the overall lightness of the respective pictures is compensated before this compositing process, density of pixels on both sides of a part corresponding to a joint of the pictures smoothly changes within the composited picture. Accordingly, there is no part where color tone and density extremely change within the composite picture. Thereby, the quality of the picture composited by the picture processing apparatus according to the twenty-third aspect of the invention can be improved more than pictures composited by the prior art picture processing apparatus.

In a twenty-fourth aspect of the invention, the picture processing apparatus further comprises white balance compensating means for compensating white balance of the composited picture.

According to the twenty-fourth aspect of the invention, the picture processing apparatus compensates the white balance of the composited picture by the above-mentioned white balance compensating means due to the following reason. In each of a plurality of pictures to be composited, a colors of the pixel composing the picture is often leaned to a part of a certain color for the reason explained in the description of the prior art. However, since a range which is wider than a range imaged in each of the plurality of pictures to be composited is imaged in the composited picture, the lean of the color of the pixel composing the picture is eliminated. The white balance compensation using a picture signal detecting method allows the white balance to be accurately compensated when the pictures to be compensated have less color leaning. Therefore, when the composited picture is to be compensated, the picture processing apparatus according to the twenty-fourth aspect of the invention can compensate the white balance reliably by use of the white balance correcting means using the picture signal detecting method, even when each of the plurality of pictures have color leaning.

BRIEF DESCRIPTION OF THE DRAWINGS

Other and further objects, features, and advantages of the invention will be more explicit from the following detailed description taken with reference to the drawings wherein:

FIG. 15A is a diagrammatic view showing a positional relationship between the reference areas E1 and E2 within the object picture 21 and a positional relationship between the corresponding areas G1 and G2 within the object picture 22, FIG. 15B is a diagrammatic view showing a trapezoidal area 60 within the object picture 22 and FIG. 15C is a diagrammatic view showing a shape of the trapezoidal area 60 after deformation;

FIGS. 30A and 30B are histograms of density value of pixels in the overlapping areas qov1 and qov2 in the pictures Pic1 and Pic2;

FIG. 31 is a diagram showing two pictures PicE and PicF for explaining a block matching method;

FIG. 34 is a diagram showing a positional relationship among a imaging apparatus 203, a subject 261 and a light source 262 in obtaining a picture in an input picture string in a composite picture creating unit according to a fifth embodiment;

FIG. 35A is a diagram showing pictures Pic1 through Pic3 in the input picture string and FIG. 35B is a diagram showing the pictures Pic1 through Pic3 when the overlapping areas are overlapped;

FIGS. 43A to 43C are diagrammatic views for explaining a matching process of the prior art block matching method; and FIGS. 44A to 44C are diagrammatic views for explaining a matching process of the prior art feature point matching method.

DETAILED DESCRIPTION OF THE PREFERRED EMBODIMENTS

Figure 1:
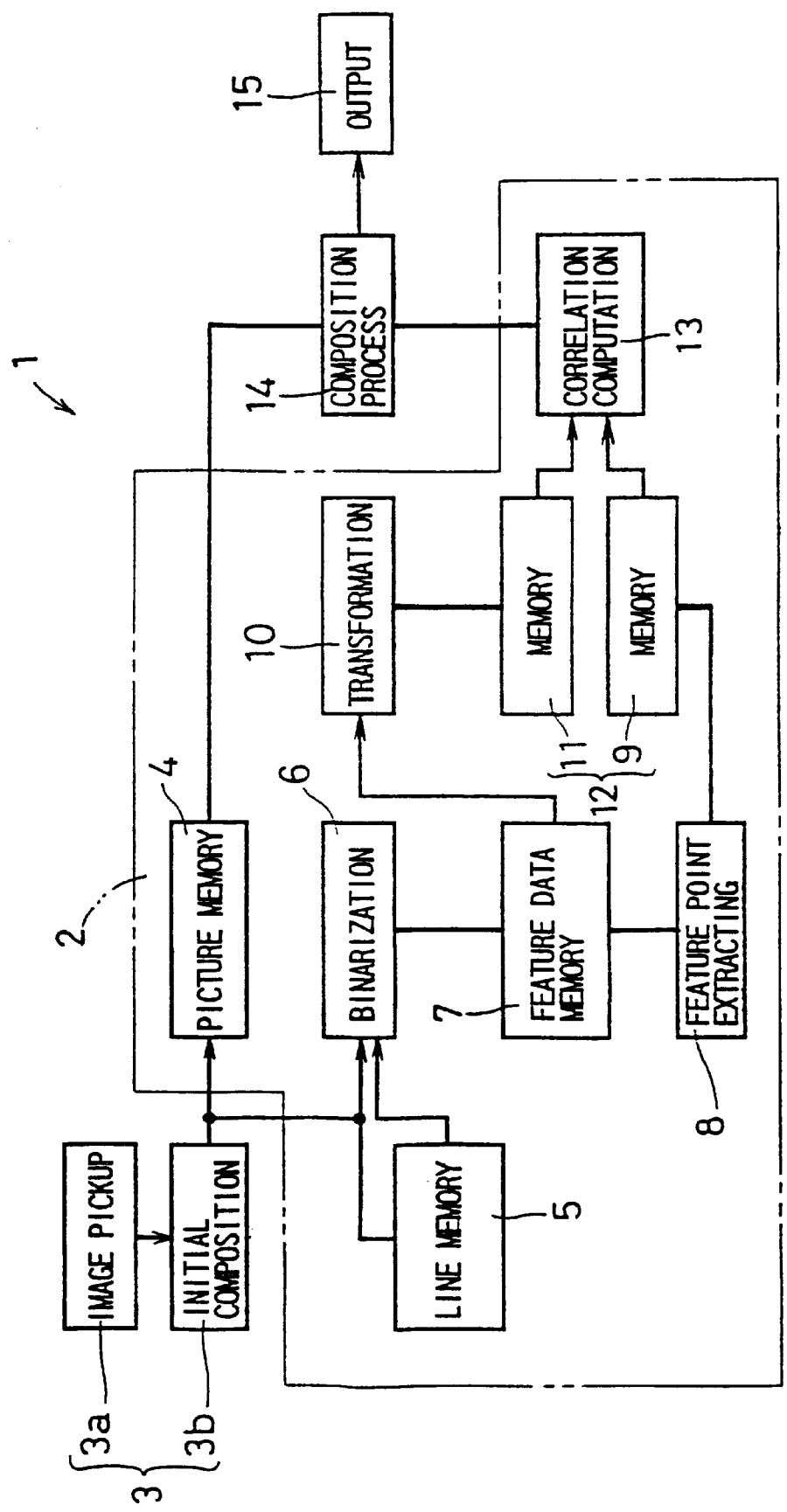
FIG. 1 is a block diagram showing an electrical structure of a picture compositing unit 1 according to a first embodiment of the invention.

Now referring to the drawings, preferred embodiments of the invention are described below.

FIG. 1 is a block diagram showing an electrical structure of a picture compositing unit 1 according to a first embodiment of a picture processing apparatus of the invention. The picture compositing unit 1 is aimed at obtaining a picture whose definition is higher or whose angle and range are wider than an original picture which is obtained by one time of image pickup operation by an image pickup device. The picture compositing unit 1 comprises a mismatch detecting unit 2, a picture intake unit 3, a composition processing circuit 14 and an output circuit 15. The mismatch detecting unit 2 includes a picture memory 4, a line memory 5, a binarization circuit 6, a feature data memory 7, a feature point extract circuit 8, a transforming circuit 10, a processing memory 12 and a correlation computing circuit 13.

The picture intake unit 3 obtains a plurality of object picture signals representing object pictures to be composited. The picture intake unit 3 may be what includes an image pickup section 3a and an initial composite section 3b and which composites and outputs a plurality of original pictures obtained by an image pickup device within the image pickup section 3a by the initial composite section 3b. The picture intake unit 3 may be also an input device for inputting object picture signals obtained by a so-called electronic still imaging apparatus or a scanner. The object picture is composed of a plurality of pixels disposed in a matrix. Hereinafter, a group of pixels arrayed linearly in a horizontal direction on a sheet of paper on which a Figure is drawn will be referred to as a "row" and a group of pixels arrayed linearly in a vertical direction on the sheet of paper will be referred to as a "column". The object picture signal is composed of a plurality of brightness data sets each corresponding to each pixel and representing the position of the pixel within the picture and its brightness.

The plurality of object picture signals taken into the picture intake unit 3 are transferred from the picture intake unit 3 to and stored in the picture memory 4, in unit of the brightness data set per object picture. This brightness data set is also supplied to the line memory 5 and the binarization circuit 6. Among all of the supplied brightness data sets, the line memory 5 sequentially stores brightness data sets corresponding to a predetermined number of pixels, and every time when a new brightness data set is supplied, gives to the binarization circuit 6, a brightness data set which has been given to the line memory 5 before the new brightness data set and which is a brightness data set of a pixel adjacent to the pixel to which the new brightness data set corresponds.

Based on the brightness data sets supplied from the picture intake unit 3 and the brightness data sets supplied from the line memory 5, the binarization circuit 6 generates a line picture signal by binarizing the object picture signals in accordance to a gradient of changes of brightness. While the line picture signal is a signal generated during the picture compositing process and has a same signal structure as a picture signal, a line picture represented by the line picture signal is not actually visually displayed for an operator. In the description below, the line picture is an imaginary image for representing contents of the line picture signal. The line in the line picture represents a portion of the object picture represented by the object picture signal in which the gradient of changes of brightness exceeds a predefined value, i.e. an edge of the image. The binarized object picture for generating the line picture signal will be regarded as an original object picture of the line picture. The line picture signal is stored in the feature data memory 7.

The feature point extract circuit 8 reads the line picture signal stored in the feature data memory 7, extracts pixels composing the line of the line picture represented by the line picture signal, i.e. pixels on the edge of the image within the original object picture, as feature point pixels and stores coordinates representing positions of the feature point pixels within the object picture in a memory 9. The transforming circuit 10 reads the line picture signal stored in the feature data memory 7, transforms the line picture signal so that a width of the line of the line picture represented by this line picture signal is thickened and generates a transformed picture signal. The transformed picture signal is a signal having the same meaning with the line picture signal and a transformed image represented by the transformed picture signal is an imaginary image not visually displayed. The transformed image is the same as the above-mentioned line picture except that the thickness of the line is different. The transformed picture signal is stored in a memory 11. The processing memory 12 is composed of the memories 9 and 11.

Referring to the stored contents within the processing memory 12, the correlation computing circuit 13 finds a correlation between the feature point pixels and pixels within the transformed image to detect an imaginary mismatch and an imaginary distortion in the two object pictures from that correlation. The composition processing circuit 14 reads a pair of object picture signals stored in the picture memory 4 and generates a composite picture signal by compositing the pair of object picture signals such that the pair of object pictures are superimposed so that the imaginal mismatch is offset and such that the images are deformed and overlapped so that the imaginal distortion found by the correlation computing circuit 13 is canceled. The composite picture signal is supplied to an external printing unit and a display device via the output circuit 15 to be visually displayed. Detailed process in each of the circuits 6, 8, 10 and 13 will be described later.

Figure 2:
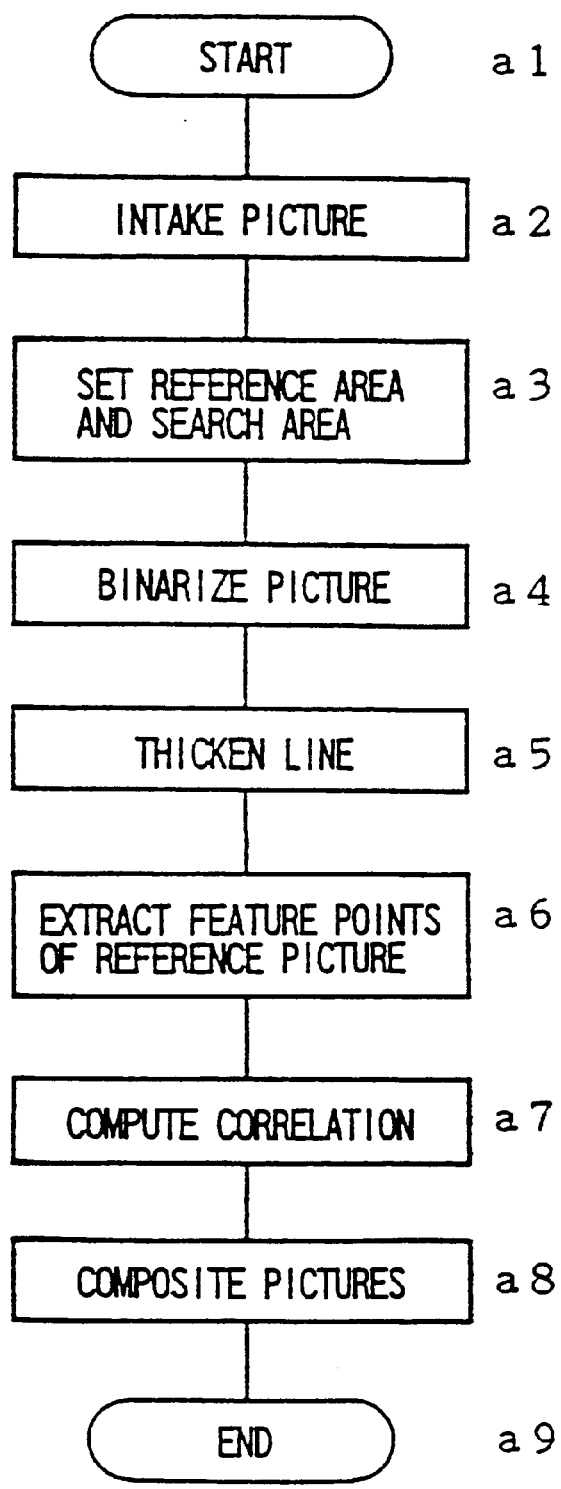
FIG. 2 is a flowchart for explaining a picture compositing process of the picture compositing unit 1.

FIG. 2 is a flowchart for schematically explaining the picture compositing process of the picture compositing unit 1 shown in FIG. 1. When it is instructed to start the picture compositing process, a process advances from step a1 to step a2.

In step a2, the picture intake unit 3 obtains a pair of object picture signals to be composited. In a first embodiment, each object picture signal is supposed to be a picture signal obtained by picking up an image of a subject by a two-dimensional image pickup device and both the object pictures are supposed to be two-dimensional images having a rectangular frame. While images representing the same subject are contained in the object pictures represented by both the object picture signals, a relative position of the image with respect to a reference position of both the object pictures is different. Therefore, both the object pictures can be partially overlapped and can be superimposed such that the images representing the same subject overlap each other.

Next, a matching process in the mismatch detecting unit 2 is performed in steps a3 through a7. In the matching process, the imaginal mismatch and distortion are found by way of feature point matching method with respect to the pair of object pictures to be processed. More specifically, either one of the pair of object picture signals is chosen as representing a reference object picture and one or a plurality of reference areas are set in an area containing the image representing the same subject within the reference object picture in Step a3. Similarly to that, the other one of the pair of object picture signals is chosen as representing a search object picture and search areas each corresponding to each reference area are set in an area representing the same subject within the search object picture.

Next, the binarization circuit 6 binarizes both the object picture signals to generate a reference line picture signal and a search line picture signal and stores them in the feature data memory 7 in Step a4. Successively, the transforming circuit 10 transforms both the line pictures individually to generate a reference transformed picture signal and a search transformed picture signal in Step a5. Then, referring to the reference line picture signal, the feature point extract circuit 8 extracts feature point pixels among pixels within the reference object picture in Step a6. Next, the correlation computing circuit 13 performs a correlation computation per set of the reference area and the search area to find positions of corresponding areas for obtaining the imaginal mismatch and distortion within the reference area and the search area in Step a7. Thereby, the matching process ends.

Finally, based on the imaginal mismatch and distortion obtained from the position of the corresponding areas found by the correlation computing circuit 13, the composition processing circuit 14 transforms and composites the pair of object picture signals to generate the composite picture signal in Step a8. After generating the signal, the picture compositing process ends in Step a9.

The matching process of the mismatch detecting unit 2 will be explained below in detail by exemplifying the matching process performed on object pictures 21 and 22 shown in FIG. 3 as objects to be processed. Those described as "up", "down", "right" and "left" in the explanation of the Figure in the description below refer to directions on the sheet of paper on which the Figure is drawn and are nothing to do with directions of the pictures to be processed.

Figure 3:
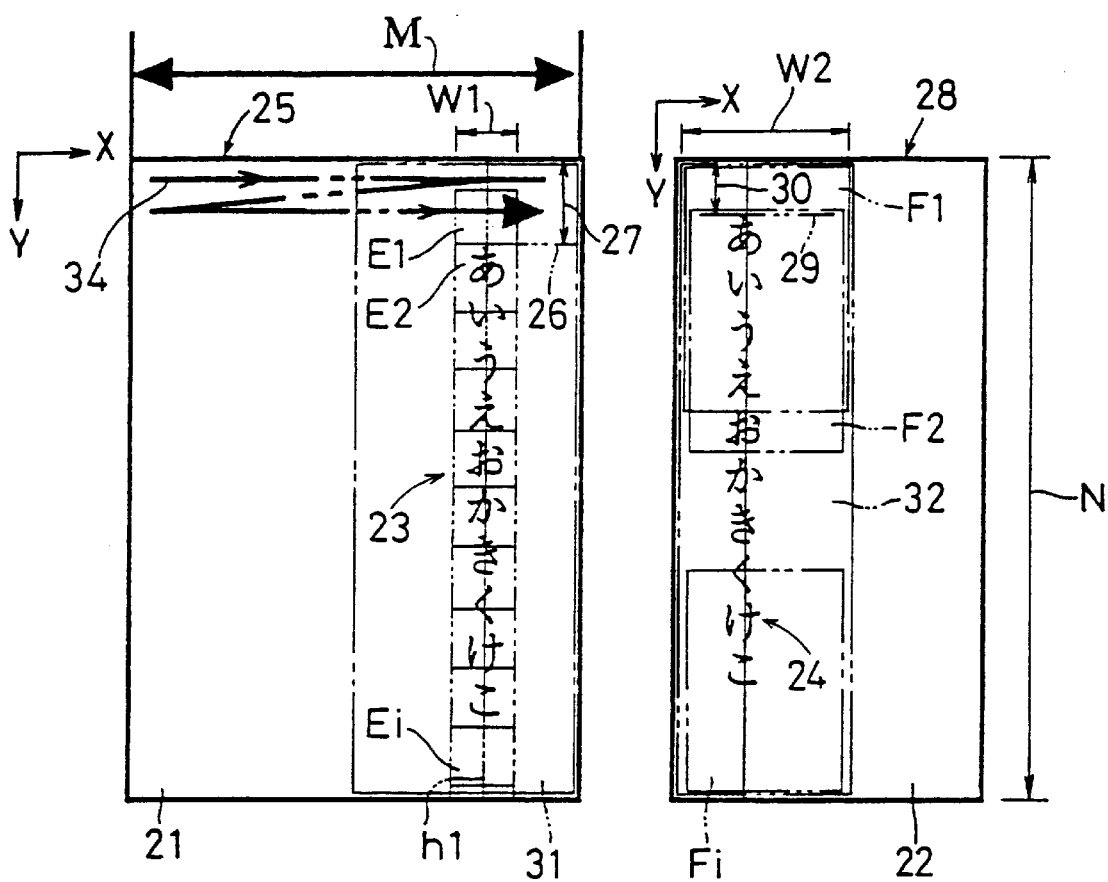
FIG. 3 is a diagrammatic view showing object pictures 21 and 22 represented by a pair of object picture signals to be processed by the picture compositing unit 1, a positional relationship among reference areas E1 through Ei within the object picture 21, and a positional relationship among search areas F1 through Fi within the object picture 22.

FIG. 3 is a schematic drawing showing the object pictures 21 and 22 represented by the pair of object picture signals taken in by the picture intake unit 3 in an intake process in Step a1. The object pictures 21 and 22 are rectangular pictures having the same length in a vertical direction. In the explanation below, the object picture 21 is assumed to be a reference object picture and the object picture 22 to be a search object picture. A number of pixels composing a row of the object picture 21 is denoted by M, a number of pixels composing a column by N, an arbitrary integer which is 1 or more and which is M or less by m and an arbitrary integer which is 1 or more and which is N or less by n. Among the pixels within the object pictures, a pixel belonging at n row and m column will be denoted by (m, n). Further, an XY orthogonal coordinate system for representing positions of the pixels, areas and images within the pictures are set with respect to the object pictures 21 and 22. For this coordinate system, an x-coordinate axis parallel to the row and a y-coordinate axis parallel to the column are set and an origin of the coordinate system is set at an apex at the upper left corner in the respective object pictures 21 and 22. The origin is a reference position for indicating positions within the object pictures 21 and 22. That is, positions within the respective object pictures 21 and 22 are represented as relative positions with respect to the reference position.

Two images 23 and 24 representing the same subject are contained in the object pictures 21 and 22. The object is Japanese characters "あいうえおかきくけこ" printed on a sheet of paper for example. The image 23 is located at the right edge portion of the object picture 21 and the image 24 is located at the left edge portion of the object picture 22. A distance 27 between an upper side 25 of the object picture 21 and an upper edge 26 of the image 23 is longer than a distance 30 between an upper side 28 of the object picture 22 and an upper edge 29 of the image 24. That is, the position of the image 23 within the object picture 21 is different from the position of the image 24 within the object picture 22 and the image 23 does not coincide with the image 24 at the above-mentioned position even when the image 23 is moved in parallel in the direction parallel to the x-coordinate axis.

Areas in which the images 23 and 24 representing the same subject can be contained in the object pictures 21 and 22 will be referred to as overlapping areas 31 and 32 of the object pictures 21 and 22. The positions of the overlapping areas 31 and 32 are defined in the object pictures 21 and 22 and an operator shoots the subject so that the images 23 and 24 representing the same subject are contained in the overlapping areas 31 and 32 in generating the object pictures 21 and 22. In the example shown in FIG. 3, the overlapping area 31 is an area from the center to the right side of the object picture 21 and the overlapping area 32 is an area from the left side to the center of the object picture 22.

The process for setting the reference area and the search area In step a3 will be explained below in detail.

A predefined number i of reference areas are set within the overlapping area 31 of the object picture 21 for reference. i is an arbitrary Integer. In the example shown in FIG. 3, the reference areas E1 through Ei are set such that their center points are disposed on a reference axial line h1 set in the vicinity of the right side and such that an interval between the center points of two adjacent reference areas is a predefined interval. A horizontal width W1 of each of the reference areas E1 through Ei is a length of about 100 to 200 pixels for example. Corresponding to the respective reference areas E1 through Ei, the same number of search areas are set within the overlapping area 32 of the object picture 22 for search. In FIG. 3, only the search areas F1, F2 and Fi which are set corresponding to the reference areas E1, E2 and Ei are described in FIG. 3. The search areas F1 through Fi may overlap each other. A size of each of the search areas F1 through Fi is larger than that of the corresponding reference areas E1 through Ei and their horizontal width W2 is about a half of the horizontal width of the object picture 22 on the search side.

The positions of the reference areas E1 through Ei within the object picture 21 and the positions of the search areas F1 through Fi within the object picture 22 may be empirically decided in advance such that they are set at the decided positions every time when a pair of object picture signals are given. Further, when the picture intake unit 3 is a mobile device such as an electronic still imaging apparatus, the positions of the reference areas E1 through Ei and the positions of the search areas F1 through Fi may be decided based on a prediction result obtained by detecting a move of the device and by predicting the overlapping state of the pair of object pictures 21 and 22 based on that move.

The binarization process in step a4 will be explained below in detail. The line memory 5, the binarization circuit 6 and the feature data memory 7 are used in the binarization process. Among all brightness data sets composing the object picture signal, the picture intake unit 3 sequentially outputs brightness data sets corresponding to pixels scanned by setting the X-direction as a main scan direction and the Y-direction as a sub-scan direction, as shown in FIG. 3. Hereinafter, the pixel corresponding to the brightness data set output from the picture intake unit 3 will be referred to as an object pixel to be processed. The line memory 5 and the binarization circuit 6 perform a series of processes described below and store pixel data set obtained as a result of the processes in the feature data memory 7. This process is repeated to each of pixels composing one object picture and when the series of processes end for all of the pixels composing the object picture, the process in step a4 ends.

Figure 4A:
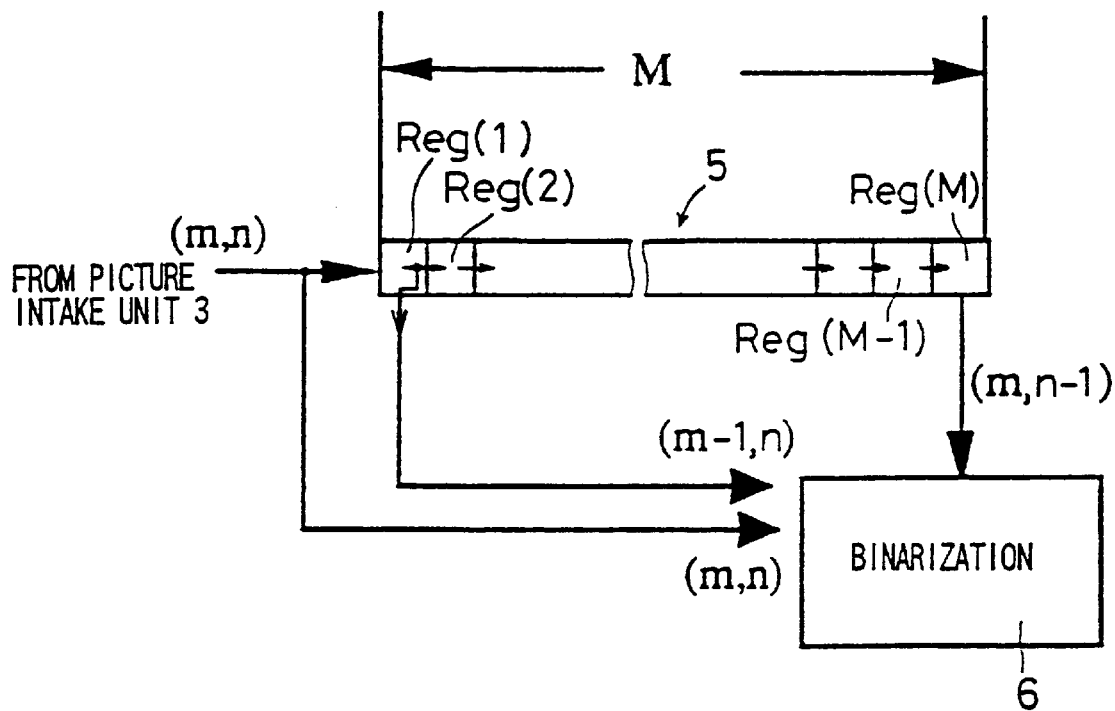
FIG. 4A is a block diagram showing a concrete electrical structure of a line memory 5 of the picture compositing unit 1 and a relationship of connecting registers Reg (1) through Reg (M) of the line memory 5 and a binarization circuit 6.

FIG. 4A is a block diagram showing an concrete electrical structure of the line memory 5. The line memory 5 has the same number of registers Reg (1) through Reg (M) with the number M of the pixels composing one single row of the object pictures 21 and 22. The respective registers Reg (1) through Reg (M) are connected linearly and vertically in this order. When a brightness data set of an object pixel is given from the picture intake unit 3, brightness data sets stored individually in the respective registers Reg (1) through Reg (M−1) are transferred to and stored in the registers Reg (2) through Reg (M) of the next stage. At the same time, the brightness data set stored in the register Reg (M) of the last stage and the data set transferred from the register Reg (1) of the front stage to the register Reg (2) of the next stage are given to the binarization circuit 6. Next, the brightness data set from the picture intake unit 3 is stored in the register (1) of the front stage.

Figure 4B:
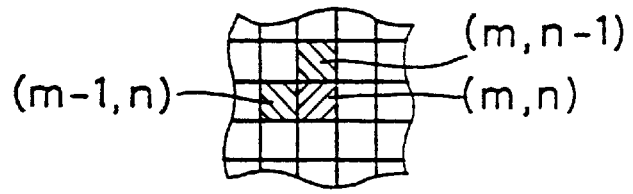
FIG. 4B is a diagrammatic view showing a positional relationship among pixels (m, n), (m−1, n) and (m, n−1) within the object pictures 21 and 22.

Accordingly, when the picture intake unit 3 outputs one brightness data set in the order explained in FIG. 3, the line memory 5 stores the brightness data sets individually corresponding to the M pixels from the object pixel to the pixel going back by the number of pixels M of one row in the direction opposite from the scan direction indicated by an arrow 34. For instance, at the point of time when the picture intake unit 3 outputs the brightness data set corresponding to a pixel (m, n) at row n and column m in the reference side object picture 21 in FIG. 3, the register Reg (1) of the front stage stores a brightness data set corresponding to a pixel (m−1, n) at row n and column m−1 and the register Reg (M) of the last stage stores a brightness data set corresponding to a pixel (m, n−1) at row n−1 and column m as shown in FIG. 4. As described in FIG. 4, the pixels (m, n) and (m−1, n) are located within the same row and are adjacent to each other and the pixels (m, n) and (m, n−1) are located within the same column and are adjacent to each other. Thereby, the brightness data set corresponding to the pixel located within the same row and adjacent to each other with the object pixel and the brightness data set corresponding to the pixel located within the same column and adjacent to each other with the object pixel are given from the line memory 5 to the binarization circuit 6.

Thus, the provision of the line memory 5 allows the binarization circuit 6 to readily take the brightness data sets of the two pixels adjacent to the object pixel. This line memory may be replaced with a memory other than the line memory, e.g. a memory having a storage capacity which allows all brightness data sets of the object picture signal to be stored. The use of the line memory allows the storage capacity for obtaining the brightness data sets of the adjacent pixels to be reduced. Accordingly, it allows the circuit structure of the picture compositing unit 1 to be simplified.

The binarization circuit 6 detects edges of the images in the object pictures 21 and 22 and generates line picture signals representing line pictures composed of lines representing the edges. The line picture signals have the same number of pixel data sets with the number of the pixels of the object pictures 21 and 22 and each pixel data set corresponds to each pixel in line pictures 41 and 42. The line picture and the object picture are images having the same pixel array and the coordinate system is set in a similar fashion. A brightness data set corresponding to a pixel within the line picture at the same position with one pixel within the object picture, i.e. a pixel corresponding to one pixel within the object picture, is defined by a gradient of changes in brightness of one pixel within the object picture. When the gradient of changes in brightness of the pixel is more than a predefined value, the pixel data set turns out to be 1 and when the gradient of changes in brightness is less than the predefined value, it turns out to be 0. When the line picture signal is to be imaginarily and visually displayed as a line picture and when the brightness data set displays a pixel of 1 in black and displays a pixel of 0 in white, the pixels displayed in black form a line representing an edge of the image by stretching in a row.

Figure 5:
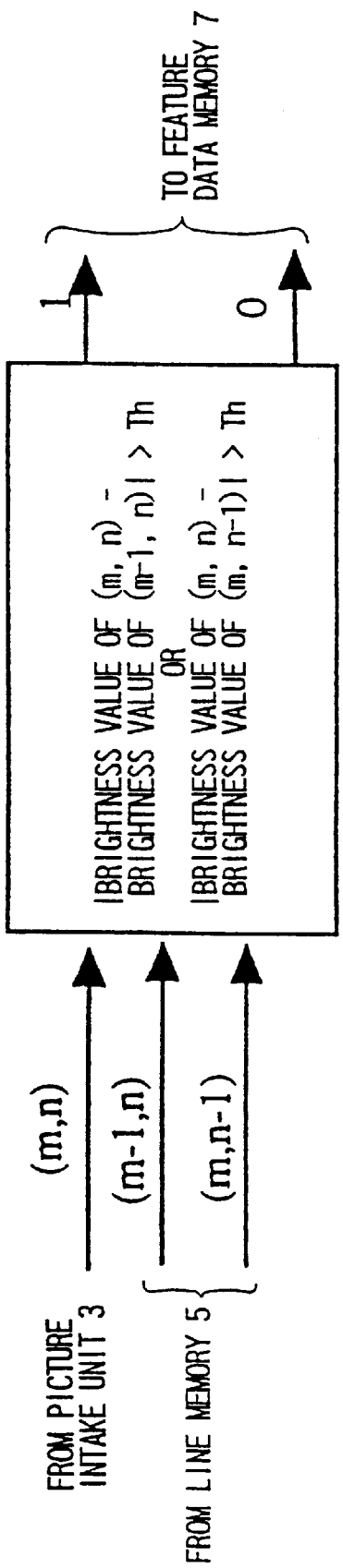
FIG. 5 is a block diagram showing a concrete operation of the binarization circuit 6 of the picture compositing unit 1.

FIG. 5 is diagrammatic view for concretely explaining the process of the binarization circuit 6. In concrete, when the brightness data set of the object pixel is given from the picture intake unit 3, the binarization circuit 6 discriminates whether or not an absolute value of a difference between the brightness data set and each brightness data set given from the line memory 5 is greater than a predefined threshold value Th individually for the pixel adjacent to the object pixel within the same row and the pixel adjacent to it within the same column as expressed in Expression (2). The difference of the brightness data set of the two pixels within the row corresponds to the gradient of changes in brightness of the object pixel within the changes of the brightness within the row. The difference of the brightness data set of the two pixels within the column corresponds to the gradient of changes in brightness of the object pixel within the changes of the brightness within the column.

When at least one of the two absolute values of the above-mentioned differences is greater than the threshold value Th, the pixel data set corresponding to the object pixel is set to be 1. When the both of the two absolute values of the above-mentioned differences are less than the threshold value Th, the pixel data set corresponding to the object pixel is set to be 0. This pixel data set is given to and stored in the feature data memory 7. Therefore, the brightness data sets each corresponding to each pixel are arrayed within the line picture signal sequentially in the order in which the X-direction is set as the main direction and the Y-direction as the sub-direction. It is possible to discriminate whether or not the object pixel is a pixel on the edge of the image by calculating the gradient of changes in brightness by such method. That is, the edge of the image may be detected based on the gradient of changes in brightness.

$$|\text{Brightness of } (m, n) - \text{brightness of } (m-1, n)| > Th$$

or/and $$|\text{Brightness of } (m, n) - \text{brightness of } (m, n-1)| > Th \qquad (2)$$

It is also possible to use a line memory in which a number of registers is twice of the number of pixels M composing a row of the object picture, instead of the line memory 5. In this case, when the object pixel is the pixel (m, n), the line memory supplies the brightness data set of the pixel (m−1, n) adjacent to the pixel (m, n) within the same row, the brightness data set of the pixel (m−2, n) adjacent to the pixel (m−1, n) within the same row, the brightness data set of the pixel (m, n−1) adjacent to the pixel (m, n) within the same column and the brightness data set of the pixel (m, n−2) adjacent to the pixel (m, n−1) within the same column. When the gradient of changes in brightness of the object pixel is to be found from these brightness data sets, an influence of noise may be removed because the number of brightness data sets to be referred is large. This noise includes optical noise and electrical noise mixed into the object picture signal from the outside when the picture intake unit 3 has taken in the object picture and noise overlaid in the electrical circuits from the picture intake unit 3 to the binarization circuit 6. Accordingly, it allows the accuracy in extracting the edge of the image to be improved.

Another technique of the binarization will be explained further below. According to this technique, an average value Thav of brightness of all pixels of the object pictures 21 and 22 is found at first. Then, setting the average value Thav as a threshold value, it is discriminated whether or not the threshold value enters within a range whose both ends are brightness of two adjoining pixels and a value of the pixel data set is defined corresponding to the result of discrimination. In concrete, when the object pixel is the pixel (m, n), brightness of the object pixels (m, n), (m−1, n) and (m, n−1) are compared with the average value Thav as shown by the following expression. That is, when the brightness of the pixel (m, n) is less than the average value Thav and when brightness data of at least one pixel among pixels (m, n−1) and (m−1, n) is greater than the average value Thav, the pixel data set is set as 1. When all of the pixels (m, n), (m−1, n) and (m, n−1) are greater than the average value Thav and when all of the pixels (m, n), (m−1, n) and (m, n−1) are less than the average value Thav, the pixel data set is set as 0.

$$\text{Brightness of } (m, n) < Thav \text{ and Brightness of } (m, n-1) > Thav \text{ or}$$
$$\text{Brightness of } (m-1, n) > Thav \qquad (3)$$

Thereby, the binarization circuit 6 extracts pixels whose brightness change and cross the average value, instead of the pixels on the edge of the image. Hereinafter, those pixels are handled and processed in the same manner with the pixels on the edge of the image. It allows the feature points to be extracted and a line picture signal to be generated even when the changes of brightness is small within the object picture and it is difficult to detect an edge of an image. It then allows the picture compositing process to be performed on a landscape picture or on a picture in which brightness of the background and an image is close as the object picture.

Figure 6:
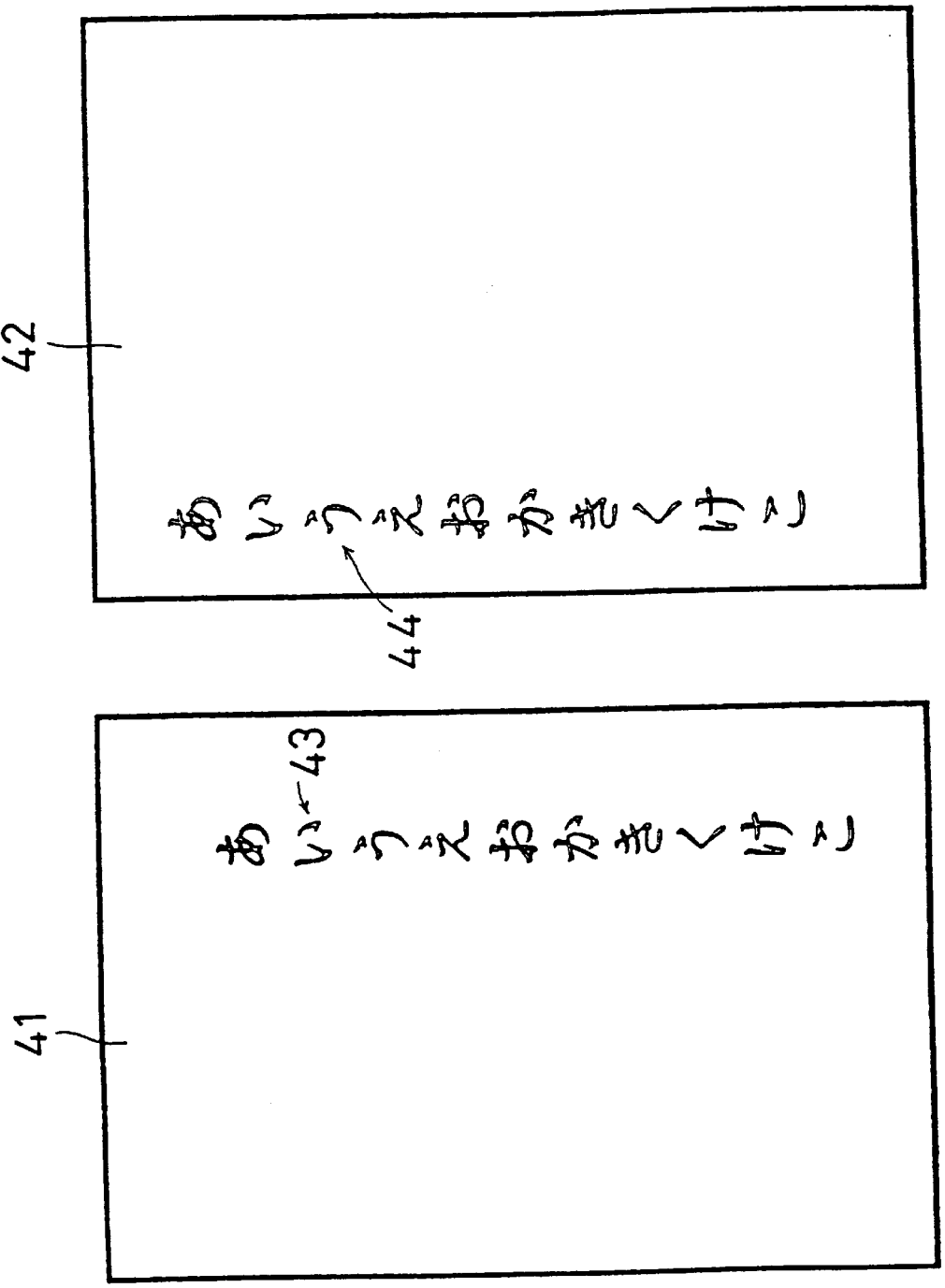
FIG. 6 is a diagrammatic view showing line pictures 41 and 42 represented by a pair of line picture signals generated by the binarization circuit 6.

FIG. 6 is a diagrammatic view showing line pictures 41 and 42 represented by a pair of line picture signals. The line picture signals are what have been obtained by performing the binarization process in step a4 on the object picture signals representing the pair of object pictures as the object to be processed as explained in FIG. 3 and are stored in the feature data memory 7 when the process has end. Because the points which can be the edge of the image are points on the outlines of the images 23 and 24 representing the characters in the object pictures 21 and 22 in FIG. 3, the line pictures 41 and 42 corresponding to the object pictures 21 and 22, respectively, are pictures in which only the outlines of the images 23 and 24 representing the characters are drawn. The line pictures in FIG. 6 are the same with the object pictures in FIG. 3 except of that the images 23 and 24 are replaced by the outlines 43 and 44 of the images.

Figure 7:
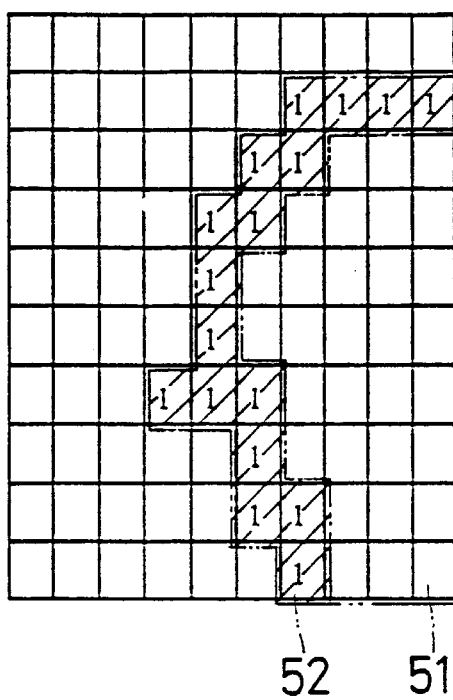
FIG. 7 is a partially enlarged view of the line picture 42 in FIG. 6.

FIG. 7 is a diagrammatic view showing a portion of the line picture 42 in FIG. 6 by enlarging it. In FIG. 7, rectangular areas disposed in a matrix correspond to the pixels in the line picture 42 and a numerical value in each rectangular area shows a value of a pixel data set corresponding to that pixel. A value of pixel data set of a pixel corresponding to a rectangular area in which no numerical value is described is 0. It can be seen from FIG. 7 that among those pixels, only the value of pixel data set of pixels at a peripheral section 52 of an area 51 where the image representing the subject is located within the original object picture 22 of the line picture 42 is 1 and the value of pixel data set of pixels located in the remaining area other than the area 51 and located inside of the peripheral section 52 within the area 51 is 0. In FIG. 7, the pixels at the peripheral section 52 are shown by hatching them. That is, it can be seen that the pixels whose value of pixel data set is 1 are the pixels on the edge of the image.

The line thickening process in step a5 will be explained below in detail. The feature data memory 7, the transforming circuit 10 and the memory 11 are used for the line thickening process. The line thickening process is started from the point of time when the line picture signal as shown in FIG. 6 is stored in the feature data memory 7 after the binarization process in step a4 is ended on one object picture. The transforming circuit 10 performs the process described below in unit of pixel and stores a pixel data set obtained as a result i the memory 11. The process in step a5 ends at the point of time when the series of processes is repeated on each pixel composing one line picture and when the series of processes end on all pixels composing the line picture.

Figure 8:
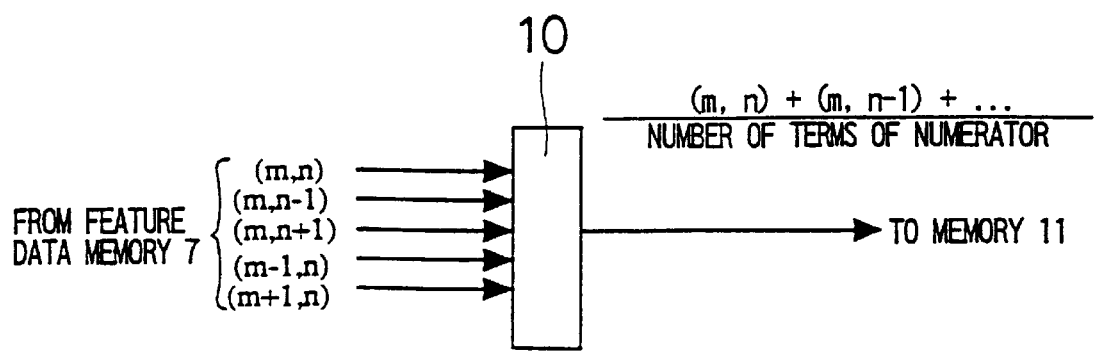
FIG. 8 is a block diagram showing a concrete operation of a transforming circuit 10 in the picture compositing unit 1.

FIG. 8 is a block diagram showing a concrete operation of the transforming circuit 10. The transforming circuit 10 transforms the line picture signal stored in the feature data memory 7 to generate a transformed picture signal. This transformed picture signal is what the value of each pixel data set of the line picture signal is replaced to an average value between that pixel data set and a pixel data set corresponding to a pixel around the pixel corresponding to the pixel data set within the object picture. Accordingly, the transformed picture, the line picture and the object picture are pictures having the same pixel array and the coordinate systems are set in the same fashion. Further, the pixel of the transformed picture corresponds to a pixel at the same position with that pixel within the object picture and to a pixel at the same position with that pixel within the line picture.

When the pixel (m, n) is an object pixel to be processed, the transforming circuit 10 reads the pixel data sets of the pixels (m, n), (m, n−1), (m, n+1), (m−1, n) and (m+1, n). Then, it calculates an average value from these five pixel data sets based on the following Expression (4) and replaces the value of the pixel data set with that average value. This transformation process is a so-called binary-multi-value transformation.

$$\text{Pixel Data Set of Pixel } (m, n) = \frac{(m, n) + (m, n-1) + (m, n+1) + (m-1, n) + (m+1, n)}{\text{number of terms of numerator}} \quad (4)$$

Because the pixel data set actually takes an either value of 1 or 0, it is possible to count a number of pixels whose pixel data set is 1 among the pixels (m, n), (m, n−1), (m, n+1), (m−1, n) and (m+1, n) and to replace the counted result with the value of the pixel data set, instead of the average value, in the line thickening process. Still more, instead of replacing the pixel data set with the average value, it is possible to retrieve a predefined area containing pixels whose pixel data set is 1 within the line picture and to transform the value of the pixel data set of all pixels within the retrieved area. When this transformed picture signal is visually displayed and the pixels whose pixel data set is more than 1 are displayed in black and pixels whose pixel data set is 0 are displayed in white, the pixels displayed in black run in a row and compose a line. Accordingly, it can be seen that the width of the thin line of the line picture is widened by the line thickening process described above.

Figure 9:
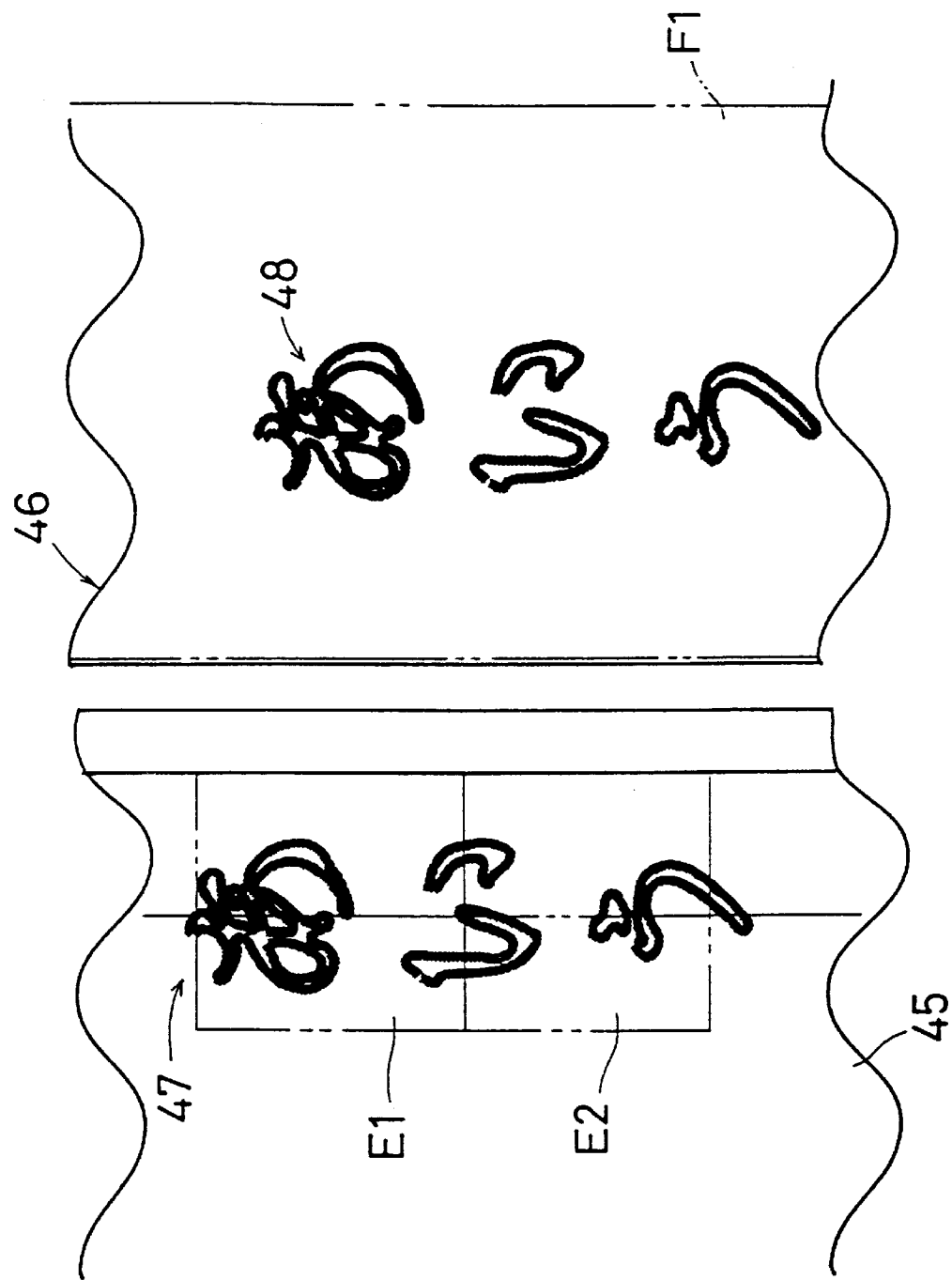
FIG. 9 is a diagrammatic view showing transformed pictures 47 and 48 represented by a pair of transformed picture signals generated by the transforming circuit.

FIG. 9 is a partially enlarged view of the diagrammatic view showing transformed pictures 45 and 46 represented by the transformed picture signals. The transformed picture signals are what have been obtained by performing the line thickening process in step a5 on the line picture signals representing the line pictures 41 and 42 described in FIG. 6 and have been stored in the memory 11 at the point of time when that process has end. While the edge of the image has been drawn by the thin line in the line pictures 41 and 42 in FIG. 6, the edge of the image is drawn by the thick line whose width is wider than the thin line centering on the thin line in the transformed pictures 45 and 46 in FIG. 9. Thereby, it can be seen that the width of the line of the line picture has been widened. The transformed pictures 45 and 46 are the same with the line pictures 41 and 42 in FIG. 6 except that the line drawing the outline of the image has been changed from the thin line to the thick line. The outlines 43 and 44 whose lines have been changed will be referred to as outlines 47 and 48.

Figure 10:
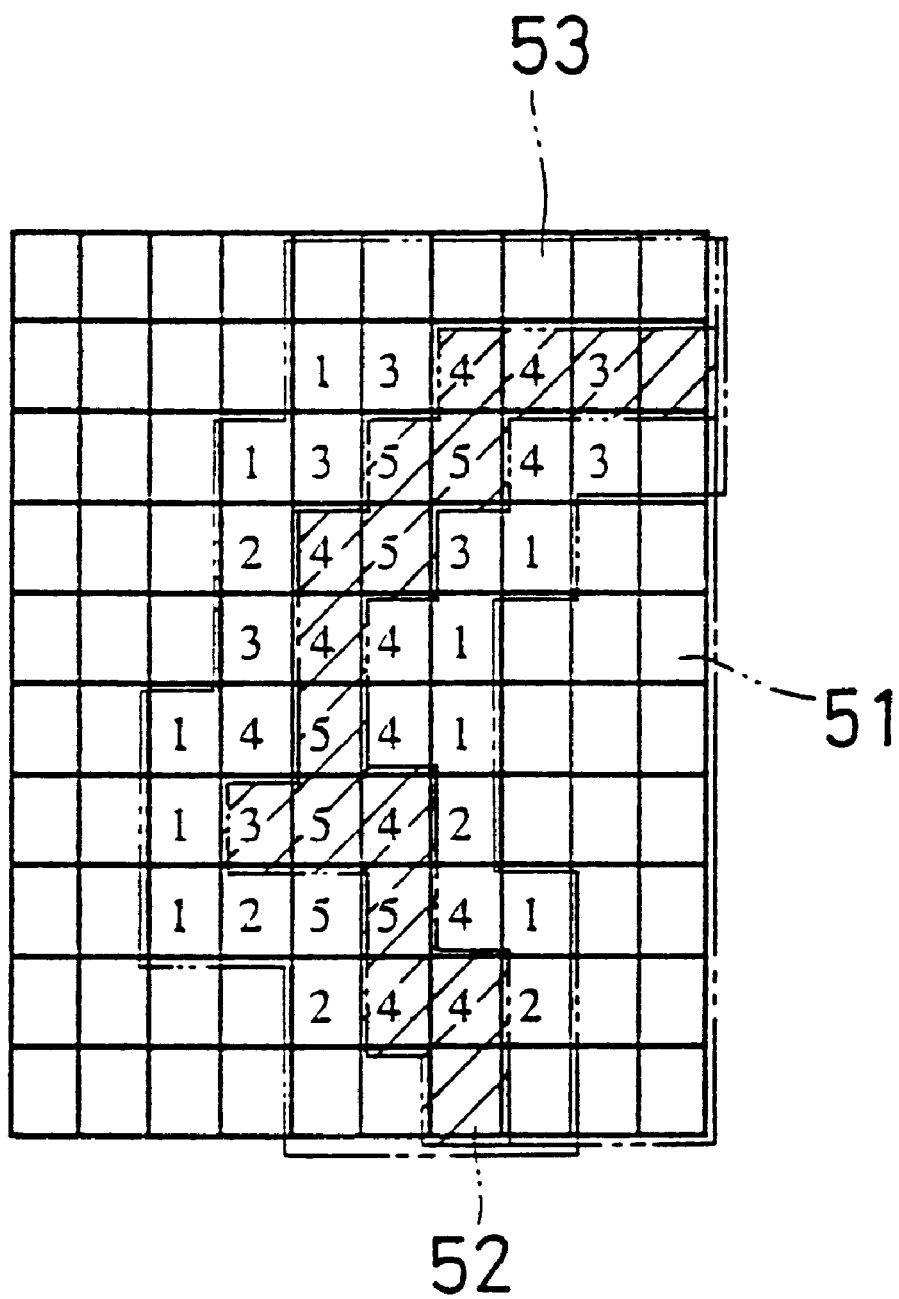
FIG. 10 is a partially enlarged view of the transformed picture 48 in FIG. 9.

FIG. 10 is a diagrammatic view showing a part of the transformed picture in FIG. 9 by enlarging it. This diagrammatic view shows the transformed picture obtained by transforming the line picture described in FIG. 7 by the transforming circuit 10. The meaning of the rectangular areas and their numerical values as well as the area 51 and the peripheral section 52 in the Figure is the same with those in FIG. 7. When FIG. 10 is compared with FIG. 7, it can be seen that among the pixels, the pixel data corresponding to each pixel in an area 53 containing the peripheral section 52 of the area 51 and straddling over the inside of the area 51 and the remaining area other than the area 51 is transformed from 0 to a value of 1 or more than 1.

It can be also seen that in the transformed picture, the values of the pixel data set of the pixels within the line memory 53 other than those in the peripheral section 52 is smaller than that of the pixel data set of the pixels in the peripheral section 52. That is, the values of the pixel data set of the pixels within the line memory 53 are inclined such that the value of the pixel data set of the pixels in the peripheral section 52 is higher than that of the pixel data set of the pixels other than those in the peripheral section 52.

The feature point extract processing in step a6 will be explained below in detail. The feature data memory 7, the feature point extract circuit 8 and the memory 9 are used in the extract processing. This extract processing is also started from the point of time when the line picture signal as shown in FIG. 6 has been stored in the feature data memory 7 after the binarization process in step a4 is ended on the reference side object picture. The feature point extract circuit 8 performs the processing described below in unit of the reference area and stores position data sets of feature point pixels obtained as a result of the process in the memory 9. The series of processes is repeated on each reference area within the reference side object picture and the process in step a6 ends at the point of time when the series of processes ends on all of the reference areas.

The feature point extract circuit 8 reads pixel data sets corresponding to all pixels within the reference area E to be processed in the line picture signal whose original object picture is the reference side object picture signal from the feature data memory 7. Because the line picture, the object picture and the transformed picture are supposed to the picture having the same pixel array, it may be considered that when the reference area and the search area are set within the object picture, a reference area and a search area are set also in the line picture and the transformed picture in the same shape and at the same relative positions with the both areas set in the object picture with respect to the reference position of each picture.

The feature point extract circuit 8 extracts either one of pixel among the pixels on the edge of the image among the pixels within the reference area of the line picture as a first feature point pixel and obtains a coordinate representing the position of that pixel. The pixel on the edge of the image is a pixel whose value of the pixel data set is 1. Next, it extracts a pixel on the edge of the image and distant from a $n^{th}$ feature point pixel by a predefined distance as a $(n+1)^{th}$ feature point pixel. Here, n is an integer which is 1 or larger and less than a predefined number. This process is repeated until finishing to extract a predefined number of feature point pixels.

The concrete extract processing on and after the second one is performed by extracting a pixel whose value of pixel data set is 1 and by performing a comparison operation of discriminating whether or not its coordinate (ax, by) satisfies an extraction condition expressed in the following Expression (5). When the extraction condition is not satisfied, the next pixel is extracted to discriminate again. The extraction and discrimination of pixels are repeated until when a pixel which satisfies the extraction condition is obtained. When the pixel satisfying the extraction condition is obtained, a coordinate thereof is stored in the memory 9.

As shown by the following expression, the extraction condition is that a difference between X coordinate an of a $n^{th}$ feature point pixel which is the latest one among the feature point pixels extracted during this extract processing and the above-mentioned X coordinate ax is greater than a predefined difference THx and a difference between Y coordinate bn of the nth feature point pixel and the above-mentioned Y coordinate by is greater than a predefined difference THy. For instance, a difference between X coordinate a1 of a first feature point pixel and X coordinate a2 of a second feature point pixel is greater than the above-mentioned difference THx and a difference between Y coordinate b1 of the first feature point pixel and Y coordinate b2 of the second feature point pixel is greater than the above-mentioned difference THy.

$$|an-ax|>THx \text{ and } |bn-by|>THy \qquad (5)$$

Table 1 shows a structure of a memory space of the memory 9. In the memory 9, a plurality of storage areas for individually storing the X coordinate and Y coordinate are set in association with each other. The coordinates of the feature point pixels are stored in those storage areas sequentially from the first feature point pixel.

TABLE 1

| X-Coordinate | Y-Coordinate |
| --- | --- |
| a1 | b1 |
| a2 | b2 |
| a3 | b3 |
| . | . |
| . | . |
| . | . |

Thus the extraction of the plurality of feature point pixels allows to prevent the feature point pixels from concentrating locally because the feature point pixels are distributed and scattered within the reference area due to the following reason. When the feature point pixels are concentrated locally and when correlation is large at the part where the feature point pixels are concentrated, though the correlation is small at part separated from that part, it cannot be recognized only by the correlation of the feature point pixels, so that even when there is a large distortion of the images in the separated part, it distortion cannot be detected by the correlation computation. It is preferable to set the feature point pixels in the whole range of the reference area to prevent it. However, because the more the feature point pixels are increased, the more an operation amount of the correlation computation increases, a processing time of the correlation computation increases. Accordingly, distributing the feature points as described above allows the distortion of the images to be reliably detected and the operation amount of the correlation computation to be lessened.

The feature point extract circuit 8 extracts the feature points after binarizing the object picture signal by the binarization circuit by using the line picture signal which is the result of that process. Because the extraction of the edge of the image is necessary as a pre-process of the line thickening process as described before, the binarization circuit 6 for that end is provided within the picture compositing unit 1. The extraction of the edge of the image for extracting the feature points and the extraction of the edge of the image for the line thickening process are totally the same process. Accordingly, the circuit structure of the picture compositing unit 1 may be simplified by using the circuit for extracting the edge of the image of the both ends in common. It is of course possible to provide the binarization circuit for extracting the feature points and the binarization circuit for the line thickening process separately. Because the processing of the reference side object picture signal and the processing of the search side object picture signal may be implemented in parallel at this time, the processing time of the whole picture compositing process may be shortened as compared to the case when the binarization circuit is used in common.

Further, it is possible to discriminate whether or not a pixel is on a point on the edge of the image at the point of time when the pixel data set of the pixel is defined by the binarization circuit 6. Accordingly, the process for extracting feature points may be implemented in parallel with the binarization process. For instance, when the pixel data set is 1 at the point of time when the pixel data set is defined, the feature point extract circuit 8 obtains the coordinate of the pixel to which that pixel data set corresponds and discriminates it based on Expression (5). When the extraction condition is satisfied, the feature point extract circuit 8 stores the coordinate of that pixel in the memory 9. When the pixel data set is 0, none of these processes are implemented. Thereby, the binarization process and the feature point extract processing may be implemented in parallel, so that the processing time of the whole picture compositing process may be shortened further.

Figure 11:
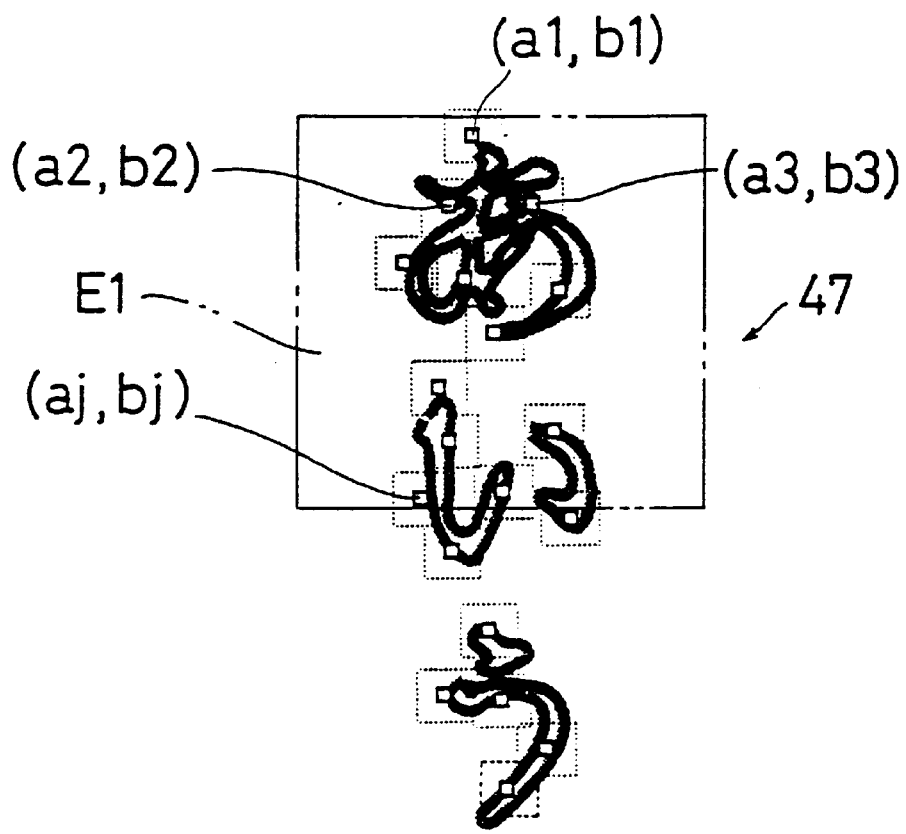
FIG. 11 is a diagrammatic view showing a positional relationship between an outline 47 and feature point pixels (a1, b1) through (aj, bj) within the transformed picture 47.

FIG. 11 is a diagrammatic view showing a positional relationship between the feature point pixels extracted by the feature point extract circuit 8 and an outline 47 of the transformed picture 45. The diagrammatic view in FIG. 11 is what the feature point pixels extracted from the reference side line picture 41 in the diagrammatic view in FIG. 6 are shown by white squares on the outline 47 of the reference side transformed picture 45 in the diagrammatic view in FIG. 9. It can be seen that the feature point pixels are discretely disposed on the thick line representing the edge of the image because they have been selected on the pixels on the thin line representing the edge o the image in the line picture. The edge of the thick line always exists within the rectangular areas containing the predefined pixels and indicated broken lines centering on those feature point pixels. This rectangular area is very narrow as compared to the reference area. Therefore, it can be seen that there are points where the gradient of changes in brightness becomes always large in the vicinity of the feature point pixels within the transformed picture.

The correlation computation process in step a7 will be explained below in detail. The operating memory 12 and the correlation operating circuit 13 are used in the correlation computation process. This correlation computation process is started from a point of time when the transformed picture has been stored in the memory 11 by ending the line thickening process in step a5 to the search side line picture signal and the coordinate of the feature point pixel has been stored in the memory by ending the feature point extract processing in step a6 to the reference side line picture signal. The feature point extract circuit 8 performs the matching process using a feature point matching method described below for each reference area to obtain a corresponding area where the correlation with that reference area becomes maximum. Information concerning to the mismatch of and distortion of the images is contained in the position of this corresponding area. The step in step a7 ends at the point of time when the series of processes have been ended for all of the reference areas.

Figure 12:
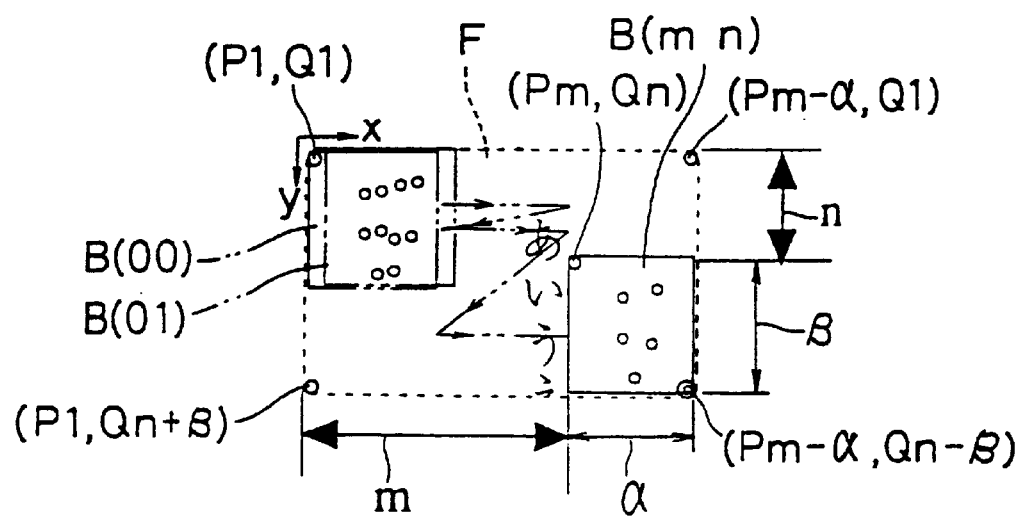
FIG. 12 is a diagrammatic view showing a state in which a reference area E and a search area F are overlapped.

FIG. 12 is a diagrammatic view for explaining the matching process using the feature point matching method. According to the feature point matching method, the correlation between each feature point pixel within the reference area E and a pixel overlapping with each feature point pixel within the search area F is found for each feature point pixel when the reference area E and the search area F are imaginarily overlapped and a sum of these correlations is found as a correlation between the reference area E and the rectangular area B(pq). The rectangular area B(pq) represents an area within the search area F overlapping with the reference area E when the reference position of the reference area E overlaps with a pixel (p, q) when the reference area E and the search area F are overlapped. p is an arbitrary integer which is P1 or more and Pm or less, q is an arbitrary integer which is Q1 or more and Qn or less, and P1, Pm, Q1 and Qn are predefined integers.

For the purpose of the explanation, suppose that the search area F is a rectangular area having pixels (P1, Q1), (Pm+α, 0), (0, Qn+β) and (Pm+α, Qn+β) as four corners thereof and the reference area E is composed of pixels of α×β disposed in β row and α column, a number of columns from P1 column to Pm column is m and a number of rows from Q1 row to Qn row is n. Assume also that the reference position of the reference area E is an apex at the upper left corner, the rectangular area B(pq) is defined such that the pixel (p, q) within the transformed picture coincides with the reference position of the reference area E and each of the feature point pixels within the reference area E are pixels (a1, b1) through (aj, bj). In this case, pixels overlapping with the respective pixels (a1, b1) through (aj, bj) are pixels (a1–p, b1–q) through (aj–p, bj–q).

The correlation between the feature point pixel (ax, by) and a pixel (ax–p, bx–q) overlapping with that feature point pixel is an absolute value of a difference between a value of a pixel data set DR (ax, by) corresponding to the feature point pixel (ax, by) in the reference side line picture signal and that of a pixel data set DS (ax–p, by–q) corresponding to the above-mentioned overlapping pixel (ax–p, by–q) in the search side transformed picture signal for example and the smaller the absolute value of the difference, the larger the correlation is. The correlation between the rectangular area B(pq) and the reference area E at this time is expressed by a sum of the above-mentioned differences found on all of the feature point pixels (a1, b1) through (aj, bj) as shown by the following expression. Accordingly, the smaller the sum, the larger the correlation of the both areas E and B(pq) also is.

$$\text{Correlation} = |DR(a1, b1) - DS(a1-p, b1-q)| + |DR(a2, b2) - DS(a2-p, b2-q)| + |DR(aj, bj) - DS(aj-p, bj-q)| \qquad (6)$$

The correlation operating circuit 13 performs this correlation computation by a plurality of times while sequentially changing the position where the reference area E is overlapped within the search area F. The position where the reference area E is overlapped is moved, as shown in FIG. 12, by moving a pixel to which the reference position of the reference area E is overlapped sequentially per pixel within the search area F by setting the x-direction as the main scan direction and the y-direction as the sub-scan direction. At this time, because the reference position of the reference area E is set so that it coincides individually with the pixels (P1, Q1) through (Pm, Qn), m×n rectangular areas B(00) through B(mn) are set within the search area F and the correlation between the reference area E and each of these rectangular areas B(00) through B(mn) is found individually. A rectangular area when the correlation becomes maximum among the correlations between the both areas E and B(pq) is set as an object area G of the reference area E and its position is obtained.

Figure 13:
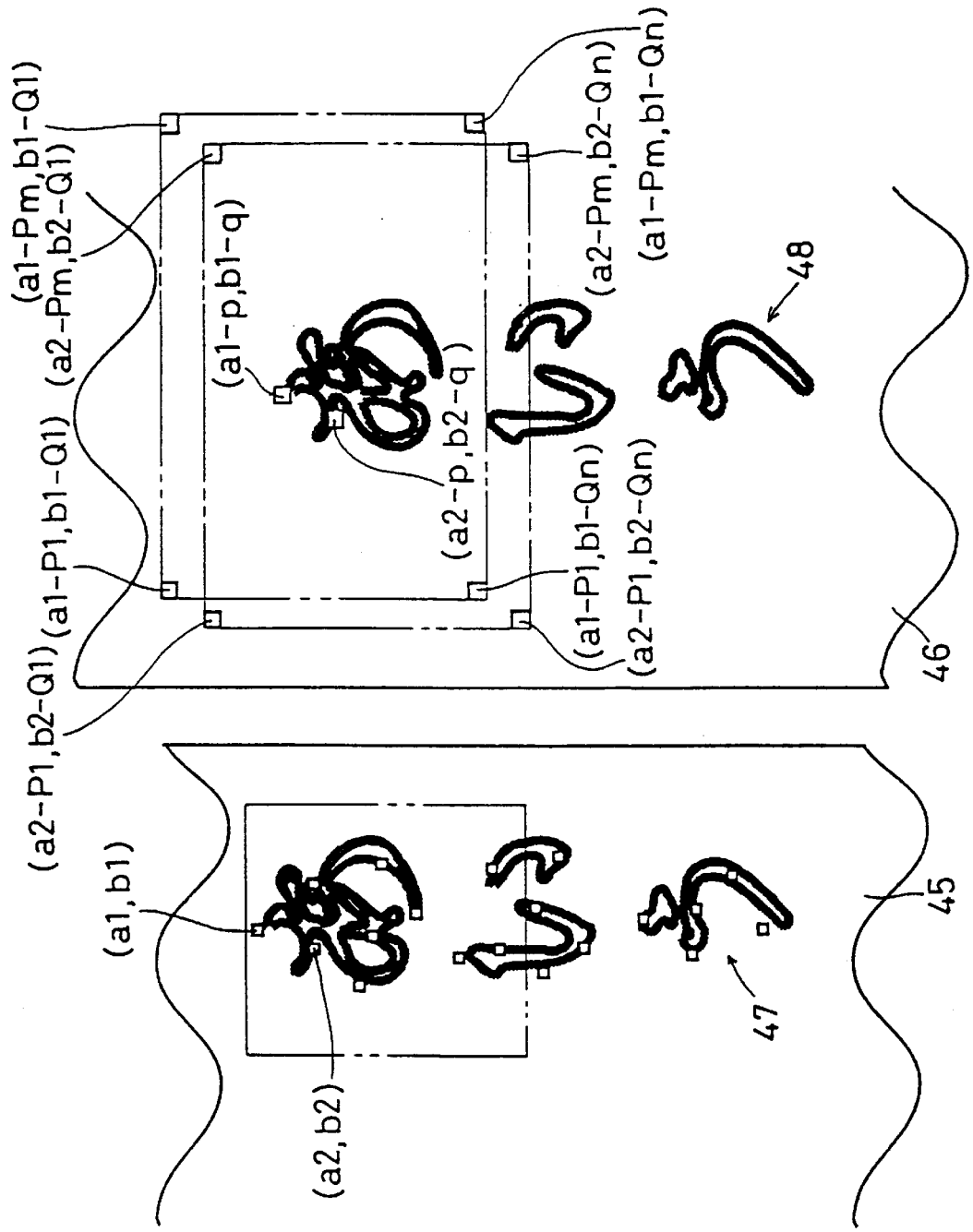
FIG. 13 is a diagrammatic view showing pixels whose correlation with the feature point pixels (a1, b1) and (a2, b2) are found.

By the series of correlation computation, the correlation between the feature point pixel (a1, b1) within the reference area E and each pixel within the rectangular area having pixels (a1–P1, b1–Q1), (a1–P1, b1–Qn), (a1–Pm, b1–Q1) and (a1–Pm, b1–Qn) as four corners thereof within the search area F is computed individually as shown in FIG. 13. Similarly to that, the correlation between the feature point pixel (a2, b2) within the reference area E and each pixel within the rectangular area having pixels (a2–P1, b2–Q1), (a2–Pm, b2–Q1), (a2–P1, b2–Qn) and (a2–Pm, b2–Qn) as four corners thereof within the search area F is computed individually as shown in FIG. 13.

At this time, the transformed picture signal is used for the correlation computation. Therefore, even when the images representing the same subject are not congruent due to the distortion of the images, the correlation of the both areas E and B(pq) is minimized when the reference area E is superimposed at the position offsetting the mismatch of the images. The reason and effect thereof will be explained in detail by using FIGS. 14A through 14C.

Figure 14A:
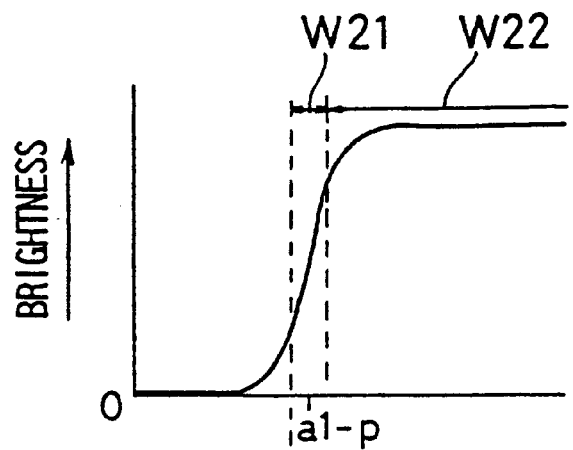
FIG. 14A is a graph showing changes in brightness of a row within the object picture 22.
Figure 14B:
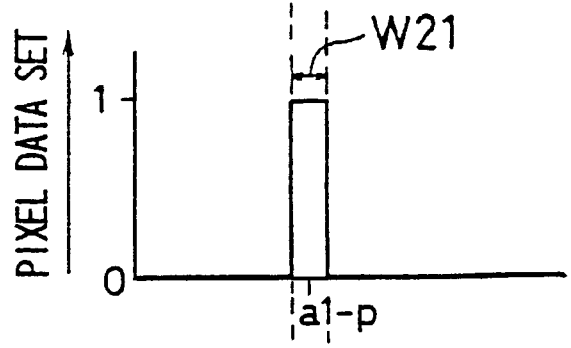
FIG. 14B is a graph showing changes in pixel data of a row within the line picture 42.

FIG. 14A shows a relationship between brightness of a pixel within a row containing a pixel (a1–p, b1–q) and x-coordinate of that pixel within the search area F of the object picture 22. In this row, because brightness of a pixel whose x-coordinate is larger than the pixel whose x-coordinate is a1–p is maximum and brightness of a pixel whose x-coordinate is smaller than the x-coordinate of the pixel is minimum, the brightness sharply changes in the vicinity of that pixel. Therefore, a line picture signal representing the edge of the image by the thin line having a predefined width centering on the pixel (a1–p, b1–q) may be obtained by binarizing the object picture signal representing the object picture 22. In the above-mentioned row within the search area F in the line picture 42 represented by this line picture signal, only the pixel data set of pixels in the vicinity of the pixel (a1–p, b1–q) are 1 and the pixel data set of the other pixels is 0 as shown in FIG. 14B. Because the larger the gradient of changes in brightness in the changes of brightness of the pixel shown in FIG. 14A, the clearer the edge of the image is, the correlation may be reliably found by the feature point matching method. In this case, the width of the line of the line picture 22 corresponds to a range W21 where the pixels whose pixel data set is 1 exist within that row. This range W21 is extremely narrow as compared to a width W22 of the image.

Because the images representing the same subject are contained in the reference area E and the search area F, it is necessary to find an overlapping state in which those images overlap and to obtain the rectangular area B(pq) at that time as a corresponding area G in order to detect the mismatch of the images and distortion. The correlation of the both areas E and B(pq) is minimized when a pixel overlapping with each feature point pixel is a corresponding point pixel representing the same subject portion represented by each feature point pixel in the image representing the same subject among all pixels within the search area F.

When the images representing the same subject has the distortion of the images due to the reason described in the explanation of the prior art technology, the images 23 and 24 representing the same subject in the object pictures 21 and 22 are not congruent, so that the outlines 43 and 44 of the line pictures 41 and 42 are not congruent. Therefore, even when the reference area and the search area are overlapped so that one feature point pixel overlaps with a corresponding point pixel of that feature point pixel in finding the correlation between the feature point pixel and the overlapping pixel by using the line picture signal like the prior art technology, the other feature point pixel may not overlap a corresponding point pixel of that feature point pixel and may deviate out of the range W21.

The correlation between the pixel overlapping with the other feature point pixel and the other feature point pixel at this time is 1 because the pixel data set of the other feature point pixel is 1 and the overlapping pixel is a pixel out of the range W21 and its pixel data set is 0. The more the feature point pixels which do not overlap with the corresponding point pixels as described above, the larger the sum of the correlations between both pixels becomes. Accordingly, the correlation between the both areas becomes large. Because the range W21 where the pixel data is 1 is extremely narrow and the above-mentioned problem is liable to occur even when the distortion of the images is small as described before, it has been difficult to detect the mismatch of the images by the correlation when the images representing the same subject are not congruent in the object pictures 21 and 22. In particular, when the object pictures 21 and 22 are pictures composited from a plurality of original pictures, this problem is liable to occur because the distortion of the images readily occurs due to unintentional movement of the hand in shooting the subject and depending on how to move the image pickup device.

Figure 14C:
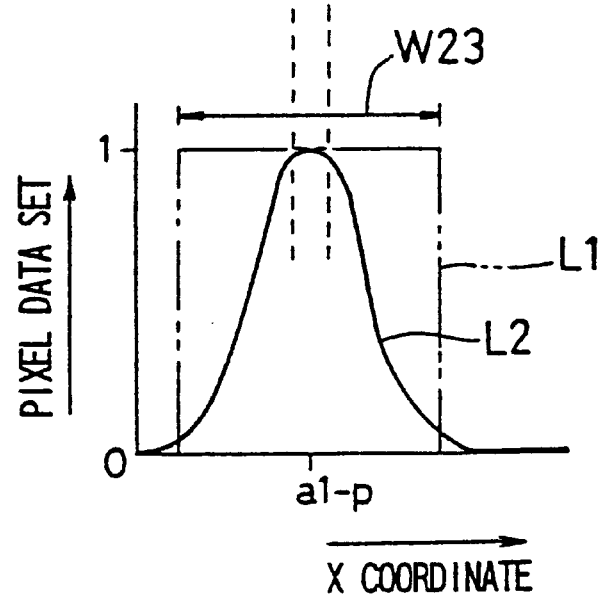
FIG. 14C is a graph showing changes in pixel data of a row within the transformed picture 46.

In the picture compositing unit 1 of the first embodiment, a transformed picture signal is used instead of a line picture signal for the correlation computation. For instance, a transformed picture signal as shown in FIG. 14C can be obtained by transforming the line picture signal representing a line picture in FIG. 14B. A two-dot chain line L1 represents a transformed picture signal of a first case when the transformation is performed by replacing the pixel data set of pixels in the area containing the thin line in the original line picture to 1 by the transforming circuit 10 and a solid line 2 represents a transformed picture signal of a second case when the aforementioned binary-multi-value transformation is performed by the transforming circuit 10.

As for the transformed picture signal in the first case, the pixel data set of pixels in a range W23 containing the pixel (a1–p, b1–q) is 1 and the pixel data set of the other pixels is 0 in the above-mentioned row in the transformed picture. The range W23 corresponds to the width of the line of the transformed picture and is fully wide as compared to the range W21. Thereby, even when the feature point pixel does not overlap with its corresponding point pixel due to the above-mentioned distortion of the images, the overlapping pixel is contained within the range W23 when a distance between the overlapping pixel and the corresponding point pixel is small within the search area. At this time, because brightness data of the overlapping pixel is not 0, the correlation between the feature point pixel and the overlapping pixel is larger than the correlation when found by using line picture signals.

For instance, when the images representing the same subject are not congruent in the reference area E and the search area F due to the distortion of the images, the images representing the same subject almost overlap and the other feature point pixels do not overlap their corresponding point pixels due to only the distortion of the images in the reference area E and the search area F in a first state where one feature point pixel is overlapped with its corresponding point pixel. The pixel overlapping with the feature point pixel is supposed to be a pixel in the vicinity of that feature point pixel and to be contained in the range W23. At this time, the correlation between the feature point pixel and the overlapping pixel becomes larger than the correlation when the overlapping pixel is a pixel out of the range W23. Therefore, the correlation between the both areas of this case is close to the correlation when the images representing the same subject are congruent even when all of the feature point pixels do not overlap with their corresponding point pixels.

Meanwhile, in a second state in which all of the feature point pixels do not overlap the corresponding pixels when the images representing the same subject are not congruent, the reference area and the search area are superimposed so that the images representing the same subject themselves shift. The pixels overlapping with the respective feature point pixels are separated considerably from the pixels corresponding to the feature points and most of them are supposed to be not contained in the range W23. Therefore, the correlation between the respective both pixels is fully smaller than the correlation in the first state. Accordingly, the correlation between both the areas in the second case is fully smaller than the correlation in the first state.

Therefore, when the matching technique of the present embodiment is used, the correlation between the reference area E and the search area F when their overlapping state is in the first state is minimized. Then, the rectangular area B(pq) at this time is obtained as the corresponding area G. Therefore, the mismatch of the images found from the position of this corresponding area G includes less error caused by the distortion of the images. Thus, the matching method of the present embodiment allows the mismatch detecting error to be reduced by using the feature point matching technique which allows a speed of computation to be increased.

When the correlation computation is performed by using the transformed picture signal of the first case and when an overlapping state in which the overlapping pixels are contained in the range W23 when the reference area E and the search area F are superimposed occurs by a plurality of times, the correlation between the feature point pixel and the overlapping pixel is equal even in any overlapping state regardless of the distance between the overlapping pixel and the corresponding point pixel because any pixels within the range W23 have the equal pixel data. At this time, it is difficult to determine from the correlation between the both areas that which overlapping state among those overlapping states is the state in which the mismatch in overlapping the images representing the same subject is minimum. When the correlation computation is performed by using the transformed picture signal of the second case at this time, this determination can be made due to the following reason.

In the transformed picture signal of the second case, the pixel data set of the pixel within the range W23 is larger than the pixel data set of the pixels out of the range W23 and the closer to the corresponding point pixel, the larger it is and the further from the corresponding point pixel, the smaller it is. When the correlation computation between the feature point pixel and its overlapping pixel is found by using such transformed picture signal, the correlation computation between the feature point pixel and the pixel overlapping to the feature point pixel is large when the overlapping pixel is a pixel within the range W23 and is closer to the corresponding point pixel. Thereby, the correlation between the both areas in the overlapping state in which the corresponding point pixel overlaps with the feature point pixel becomes larger than the correlation between the both areas in the overlapping state in which a pixel in the vicinity of the corresponding point pixel overlaps with the feature point pixel. Accordingly, when the overlapping state in which the pixel within the range W23 overlaps with the feature point pixel occurs by a plurality of times, an overlapping state in which the distance between the overlapping pixel and the corresponding point pixel is the shortest, i.e. an overlapping state in which the images in the reference area and the search area coincide the most, can be readily selected based on the correlation.

Further, when the correlation is found by using the transformed picture signal of the second case and the transformed picture signal has been replaced to a number of pixels whose value of pixel data set is 1, it is preferable to change the value of pixel data set of the feature point pixel to a maximum value among values of all pixel data sets of the search area in advance. Thereby, a difference between the pixel data set whose value is maximum in the transformed picture signal and the pixel data set of the feature point pixel becomes 0. Accordingly, the pixel whose correlation is maximum can be found by the same process of replacing the value of the pixel data set by an average value by replacing the value of the pixel data set of the feature point pixel.

The compositing process in step a8 will be explained below in detail in succession to the matching process explained by exemplifying those in FIGS. 3 through 13.

The picture memory 4 and the composition processing section 14 are used in the compositing process. This compositing process is started from a point of time when the positions of the corresponding areas G1 through Gi corresponding to the respective reference areas E1 through Ei have been obtained after ending all of the correlation computation processes on the respective reference areas E1 through Ei. The feature point extract circuit 8 performs the picture deforming process for correcting the distortion of the images and the compositing process for compositing a pair of object picture signals at the same time.

FIG. 15 is a diagrammatic view showing a positional relationship between the reference areas E1 and E2 within the object picture 21 and a positional relationship between the corresponding areas G1 and G2 within the object picture 22 at the point of time when the correlation computation process has ended. The reference areas E1 through Ei are disposed such that the center points ce1 through cei thereof are arrayed on the reference axial line h1 as set in Step a3 within the object picture 21. The corresponding areas G1 through Gi are arrayed within the object picture 22 in the same order with that of the reference areas E1 through Ei. When each of the center points cg1 through cgi of the corresponding areas G1 through Gi are connected among the adjoining center points one after another by line segments, a broken line in which each of the center points cg1 through cgi constitute points of change is formed by those line segments. For instance, the line segment connecting the center points cg1 and cg2 of the corresponding areas G1 and G2 does not coincide with a straight line which passes through the center point cg1 and is parallel to the y-coordinate axis of the object picture 22. While the corresponding areas G1 through Gi have been obtained by the correlation computation process using the positional data set of the feature point pixel and the transformed picture signal, the relative position of the corresponding area G corresponding to the reference position within the transformed picture 46 is equal to the relative position of the corresponding area G corresponding to the reference position within the object picture 22 because the array of pixels is equal in the transformed picture 46 and in the object picture 22. Therefore, the position of the corresponding area within the object picture 22 may be readily found.

A difference between the relative position of the center point ce of one reference area E among the reference areas E1 through Ei to the reference position of the object picture 21 and the relative position of the center point cg of the corresponding area G corresponding to that reference area E to the reference position of the object picture 22 corresponds to the mismatch of the images of the object pictures 21 and 22. When there is no distortion of the images, the images representing the same subject in the object pictures 21 and 22 overlap when the object pictures 21 and 22 are overlapped so that the mismatch of the images is offset and so that the x-coordinate axes and the y-coordinate axes of the respective object pictures 21 and 22 become parallel, respectively.

When there is a distortion in the images representing the same subject in the object pictures 21 and 22 and when the object pictures 21 and 22 are overlapped so that a center point ce of one reference area E overlaps with a center point cg of a corresponding area G corresponding to that reference area E, center points ce of the other reference areas E do not overlap center points cg of corresponding areas G corresponding to those reference areas E. A difference between position of pixels within the object picture 22 overlapping with the center points ce of the other reference areas E and position of the center points cg of the corresponding areas G corresponding to those reference areas E corresponds to the imaginal distortion. For instance, when the object pictures 21 and 22 are overlapped so that the center point ce1 of the reference area E1 overlaps with the center point cg1 of the corresponding area G1, a center point ce2 of a reference area E2 does not overlap with a center point cg2 of a corresponding area G2. In this case, a point 56 which overlaps the center point ce1 of the reference area is located on the straight line which passes through the center point cg1 and is parallel to the y-coordinate axis. In this case, although the images representing the same subject overlap roughly, their details are shifted.

When the object pictures 21 and 22 are to be overlapped so that the center point ce1 of the reference area E1 overlaps the center point cg1 of the corresponding area G1 for example, the search side object picture signal is geometrically transformed so that the center points ce2 through cei of the other reference areas E2 through Ei other than the reference area E1 coincide all with the center points cg2 through cgi of the corresponding areas G2 through Gi in the picture deforming process. In outline, a quadrilateral area having apex of the center points cg of two adjacent corresponding areas G and sectioned by two line segments having those center points cg as one end thereof, an edge 57 and a line segment having the center points cg as both ends thereof is extracted from the object picture 22. Then, this area is deformed so that it turns out to be a rectangular area and the coordinates of the typical points of the object picture 22 is transformed corresponding to that deformation. The typical point is a center point of that pixel and is disposed in a matrix within the object pictures 21 and 22.

The above-mentioned geometrical transformation method will be explained below by exemplifying a trapezoidal area 60. The trapezoidal area 60 is an area which has apexes of the center points cg1 and cg2 and in which edges 61 and 62 parallel to the x-coordinate axis and having the center points cg1 and cg2 as one end thereof, respectively, are parallel. A line segment having the both center points cg1 and cg2 as its both ends is an edge 63 of the trapezoidal area 60 and a portion of the left edge 57 of the object picture 22 sectioned by the edges 61 and 62 is an edge 64 of the trapezoidal area 60. The edges 61 and 62 are parallel to the x-coordinate axis and cross at right angles with a reference axial line h2 which is set near the left edge 57 in parallel to the y-coordinate axis. Intersections of the edges 61 and 62 with the reference axial line h2 will be denoted as points ch1 and ch2.

At first, with respect to the y direction, the trapezoidal area 60 is transformed by a uniform rate of transformation at any position in the x direction. As shown by the following expression, this rate of transformation is a quotient obtained by dividing a difference of the center points ce1 and ce2 of the reference areas E1 and E2 in the y-coordinate by a difference W11 of the center points cg1 and cg2 of the corresponding areas G1 and G2 in the y-coordinate.

(Rate of Transformation in y direction)=$W12 \div W11$    (7)

Further, it can be seen from FIG. 15 that the edge 63 of the trapezoidal area 60 is different from the line segment 66 having the center points ce1 and ce2 of the reference areas E1 and E2 as its both ends with respect to their length of line segment and to their angle to the y-coordinate axis. Accordingly, the trapezoidal area 60 is transformed with respect to the x direction with a rate of transformation which continuously changes as the y coordinate changes based on the reference axial line h2. For instance, the rate of transformation in the x direction on an imaginary line which passes between the center points cg1 and cg2 and is parallel to the x-coordinate axis is a quotient obtained by dividing a distance W13 between the center point ce when the object pictures 21 and 22 are superimposes so that the center point cg1 overlaps with the center point ce1 and the x and y-coordinate axes are parallel, respectively, by a distance W14 between the edge 63 and the reference axial line h2 on the imaginary line 67 as shown by the following expression. Thus, the rate of transformation of the area in the x direction is defined per every imaginary line set by a predefined interval which is shorter than the interval between the center points cg1 and cg2. When the trapezoidal area 60 is transformed by such rate of transformation, the edge 63 of the trapezoidal area 60 becomes an edge whose length is equal with the line segment 66 and which crosses at right angles with the edge 61 and 62.

(Rate of Transformation in x direction)=$W13 \div W14$    (8)

When the trapezoidal area 60 is transformed by the above-mentioned procedure, the trapezoidal area 60 turns out to be a rectangular area as shown in FIG. 15C in which length of the edge parallel to the x-coordinate axis is equal to the distance W13 and length of the edge parallel to the y-coordinate axis is equal to the distance W12. The coordinate of typical point of each pixel is converted such that the interval between two typical points adjacent in the x and y directions is reduced or enlarged with the above-mentioned rate of transformation in the x and y directions. Accordingly, the position of each typical point in the x and y directions is moved sequentially by the transformed interval.

Such geometrical transformation process is performed sequentially by changing the combination of the center points cg which become the apex from the center points cg2 and cg3 to the center points cg(i−1) and cgi. Further, the areas above the center point cg1 and below the center point cgi are deformed further by using the rate of transformation defined in the geometrical transformation process of the trapezoidal area adjacent to those areas. Thereby, the area on the right side of the broken line which passes through the center points cg1 through cgi in the object picture 22 is transformed into an area composed of the above-mentioned rectangular areas sequentially arrayed. The left side of this transformed area is a straight line. The distortion of the image within the object picture 22 representing the same subject as the image in the object picture 21 is offset by transforming the object picture 22 geometrically as described above. Thereby, the images representing the same subject within the object pictures 21 and 22 become congruent.

The above-mentioned reference axial line h2 may be set at any area within the object picture 22 as long as it is an area on the opposite side from the edge of the picture on the side where the search area F is set from the line segment connecting the center points cg of the corresponding areas G. The reference axial line h2 coincides with the edge of the object picture 22 on the opposite side from the side where the search area is set for example. Further, it coincides with a center axial line of the object picture 22 in the x direction. Still more, it may coincide with a reference axial line h1 in setting reference areas when another object picture is to be composited in the object picture 22. Because the rate of transformation in the x direction is defined as described above in the picture geometrical transforming process when the reference axial line h1 is made to coincide with the reference axial line h2, pixels on the reference axial line h2 are arrayed linearly on the same reference axial line h2 even after the geometrical transformation. It facilitates computation processing of a correlation computation process in a picture compositing process in compositing another object picture with the composite picture obtained by compositing the object pictures 21 and 22.

The deformed area of the object picture 22 is overlapped with the object picture 21 so that the left apex of each rectangular area overlaps with the center point ce and so that the x and y-coordinate axes of the object pictures 21 and 22 become parallel, respectively. After that, a composite picture signal may be produced by applying the brightness data set of the object picture 22 to the brightness data set of the pixels on the right side of a border, i.e. the straight line passing through the center points ce1 through cei for example and by applying the brightness data set of the object picture 21 to the brightness data set of the pixels on the left side of the border.

Further, the composite picture is composed of pixels whose typical points are lattice points of an xy orthogonal coordinate system set in the object picture 21 for example. At this time, the coordinate of the typical points in the object picture 22 often deviate from the lattice points of the xy orthogonal coordinate system set in the object picture 21 due to the above-mentioned geometrical transformation. Pixel value of the pixels in the composite picture is decided based on the following decision technique. This pixel value deciding operation is performed in parallel with the operation of the above-mentioned picture geometrical transformation.

When the typical points of pixels of the object pictures 21 and 22 coincide with lattice points within all pixels of the composite picture, brightness data set of the object pictures 21 and 22 corresponding to that typical point is used as brightness data set of that pixel of the composite picture as it is. When the lattice points of the composite picture do not coincide with the typical points of the object pictures 21 and 22, the brightness data set of the pixel of the composite picture is decided by interpolating by using a so-called linear interpolation from pixel values of typical points of a plurality of pixels in the vicinity of that lattice point within the object pictures 21 and 22. In the linear interpolation, an average value of values obtained by multiplying pixel values of typical points of pixels at four places around the lattice point by a coefficient corresponding to a distance between the lattice point and each typical point is used as the brightness data set of the pixel at the lattice point. The composite picture signal is composed of a plurality of brightness data sets thus defined.

The composite picture signal is produced by such series of detailed processes. Because the images representing the same subject in the transformed object pictures 21 and 22 become congruent by superimposing and compositing the object picture 22 after deformed, the images coincide completely at the part corresponding to the border of the object pictures 21 and 22 within the composite picture. Accordingly, the composite picture in which the joint of the pictures is inconspicuous can be obtained.

Further, it is possible to set the generated composite picture as a new object picture and to composite this new object picture with a picture obtained by the image pickup device by the above-mentioned picture compositing process. That is, it is possible to obtain the composite picture by arraying a plurality of object pictures in a row while overlapping parts of them and by compositing them by performing the matching process individually with the adjacent original picture. Thereby, the number of pixels of the composite picture becomes more than the number of pixels of the object picture. Accordingly, a picture whose angle or range is wider than the object picture can be obtained. Further, it is possible to obtain a picture whose resolution is higher than that of the object picture by making the size of the composite picture to coincide with that of the object pictures.

The matching process for finding the mismatch and distortion of the image is performed by the process of the feature point matching method using the transformed picture signal in this picture compositing process as shown in step a3 through 7. It allows the processing amount required for the matching process to be reduced and the matching accuracy to be increased as compared to the matching process of the prior art picture compositing apparatus using the block matching method. Accordingly, when each circuit of this picture compositing apparatus is realized by an operation circuit having the equal operating speed with the prior art picture compositing apparatus, the processing time of the matching process can be reduced more than the prior art picture compositing apparatus. Therefore, it can be performed in parallel with the operation for shooting a subject by the image pickup section within the picture intake unit 3 for example. That is, a so-called real-time processing can be performed. Further, because each circuit performing the real-time processing can be realized by the operation circuit having the equal operating speed with the prior art picture compositing apparatus, the inventive picture compositing apparatus can be manufactured costly by using the general purpose operation circuits.

Partial pictures in which a difference between light and darkness is large, i.e. edges of images are clear, are suitable as the object pictures 21 and 22 for the picture compositing unit 1. A picture containing characters may be cited as such a picture. Further, even a landscape picture in which a boarder between the sky and a building can be an edge may be the object picture. Further, it is possible to insert a positioning image which has nothing to do with an image of a subject within an object picture to use that image to detect a mismatch and distortion of the image of the picture when the object picture signal is to be produced by the picture intake unit 3. It is preferable to use an image whose edge appears clearly, e.g. characters and numerals, as this positioning image. The positioning images having the same image are inserted automatically at predefined positions within the object picture, e.g. in the vicinity of four corners. The positioning image may be also inserted at a location where images are matched by displaying the object pictures 21 and 22 on a personal computer for example before starting the picture compositing process.

A picture compositing apparatus according to a second embodiment of the inventive picture processing apparatus will be explained below. The picture compositing apparatus of the second embodiment is the same as the picture compositing unit 1 of the first embodiment except of that processing methods of the picture intake unit and the composition processing circuit are different. The components of the picture compositing unit of the second embodiment which perform the same operations with those of the picture compositing unit of the first embodiment will be denoted by the same reference numerals and an explanation of their operation and effects will be omitted here.

Figure 16A:
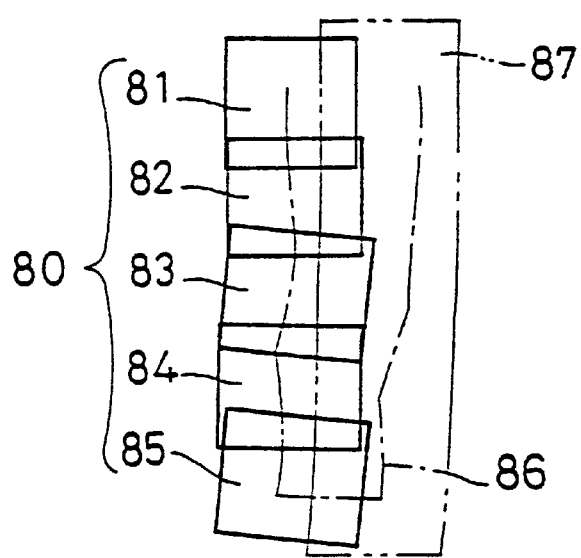
FIGS. 16A and 16B are diagrammatic views showing object pictures 80 and 90 represented by object picture signals obtained by a picture intake unit within a picture compositing unit of a second embodiment.
Figure 16B:
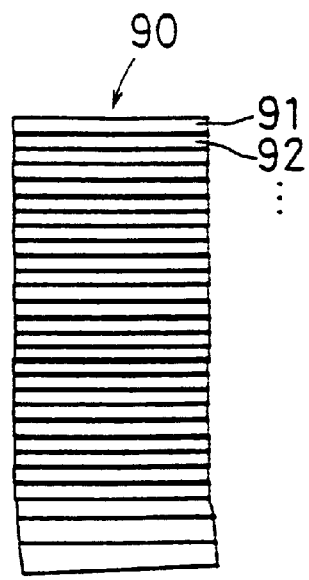

A behavior of the picture intake unit will be explained below. An object picture of the picture intake unit is a picture obtained by compositing original pictures, which have been obtained by shooting a subject by the image pickup section 3a, by the initial compositing section 3b. FIG. 16A shows an object picture 80 obtained when the image pickup device is a two-dimensional image pickup device. FIG. 16B shows an object picture 90 which is obtained when the image pickup device is a one-dimensional image pickup device. In the object pictures 80 and 90, right and left edges and upper and lower edges are not parallel and each edge is not straight. Therefore, a point on the upper edge or a point on an extension line of the upper edge of the object pictures 80 and 90 is set as an origin and based on that origin, an xy coordinate system is set. Thereby, the object pictures 80 and 90 can be handled in the same manner as the object pictures 21 and 22 of the first embodiment.

A method for generating the object picture 80 will be explained below. Here, the image pickup section 3a comprises the two-dimensional image pickup device and is realized by an electronic still imaging apparatus for example. An operator thereof holds the image pickup section 3a by hands at the position separated from the surface of a subject 11 by a predetermined distance, sets a moving direction and moving distance of a shootable range so that part of the subject which has been shot is included in part of the shootable range by visually watching a finder of the image-pickup section or a picture within a display for visually displaying a picture which can be obtained at present and moves the image pickup section 3a so that the shootable range moves in the moving direction by the moving distance. At this time, the shootable range is moved such that its center point draws a locus 86 of shape of "コ" on the subject for example. The image pickup section 3a may be moved by using a machine for moving it beside moving it manually by hands as long as the above-mentioned conditions are met. The image pickup section 3a shoots the subject within the shootable range per predefined time for example and generates and outputs an original picture signal. The original picture signal represents an original picture containing an image representing the subject existing within the shootable range when shooting it. The number of pixels of the original picture is equal to the number of photo-receiving areas on an image forming face of the image pickup device and an array of pixels is analogous to an array of the photo-receiving areas. When these original pictures are superimposed and arranged so that the images of the same subject overlap, the original pictures are disposed in a matrix while overlapping two adjacent original pictures with each other.

Original picture signals to be composited of the initial compositing section 3b are the plurality of original picture signals obtained while moving the shootable range continuously only in one direction. The original picture signals to be composited correspond to those representing the original pictures 81 through 85 which compose certain rows or certain columns among all original pictures disposed in a matrix. At first, the initial compositing section 3b finds a mismatch of the images of the original picture per pair of original picture signals containing the images representing the same subject among the original picture signals to be composited. The matching method explained in the first embodiment for example is used for detecting this mismatch. Or, another matching method may be used. This mismatch coincides with the moving distance and moving direction of the shootable range of the image pickup section 3a when the original picture signal is generated. Then, the initial compositing section 3b composites the original picture signals to be composited so that the original pictures are superimposed so that the mismatch of the image is offset for every pair of original picture signals. Thereby, an object picture signal representing the object picture 80 can be obtained.

An object picture 87 can be obtained by compositing the other original picture signals among the plurality of original picture signals by the same method. When the original pictures 81 through 85 composing the object picture 80 and the original picture composing the object picture 87 are prepared in advance so that the same images representing the same subject in those adjacent to each other among them, the relationship between the object picture 80 and the object picture 87 is equivalent to that of the object pictures 21 and 22 explained in the first embodiment.

A method for generating the object picture 90 will be explained below. The image pickup section 3a comprises the one-dimensional image pickup device and is realized by a hand scanner for example. In this case, the operator shoots the subject periodically while moving the image pickup section 3a, while in contact with the surface of the subject, in the direction orthogonal to the array direction of the photo-receiving areas of the image pickup device. Thereby, the image pickup section 3a produces a plurality of original picture signals representing the original pictures in which pixels are arrayed linearly. The initial compositing section 3b composites the original picture signals so that the array directions of pixels are paralleled, respectively, the center point of the original picture coincides with the locus of the image pickup section 3a and each of the original pictures is arranged sequentially in the order of shooting. Thereby, the object picture 90 can be obtained.

Figure 17:
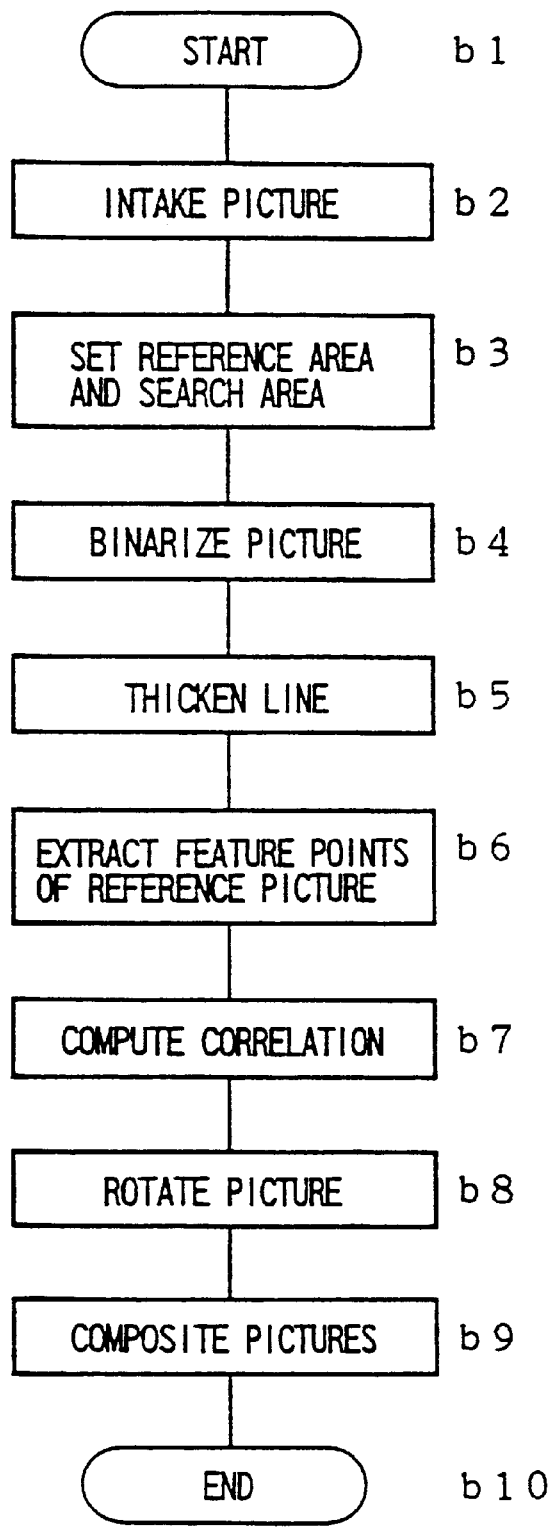
FIG. 17 is a flowchart for explaining a picture compositing process of the picture compositing unit of the second embodiment.

FIG. 17 is a flowchart for explaining in outline a picture compositing operation performed by the picture compositing unit of the present embodiment. While this picture compositing operation includes Steps for performing the same operations as those in the flowchart in FIG. 2, an explanation of those steps will be omitted here.

Figure 18:
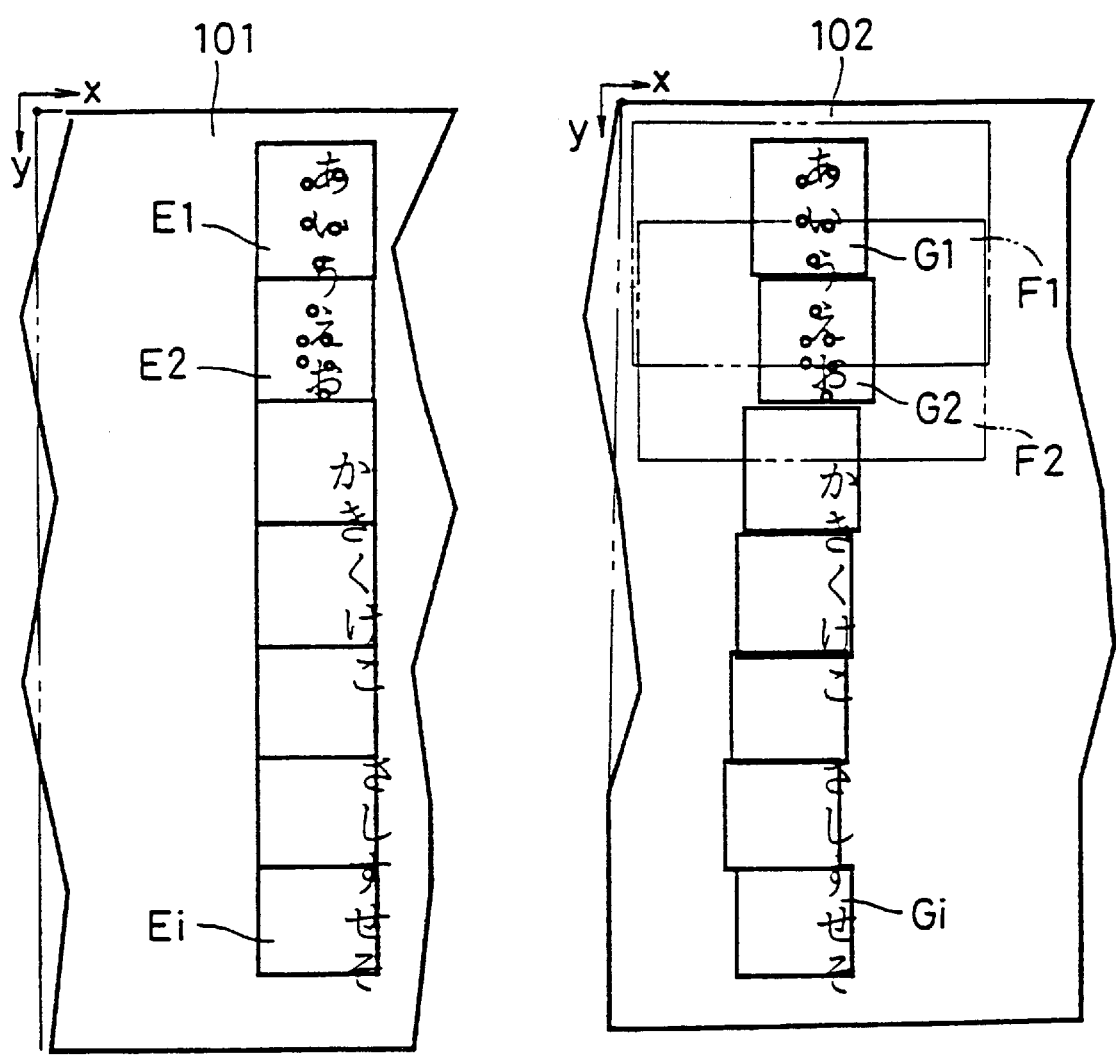
FIG. 18 is a diagrammatic view showing object pictures 101 and 102 represented by a pair of object picture signals, a positional relationship among the reference areas E1 through Ei within the object picture 21 and a positional relationship among the corresponding areas G1 through Gi within the object picture 22.

When it is instructed to start the picture compositing operation, the process advances from step b1 to step b2. In step b2, the picture intake unit obtains object picture signals representing a pair of object pictures 101 and 102 by the method described above. Next, the matching processes in steps b3 through b7 are performed. The detail of the matching processes is the same as that of the processes in steps a3 through a7. Thereby, corresponding areas G1 through Gi which individually correspond to the reference areas E1 through Ei as shown in FIG. 18 for example. White circles within the reference areas E1 and E2 denote feature point pixels and white circles in the corresponding areas G1 and G2 denote corresponding point pixels. It can be seen from them that the distribution of the feature point pixels within the reference areas E1 and E2 is equal to the distribution of the corresponding point pixels within the corresponding areas G1 and G2. That is, the rectangular area in which the correlation is minimum within the search areas F1 and F2 is an area in which the distribution of the corresponding point pixels is equal on the basis of the frame of the rectangular area.

In succession, the composition processing circuit finds an angle of rotation of the object pictures 101 and 102 and rotationally transforms the object picture signals so as to cancel the angle of rotation in step b8. Next, the composition processing circuit performs the picture deforming process and the compositing process in step b9 by using the same method in step a8 in FIG. 2 and ends the picture compositing process in step b9.

The rotational transforming process in step b8 is performed by the following reason. There is a case when the direction in which the image pickup section 3a is moved to obtain the original picture which turns out to be the transforming circuit 101 is not parallel with the direction in which the image pickup section 3a is moved to obtain the original picture which turns out to be the transforming circuit 102 in obtaining the object pictures by the picture intake unit described above. In addition to the mismatch and distortion of the images, the object pictures 101 and 102 obtained at this time contain an inclination of the images. An angle between the center axial line and the y-coordinate axis of the images representing the same subject differs in the object pictures 101 and 102 containing the inclination of the images.

Figure 19:
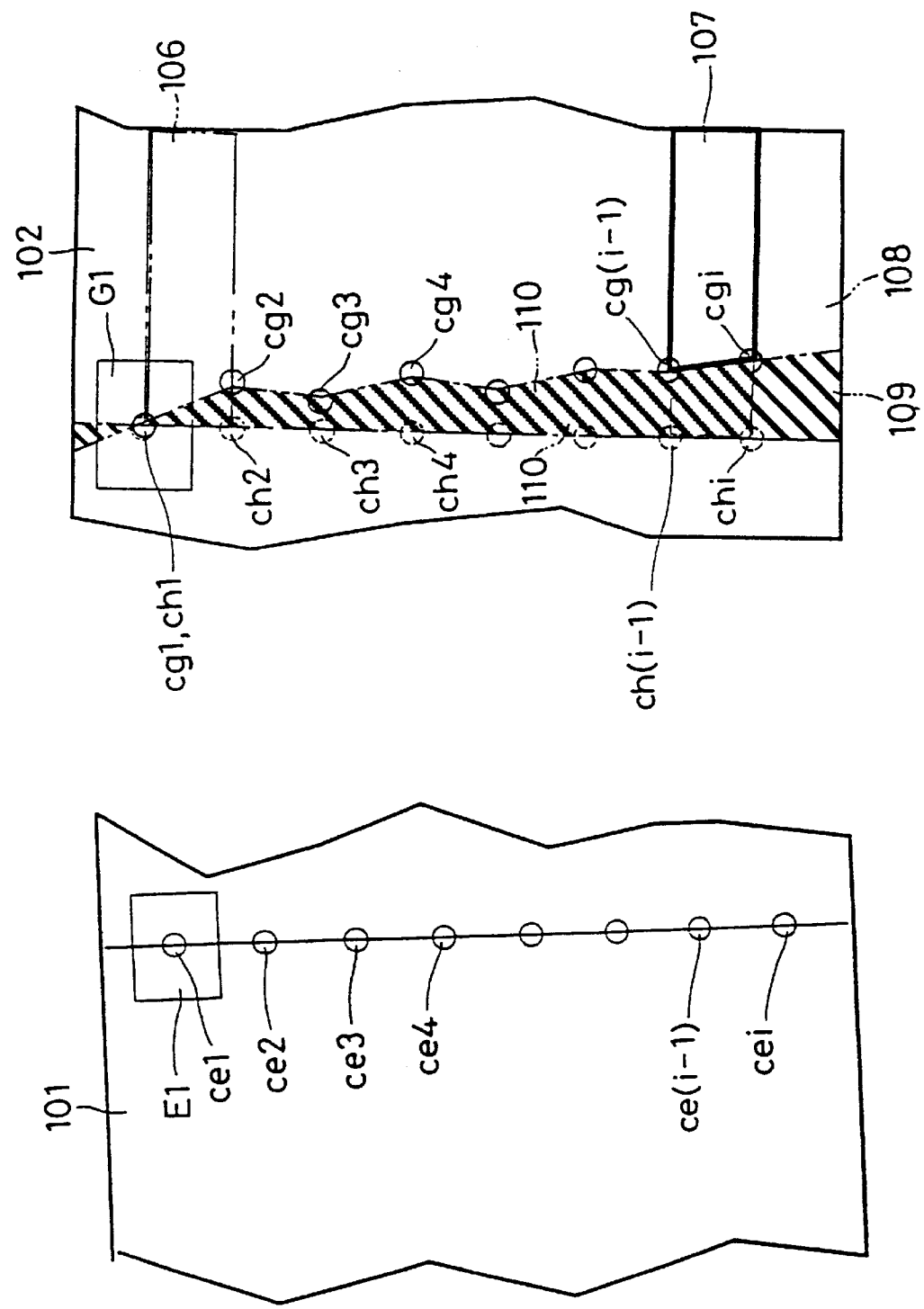
FIG. 19 Is a diagrammatic view for explaining a case of compositing the object pictures 101 and 102 by the picture compositing process of the first embodiment.

According to the picture compositing unit 1 of the first embodiment, as shown in FIG. 19, the object pictures 101 and 102 are superimposed so that a center point ce1 of a reference area E1 coincides with a center point cg1 of a corresponding area G1 and the x-coordinate axis and the y-coordinate axis of the object pictures 101 and 102 become parallel, respectively, and a trapezoidal area having the center point cg of the corresponding area G as an apex is deformed into a shape congruent with a rectangular area having a point ch overlapping with the center point ce of the reference area E corresponding to that corresponding area. Thereby, an area 108 on the right side of a line passing through the center points cg1 through cgi within the transforming circuit 102 is deformed so that it becomes congruent with an area 109 on the right side of a straight line passing through points ch1 and chi.

At this time, a distance between the center point cg of the corresponding area G and the above-mentioned overlapping point ch increases more in the lower part of the transforming circuit 102 than the upper side thereof. Due to that, a difference of area of the trapezoidal area and the rectangular area is large in the trapezoidal area 107 rather than the trapezoidal area 106. Accordingly, an area of an area 110 where the areas 108 and 109 do not coincide becomes wide. The area 110 is hatched in FIG. 19. Therefore, when the area 108 is to be deformed so that it becomes congruent with the area 109, the area 108 must be deformed so that it expands by the area of the area 110 and the degree of the deformation of the area 108 is large. Due to that, even when there is no distortion in the image of the subject, a distortion may occur in the image of the subject by this deforming process. In order to prevent such a trouble, the inclination of the image is offset by performing the rotational transformation of the picture before the picture deforming process in the picture compositing unit of the present embodiment.

Figure 20:
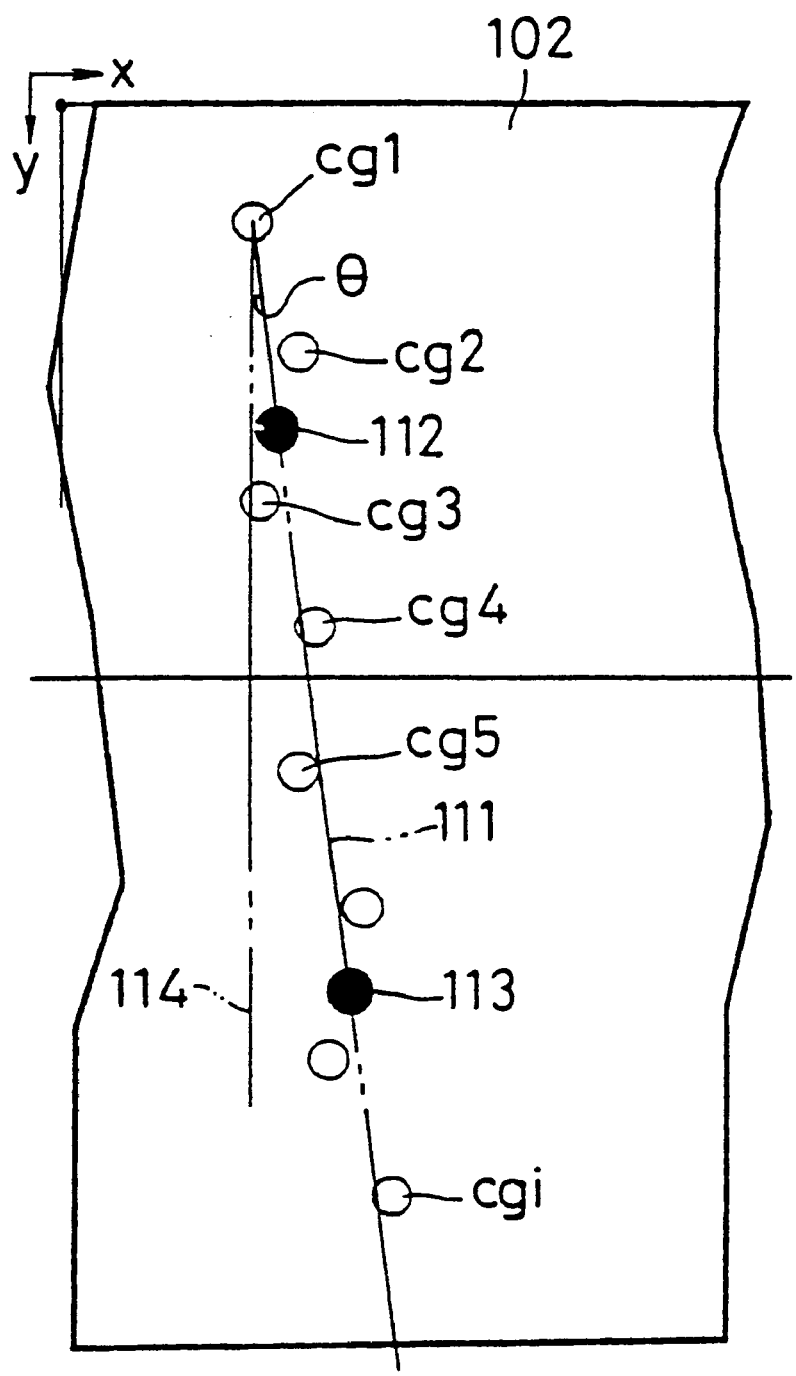
FIG. 20 is a diagrammatic view showing the object picture 102 before a picture rotational transforming process.

The picture rotational transformation process will be explained below in detail with reference to FIG. 20.

At first, the composition processing circuit 14 finds a rotation angle θ indicating an inclination of the picture. For instance, a straight line 111 which linearly approximates the center points cg1 through cgi of all of the corresponding areas G in the transforming circuit 102, is found. In concrete, the transforming circuit 102 is divided into the upper and lower parts to divide the center points into a group of center points cg1 through cg4 contained in the upper part and a group of center points cg5 through cgi contained in the lower part. Then, reference points 112 and 113 are found from coordinates of those center points cg per each group. The x coordinate of the reference point 112 is an average value of the x coordinates of the center points cg1 through cg4 and the y coordinate of the reference point 112 is an average value of the y coordinates of the center points cg1 through cg4. Similarly, the x and y coordinates of the reference point 113 are average values of the x and y coordinates of the center points cg5 through cgi. A straight line passing through the reference points 112 and 113 is the straight line 111 described above. Next, the composition processing circuit 14 finds an angle between a straight line which passes through the center point cg1 and which is parallel to the y-coordinate axis and the straight line 111 as the rotation angle θ.

The rotation angle θ may be found also by the following method. At first, a mismatch of position of the reference area E within the transforming circuit 101 and position of each corresponding area G within the transforming circuit 102 is found for each reference area of E1 through Ei. Then, this positional mismatch is compared every two adjacent reference areas E to find the mismatch per combination of the respective reference areas. Further, an average value of the differences of the mismatch is found, the average value is divided by a distance in parallel to the y-coordinate axis between center points of two adjacent corresponding areas and an inverse tangent of its quotient is found as shown in the following Expression (9). Thereby, the rotation angle θ can be obtained.

$$\theta = \mathrm{atan}\left\{\frac{\text{Average Value of Differences of Relative Positions of Two Adjacent Corresponding Areas}}{\text{Distance in } y \text{ Direction between Center Points of Two Adjacent Corresponding Areas}}\right\} \quad (9)$$

Next, the coordinate of the typical point of each pixel in the transforming circuit 102 is rotationally transformed, respectively. For instance, in this rotational transformation, the coordinate (x, y) of the typical point of each pixel in the transforming circuit 102 is transformed based on the following Expression (10). In Expression (10), "x" and "y" are values of the x and y coordinates of the typical point of the pixel within the transforming circuit 102 before rotationally transformed. "x*" and "y*" are values of the x and y coordinates of the typical point of the pixel after rotationally transformed. The coordinate (x, y) of the typical point before rotationally transformed is a point in each pixel and coincides with a so-called lattice point in the xy orthogonal coordinate system of the object picture 102 for example. The typical point after rotationally transformed does not coincide with the lattice point in many cases.

$$\begin{bmatrix} {}^*x \\ {}^*y \end{bmatrix} = \begin{bmatrix} \cos\theta & -\sin\theta \\ \sin\theta & \cos\theta \end{bmatrix} \begin{bmatrix} x \\ y \end{bmatrix} \quad (10)$$

Figure 21:
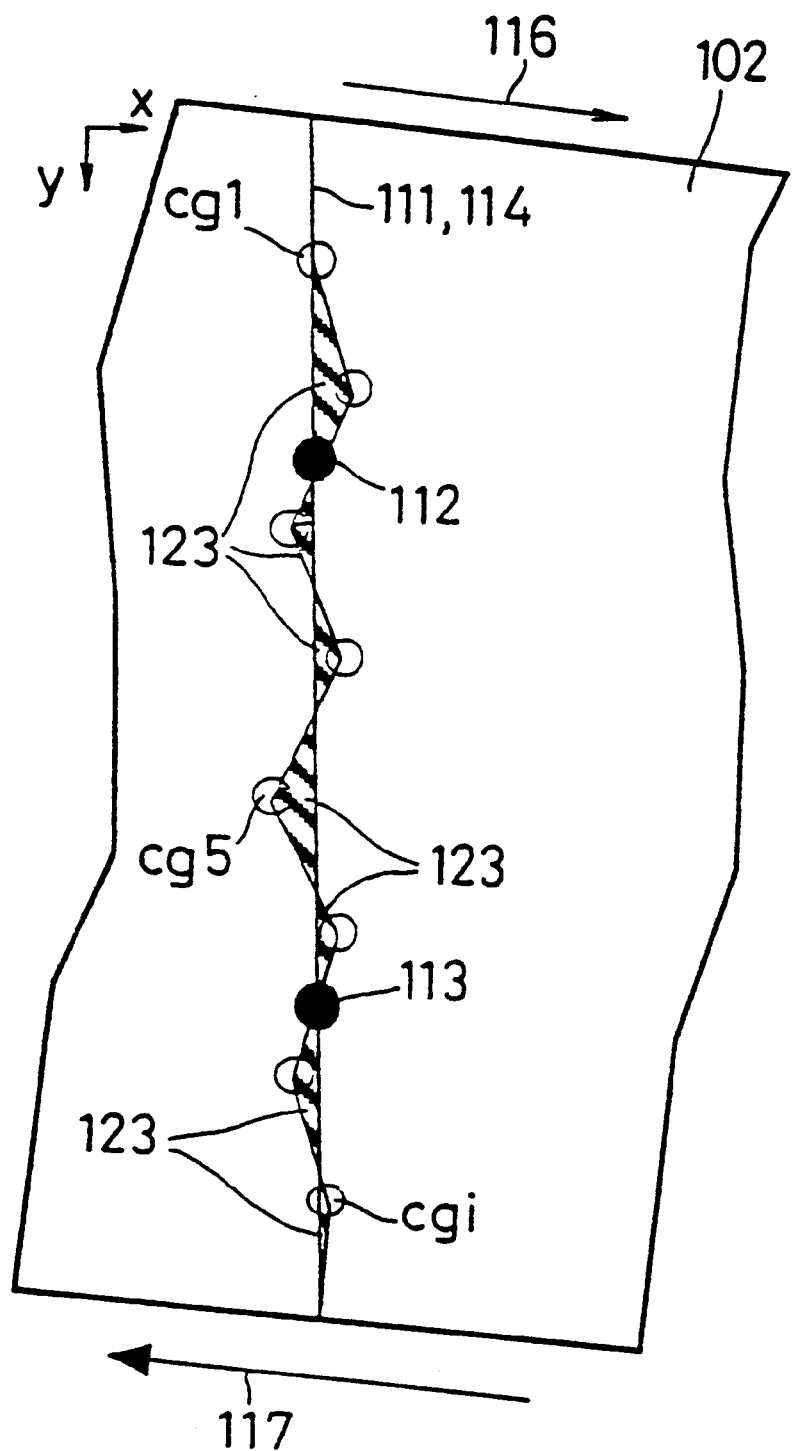
FIG. 21 is a diagrammatic view showing the object picture 102 after the picture rotational transforming process.

When such coordinate transformation is performed, the position of the typical point of each pixel is angularly displaced in the directions shown by arrows 116 and 117 in FIG. 21 by the rotation angle θ from the original position. Thereby, the straight line 111 becomes parallel to the y-coordinate axis of the transforming circuit 102. Therefore, this straight line coincides with the above-mentioned straight line 114.

When the picture deforming process is performed as explained with reference to FIG. 19 by using the transforming circuit 102 after rotationally transformed, the area on the right side of the line passing through the center points cg1 through cgi in the transforming circuit 102 is deformed such it becomes congruent with the area on the right side of the straight line 111. An area of an area 123 where those both areas do not coincide is fully smaller than the area of the above-mentioned area 110. The area 123 is hatched in the Figure. Further, the rate of the area occupied by the area 123 barely changes in the upper and lower parts of the transforming circuit 102. It allows each trapezoidal area to be deformed almost equally and the degree of deformation to be small when the geometrical transformation is performed. Thereby, it becomes possible to prevent the distortion, which is otherwise caused by the picture deforming process, from occurring in the image of the subject.

Figure 22:
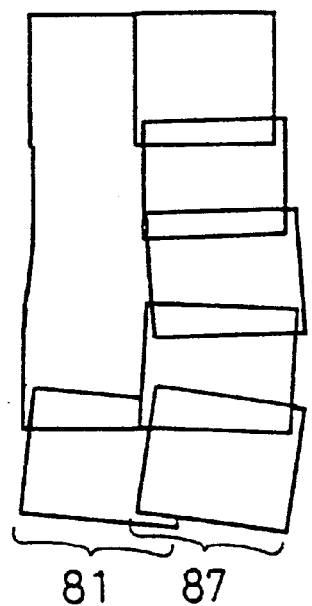
FIG. 22 is a diagrammatic view showing a composite picture obtained by compositing the object picture 80 by the picture compositing process of the second embodiment.
Figure 23:
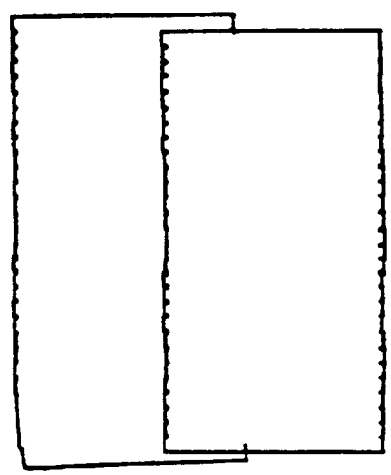
FIG. 23 is a diagrammatic view showing a composite picture obtained by compositing the object picture 90 by the picture compositing process of the second embodiment.

A composite picture as shown in FIG. 22 can be obtained by compositing the object picture 80 described above by the picture compositing process including the picture rotational transforming process and a composite picture as shown in FIG. 23 can be obtained by compositing the object picture 90 described above by the picture compositing process including the picture rotational transforming process. These composite pictures are the same as pictures obtained by arranging a plurality of original pictures in a matrix and by compositing them by matching separately every two original pictures adjacent in the vertical and horizontal directions. Thereby, the number of pixels of the composite picture is more than the number of pixels of the original picture in the two directions orthogonal to each other. Accordingly, the picture whose angle and range are wider than the original picture in the two directions and the picture whose resolution is higher than that of the original picture in the two directions can be obtained by the picture compositing unit which requires less processing time and which has a high composition accuracy.

A picture compositing unit of a third embodiment will be explained below. The picture compositing unit of the third embodiment is the same with the picture compositing unit 1 of the first embodiment except of the processing method of the transforming circuit 10. Accordingly, the components of the picture compositing unit performing the same operations as those of the picture compositing unit in the first embodiment will be denoted by the same reference numerals and an explanation of their operations and effect will be omitted here. The transforming circuit of the picture compositing unit of the present embodiment deletes part of pixel data sets of a transformed picture signal after binary-multi-value transforming a line picture signal similarly to the transforming circuit 10 described above.

Figure 24:
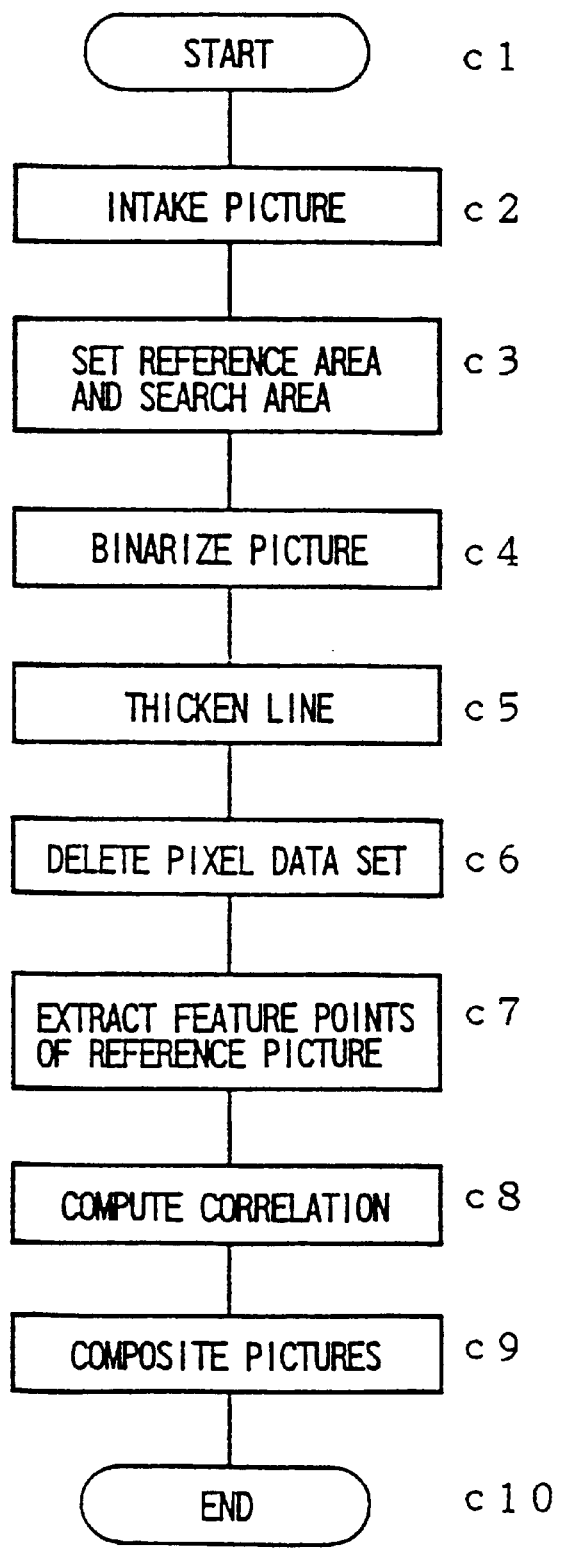
FIG. 24 is a flowchart for explaining a picture compositing process of a picture compositing unit of a third embodiment of the invention.

FIG. 24 is a flowchart explaining, in outline, a picture compositing operation performed by the picture compositing unit of the present embodiment. While this picture compositing operation includes steps for performing the same operations in the flowchart in FIG. 2, an explanation of such steps will be omitted here. When it is instructed to start the picture compositing operation, the process advances from step c1 to step c2. Processes in steps c2 through c5 are the same as the processes in steps a2 through a5.

In step c6, the transforming circuit 10 deletes a part of pixel data set from pixel data sets composing the transformed picture signal. The pixel data sets to be deleted are pixel data sets corresponding respectively to a plurality of pixels composing odd number rows in the transformed picture and pixel data sets corresponding respectively to a plurality of pixels composing odd number columns in the transformed picture for example. That is, it is equivalent to thinning the pixels of the transformed picture shown in FIG. 7 every two pixels. Thereby, the amount of data of the transformed picture signal is quartered.

In step c7, the feature point extract circuit 8 extracts feature points by the processing method in step a6 and stores them by transforming x and y-coordinate values of the coordinate of the feature point to values of the half. In step c8, the correlation computation circuit 13 performs correlation computation by the same method as that in step a7 by using the transformed picture signal generated in step c7 and the coordinate of the feature point pixel stored in step c6. At this time, because the number of pixels of the transformed picture is reduced to a quarter of the number of pixels of the transformed picture in the first embodiment, the size of the search area and of the reference area are also quartered. Thereby, because the number of pixels within the search area is quartered, the number of times for finding the correlations of the area is reduced. Accordingly, the processing amount of the correlation computation can be reduced. Finally, in step c9, the compositing process is performed by the same process in step a8 and the picture compositing process ends in step c10.

Figure 25:
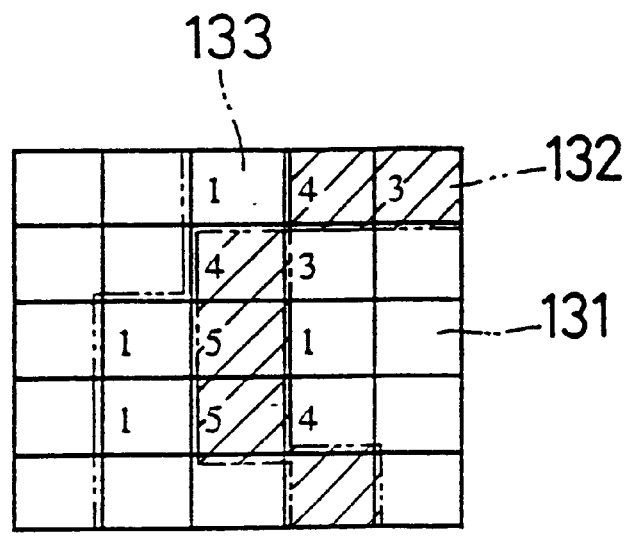
FIG. 25 is a partially enlarged view of a transformed picture represented by a transformed picture signal after a pixel deleting process.
Figure 26:
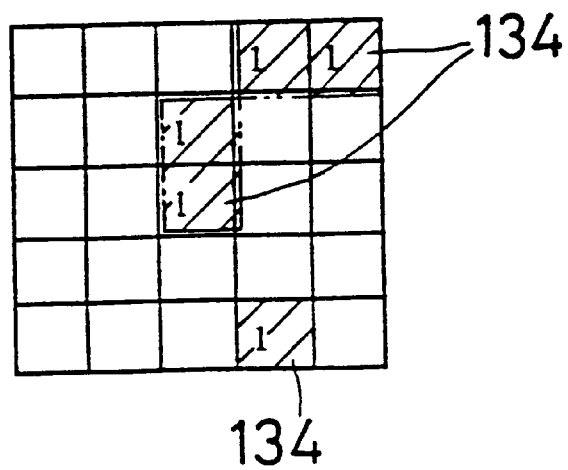
FIG. 26 is a partially enlarged view of a line picture represented by a line picture signal after the pixel deleting process.

The reason why the process for deleting the pixel data set is performed for the transformed picture signal will be explained below. FIG. 25 is a diagrammatic view showing a part is of the transformed picture represented by the transformed picture signal obtained by deleting the pixel data sets of the transformed picture signal in FIG. 10 by the deleting process in step c6 and FIG. 26 is a diagrammatic view showing a part of the line picture represented by the line picture signal obtained by deleting the pixel data sets of the transformed picture signal in FIG. 7 by the same process as the deleting process in step c6. The relationship between the rectangular areas and the numeral in FIGS. 25 and 26 is equal with that in FIG. 7. In the transformed picture in FIG. 25, areas composed of the pixels contained in the areas 41 through 43 in the transformed picture in FIG. 9 will be denoted respectively as areas 131 through 133 and an area composed of the pixels containing in the area 42 within the line picture in FIG. 7 will be denoted as an area 134. The areas 133 and 134 are hatched in the Figure.

The shape of the areas 41 through 43 resembles roughly to the shape of the areas 131 through 133 and the positional relationship of the areas 41 through 43 also resembles to that of the areas 131 through 133. That is, even when the pixel data sets are deleted, an amount of information of the transformed picture signal, e.g. position of pixels on the edge of the image and areas in which pixels which can be corresponding point pixels are contained, is held. When the transformed picture signal after the deletion is used for the correlation computing process, the matching accuracy hardly drops as compared to the correlation computing process in the first embodiment.

On the contrary, the area 134 is divided into two parts at the middle in the line picture in FIG. 26 and the information showing that the pixels within the area 42 has composed one continuous line is lost. Accordingly, when the transformed picture signal is generated from the line picture signal as deleted as described above, the shape of each area of that transformed picture signal differs largely from that of the areas 41 through 43 of the transformed picture signal in FIG. 10. Accordingly, when this transformed picture signal is used for the correlation computing process, there is a possibility that the matching accuracy drops as compared to the correlation computatin process in the first embodiment.

It can be seen from these facts that the cmputatin amount of the correlation computing process can be reduced without dropping the matching accuracy by deleting a part of the pixel data sets of the transformed picture signal after generating it and by performing the correlation computing process by using the deleted transformed picture signal. Accordingly, because the processing time of the matching process can be reduced further, the processing time of the whole picture compositing process can be reduced further. Therefore, because the picture compositing process can be performed at high speed, this picture compositing process can be used in a real-time process for example.

Furthermore, the processing time of the whole picture compositing process may be shortened by using the following method. The processes from the acquisition of object pictures to the extraction of feature points of this method are the same as those in steps al through a7 in the picture compositing process of the first embodiment. When the position for superimposing the reference area E with the search area F is moved in the x direction during the correlation computing process, they are moved so that the reference position shifts by two pixels each within the search area F. They are also moved by two rows each in moving the superimposing position in the y direction. Therefore, pixels whose reference position are overlapped are arranged every other pixel within the search area F. Thereby, the number of times of computation of the correlation between the reference area E and the rectangular area B is quartered as compared to the number of times of computation in the first embodiment. Thereby, the processing time of the whole picture compositing process can be shortened similarly to the above-mentioned picture compositing process in the third embodiment.

Thus, the picture compositing apparatus of the first through third embodiments can keep the matching accuracy and the composition accuracy high even when the pictures have the mismatch of the images due to the distortion of the images and to the change in magnification by the reasons explained in the description of the prior art. This picture compositing apparatus is also capable of obtaining a composite picture by shooting a subject having a wide area such as a newspaper by using an image pickup device such as a CCD imaging apparatus having a limited shootable range and by joining obtained original pictures by the picture compositing process described above. Therefore, it can read a subject having an area wider than the shootable range of the image pickup device with the resolution higher than the resolution of the image pickup device. Further, because the composite picture is composed of pixels whose number is greater than the number of photo-receiving areas of the image pickup device, the picture compositing apparatus allows the high resolution picture to be obtained by the same image pickup device as the low cost prior art image pickup device. Accordingly, the unit can be manufactured at low cost.

The picture compositing apparatuses of the first through third embodiments described above may be used not only in the case of compositing pictures obtained by shooting the subject by using the image pickup device but also in other circumstances. For instance, it may also process pictures which are created by a computer and stored in a memory as its object pictures. Even when the object picture is a three-dimensional picture, the picture compositing apparatus can process the object picture similarly to the case when object pictures are two-dimensional pictures and can obtain the same effect by setting the above-mentioned respective areas as a three-dimensional space and by replacing the planar processing with spatial processing. Still more, the above-mentioned mismatch detecting unit may be used not only for the picture compositing process but also for other uses, e.g. to detect a move of a video imaging apparatus caused by unintentional movement of hands.

The picture compositing apparatuses of the first through third embodiments are the exemplary embodiments of the inventive picture processing apparatus and can be embodied in various ways as long as the main operation is the same. The detailed operation of each circuit may be realized by other circuits as long as the same output is obtained. Further, these picture compositing apparatuses may be realized by storing a software for causing a CPU to perform the above-mentioned picture compositing operation in a storage medium readable by a computer and by installing the software to the computer which is capable of inputting and storing picture signals. A CD-ROM and a floppy disk may be cited as the storage medium.

Figure 27:
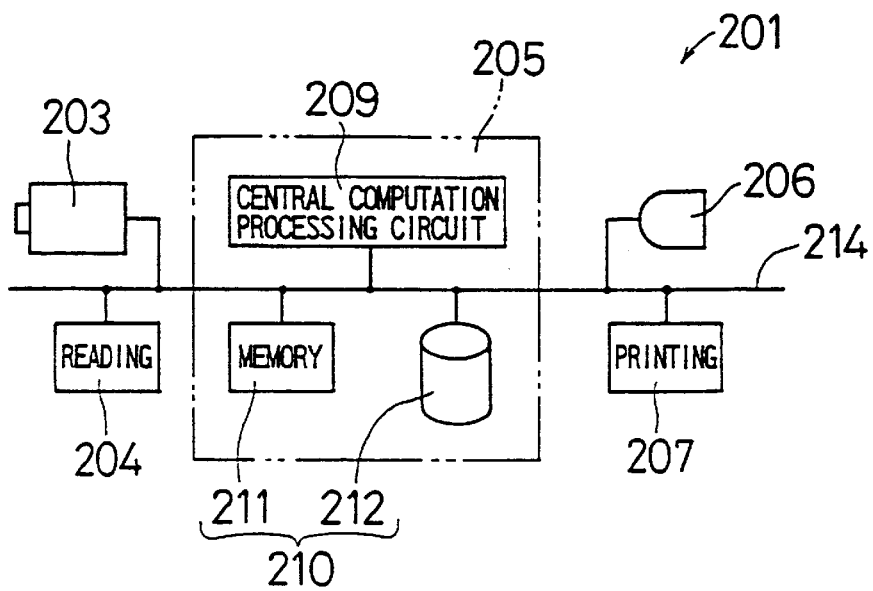
FIG. 27 is a block diagram showing an electrical structure of a composite picture creating unit 201 including a picture processing apparatus 205 according to a fourth embodiment of the invention.

FIG. 27 is a block diagram showing an electrical structure of a composite picture creating system 201 including a picture processing apparatus according to a fourth embodiment of the invention. The composite picture creating system 201 comprises a imaging apparatus 203, a reading unit 204, a picture processing apparatus 205, a display 206 and a printing unit 207. The picture processing apparatus 205 comprises a central computation processing circuit 209 and a storage unit 210. The storage unit 210 comprises a memory 211 and an external storage unit 212. The imaging apparatus 203, the reading unit 204, the display 206, the printing unit 207, the central computation processing circuit 209, the memory 211 and the external storage unit 212 are connected respectively to a bus line 214 and transmit/receive signals each other via the bus line 214. A description concerning to the bus line 214 will be omitted in the explanation below. The picture processing apparatus 205 may be realized by a main body of a personal computer for example.

The imaging apparatus 203 comprising an optical system including lenses and an image pickup device shoots an object within a predefined shooting range to generate a picture signal representing a picture composed of a plurality of pixels. The imaging apparatus 203 is realized by a video imaging apparatus or a digital still imaging apparatus and the image pickup device is realized by a CCD image sensor for example. The reading unit 204 reads picture signals stored in a storage medium realized by a CD-ROM, an opto-magnetic disk or a floppy disk for example.

The storage unit 210 stores a plurality of picture signals generated by the imaging apparatus 203 and a plurality of picture signals read by the reading unit 204 as picture signals representing pictures to be processed. It also stores an operation program of the central computation processing circuit 209 as well as various control data necessary for executing the program. The central computation processing circuit 209 reads the operation program stored in the storage unit 210 and based on the operation program, generates a single output picture signal from the plurality of picture signals stored in the storage unit 210. The generated output picture signal is stored in the storage unit 210 or is supplied to the display 206 and the printing unit 207. The memory 211 is realized by a read only memory and a random access memory and the external storage unit 212 is realized by a hard disk unit for example.

The display 206 is realized by a liquid crystal display or a cathode ray tube and displays an output picture represented by the output picture signal on Its display screen. The printing unit 207 prints the output picture represented by the output picture signal on a recording sheet or the like. Because various pictures are handled in a form of picture signals within the composite picture creating system 201, a picture signal representing a certain type of picture may be referred to simply as the picture of that type in the explanation hereinbelow.

Figure 28:
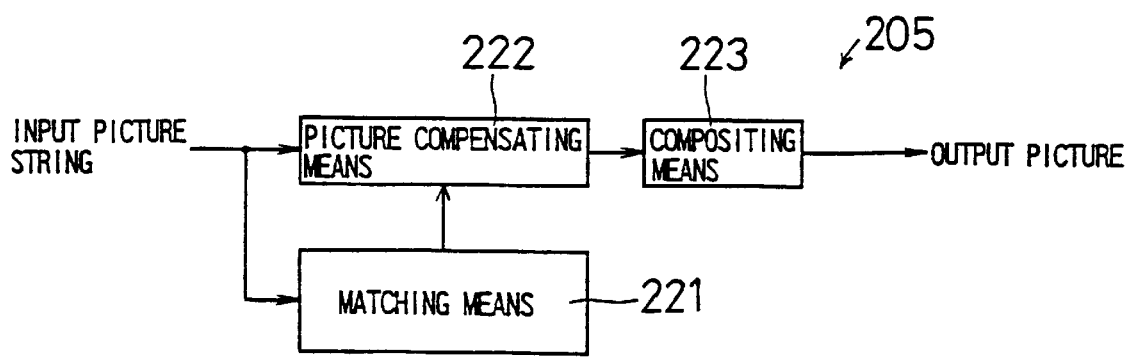
FIG. 28 is a functional block diagram for explaining a picture processing operation of the picture processing apparatus 205.

FIG. 28 is a functional block diagram for explaining, in outline, a picture processing operation performed by the picture processing apparatus 205. In the functional block diagram, one block represents a series of processing operations (subroutine) for achieving a certain purpose within the operation program of the central computation processing circuit 209 an arrow heading to that block represents an input signal and data necessary for that processing operations and an arrow coming out of that block represents an output signal and data showing a processing result of that processing operations. As a premise for performing the picture processing operation, a plurality of pictures to be processed are supposed to be stored in the storage unit 210. These plurality of pictures will be referred to as an input picture string in general hereinafter.

When the central computation processing circuit 209 executes the operation program, the central computation processing circuit 209 functions as matching means 221 at first to find matching information representing a relationship of mutual correspondence of the respective pictures of the input picture string. The matching information shows that each picture in the input picture string overlaps with which picture in the input picture string and a positional relationship of both the pictures when those pictures are overlapped. The matching information is stored temporality in the storage unit 210 for example. Next, the central computation processing circuit 209 functions as picture compensating means 222 to implement a process for compensating a density value on each picture in the input picture string by referring to the matching information of each picture. Thereby, an overall lightness of the respective pictures, i.e. overall density and color tone of the respective picture are adjusted. Then, the central computation processing circuit 209 functions as compositing means 223 for creating a composite picture by compositing the plurality of pictures after the density compensating process by referring to the matching information. This composite picture is stored in the storage unit 210 as an output picture.

The picture processing operation will be explained below in detail. The input picture string is obtained under the following condition for example. Suppose that the imaging apparatus 203 is a video imaging apparatus and a light source is located at position fully separated from the imaging apparatus 203 and the subject, e.g. at an infinite point. An operator of the composite picture creating system 201, while shooting the subject and its surroundings by the imaging apparatus 203, moves a shooting range of the imaging apparatus 203 along an elapse of time so that the positional relationship among the light source, the subject and the imaging apparatus 203 is barely changed. Suppose also that a distance along which the shooting range moves within a time necessary for obtaining one frame of a motion picture obtained by the imaging apparatus 203 is shorter than a width and height of that frame. A case of shooting an original whose area is wider than the shooting range while scanning by the imaging apparatus 203 in a room and a case of panning, or of tilting on the outside apply to the case of shooting the subject as described above. When the subject is shot by the above-mentioned method, pictures of at least two consecutive frames overlap each other because the same subject or the same part of the subject is imaged respectively on the parts thereof. The pictures of the plurality of consecutive frames of this motion picture will be referred to as pictures of the input picture string.

Figure 29A:
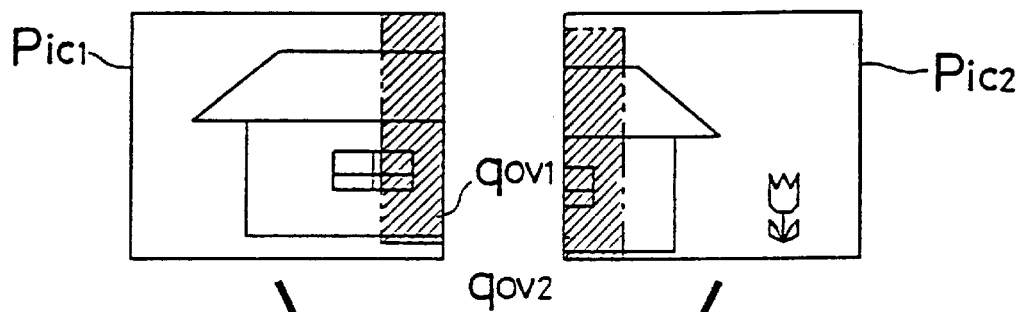
FIG. 29A is a diagram showing pictures Pic1 and Pic2 of an input picture string to be processed by the picture processing apparatus 205 and FIG. 29B is a diagram showing the pictures Pic1 and Pic2 on which overlapping areas qov1 and qov2 are overlapped.
Figure 29B:
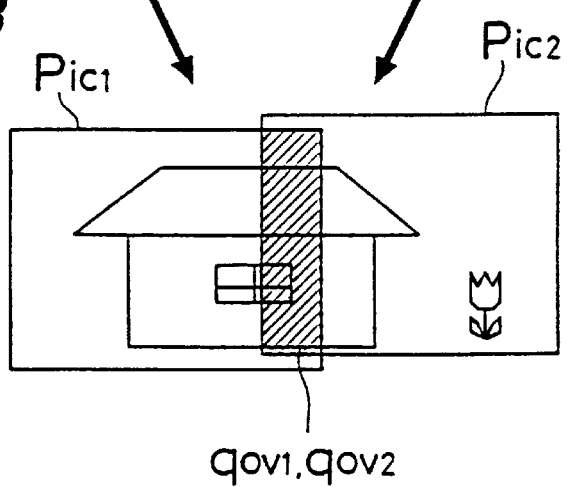

It is supposed in the explanation below that the input picture string is composed of two pictures Pic1 and Pic2. FIG. 29A is a diagram showing the pictures Pic1 and Pic2 of the input picture string. In FIGS. 29A and 29B, an outer frame and edges thereof are shown by a solid line. The picture Pic1 and Pic2 are composed of a plurality of pixels disposed in a matrix for example. The above-mentioned picture signal includes information on position of each pixel within the picture and on a density value of each pixel. The density value is an integer within a predefined range and indicates density of that pixel. Brightness and lightness may be adopted instead of density. The pictures Pic1 and Pic2 can be overlapped with each other so that the edge of the part of the pictures Pic1 and Pic2 coincide as shown in FIG. 29B because the same subject or the same part of the subject is imaged in the part of the pictures Pic1 and Pic2 when only a distribution of density of the pixels within the pictures is concerned. This overlapping part will be denoted as overlapping areas qov1 and qov2. The overlapping areas qov1 and qov2 are hatched in FIGS. 29A and 29B.

FIG. 30A is a histogram of density value of pixels composing the overlapping area qov1 of the picture Pic1 and FIG. 30B is a histogram of density value of pixels composing the overlapping area qov2 of the picture Pic2. In the histograms, the vertical axis represents the number of pixels and the horizontal axis represents the density value. Because the same part of the subject is imaged in the overlapping areas qov1 and qov2, the histograms of the density value thereof must be equal. When FIG. 30A is compared with FIG. 30B, although shapes of curves 241 and 242 representing both the histograms resemble to each other, their position is shifted as a whole. It can be seen from this fact that the overall lightness of the picture Pic1 is darker or lighter than the overall lightness of the picture Pic2 as a whole.

A method for calculating the matching information performed by the matching means 221 will be explained below in detail by using FIG. 31. The block matching method may be used for finding the matching information for example.

In this case, the matching means 221 firstly assumes either one of the pictures Pic1 and Pic2 as a reference picture PicE and the other as a search picture PicF, concretely. Next, it sets a reference area areaE within the reference picture PicE. Preferably, the reference area areaE is set within an area which may overlap the search picture PicF within the reference picture PicE and its size is less than that of the area. Next, it sets a search area areaF whose size is equal to that of the reference area areaE within the search picture PicF to find an index for comparing distribution of density of pixels of the reference area areaE and of the search area areaF.

A difference dif is used as this index, for example. The difference dif is a sum of absolute values of the difference of density value of corresponding pixels in the two areas areaE and areaF and can be found from the following Expression (11). The corresponding pixels are pixels which overlap when the areas areaE and areaF are overlapped so that their outer frames coincide for example. In the following Expression, "E" denotes a density value of a certain pixel in the reference area areaE and "F" denotes a density value of a pixel in the search area areaF corresponding to the above-mentioned certain pixel in the reference area areaE.

$$\text{dif}=\Sigma|E-F| \tag{11}$$

Then, the position of the search area areaF with respect to a reference point of the search picture PicF is changed to a plurality of locations, while the position of the reference area areaE with respect to a reference point of the reference picture PicE is fixed, to find the difference dif per location. The reference point of the pictures PicE and PicF are origins of coordinate systems set in the pictures PicE and PicF for example. It may be considered that when this difference dif is minimum, the distributions of density of pixels of the search area areaF and the reference area areaE resemble most to each other. For this purpose, a plurality of found differences dif are compared to find the minimum difference dif and a difference between the position of the search area areaF and the position of the reference area areaE when the minimum difference dif is found is found as matching information. This positional difference is equal to a gap between the reference points of the pictures PicE and PicF when the pictures are superimposed so that the parts where the distributions of density resemble most overlap.

The gap between the reference points of the pictures Pic1 and Pic2 can be found by finding the matching information by using such method. Thereby, the overlapping areas qov1 and qov2 of the pictures Pic1 and Pic2 can be defined based on the matching information. For instance, the overlapping areas qov1 and qov2 of the pictures Pic1 and Pic2 are the whole areas which overlap when the pictures Pic1 and Pic2 are superimposed by shifting the reference points by that gap. The overlapping areas qov1 and qov2 may not be of the same size depending on a method for finding the matching information. Further, they may not be rectangular. Thus, the matching means 221 functions as overlapping area deciding means for finding the overlapping areas of the pictures Pic1 and Pic2.

Methods other than the above-mentioned block matching method may be used as a method for finding the matching information, as long as it can find the correspondence between the pictures Pic1 and Pic2. For example, the feature point matching method described in the first through third embodiments may be used. Further, even when the block matching method is used, an index other than the difference dif, such as a degree of resemblance of the areas areaE and areaF found from the correlation, may be used. Still more, when the input picture string is composed of three or more pictures, the above-mentioned process is firstly performed by selecting two pictures among them and is repeated by changing a combination of pictures to be selected until matching information of each picture with at least one other picture is found.

Figure 32:
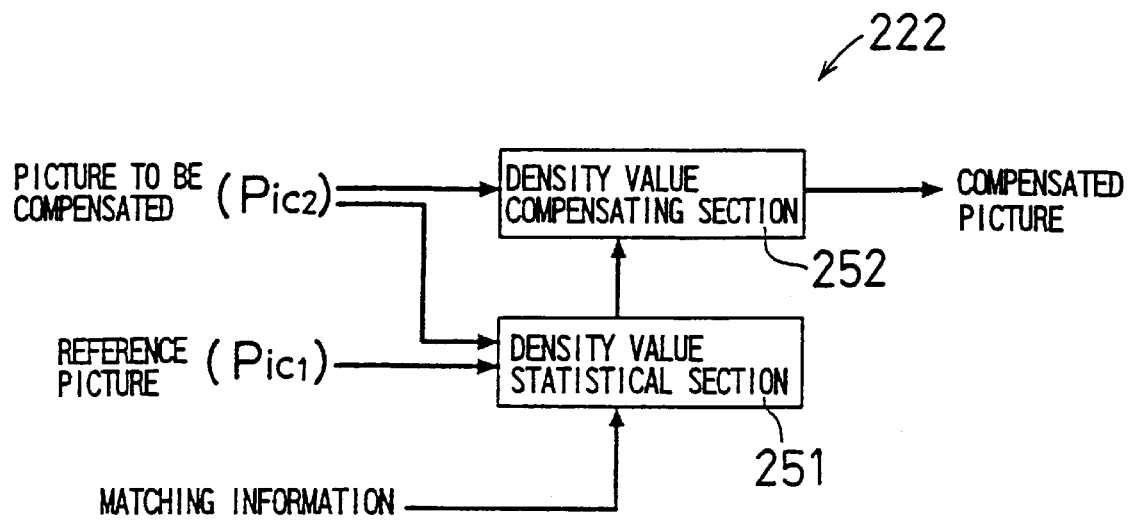
FIG. 32 is a functional block diagram for explaining a density compensating operation of picture compensating means 222.

Next, an operation for compensating the density value performed by the picture compensating means 222 will be explained below in detail. FIG. 32 is a functional block diagram for explaining the density value compensating operation. The picture compensating means 222 sets one of the pictures Pic1 and Pic2 of the input picture string as a reference picture and the other as a picture to be compensated. In the explanation below, it is supposed that the picture Pic1 is the reference picture and the picture Pic2 is the picture to be compensated.

When the central computation processing circuit 209 functions as the picture compensating means 222, the central computation processing circuit 209 firstly functions as a density value statistical section 251, concretely. The density value statistical section 251 reads the pictures Pic1 and Pic2 and finds the overlapping areas qov1 and qov2 of the pictures Pic1 and Pic2 based on the matching information. Next, it finds typical values mr1 and mc2 typifying distributions of density values of a plurality of pictures composing the overlapping areas qov1 and qov2. The typical values mr1 and mc2 are stored temporarily in the storage unit 210 for example.

Next, the central computation processing circuit 209 operates as a density value compensating section 252. In general, the density value compensating section 252 compensates the density value of each pixel in the pictures Pic1 and Pic2 respectively so that overall lightness of the overlapping areas qov1 and qov2 coincide based on the ratio of the typical values mr1 and mc2. Or more concretely, the density value compensating section 252 finds, at first, a ratio R of the typical value mr1 of the overlapping area qov1 of the reference picture Pic1 with respect to the typical value mr2 of the overlapping area qov2 of the picture Pic2 to be compensated as a compensation factor. The following Expression 12 is an expression for calculating the ratio R.

$$R = \frac{mr1}{mc2} \quad (12)$$

Next, the density value compensating section 252 multiplies the density value of each pixel of the picture Pic2 to be compensated by the ratio R. The following Expression (13) is an expression for compensating the density value. In the following Expression, pi denotes a density value before compensation of a certain pixel of the picture Pic2 to be compensated, po denotes a density value of the above-mentioned pixel of the compensated picture and pmax denotes a maximum value which the density value can take most. Because the density value can generally take only a finite integer, e.g. a value which is 0 or more and 255 or less, it is preferable to round a product to a natural number when a fraction of less than decimal point is included in the product. Further, because it is preferable for the density value po of the compensated picture to saturate by the maximum value pmax which the density value can take most, the product is replaced by the maximum value pmax when the product is more than the maximum value pmax.

$$po \begin{cases} = r \times pi & (r \times pi < pmax) \\ = pmax & (r \times pi \geq pmax) \end{cases} \quad (13)$$

Defining the product thus found as the compensated density value of each pixel, the density value compensating section 252 replaces the density value before compensated within the picture signal of the picture Pic2 to be compensated with the density value after compensated. Thereby, the picture signal of the picture Pic2 to be compensated whose density value has been compensated, i.e. the picture signal of the compensated picture, can be obtained. The picture signal of the compensated picture is stored temporarily in the storage unit 210 for example.

Because the histogram of the overlapping area qov2 is compressed by this process so as to lean to the left side from the original position in the examples in FIGS. 29A, 29B, 30A and 30B, the typical values mr1 and mc2 of the density values of the overlapping areas qov1 and qov2 coincide. Thereby, the overall lightness of the picture Pic1 coincides almost with the overall light of the compensated picture Pic2. Further, when the input picture string is composed of three or more pictures, two pictures which overlap each other are selected at first and the above-mentioned matching process and the density compensating process are performed by setting those pictures as the pictures Pic1 and Pic2 to be processed. Next, another picture which overlaps either one of the compensated two pictures is selected and the matching process and the density compensating process are performed by setting those pictures as the pictures Pic1 and Pic2. This latter operation is repeated until the density compensating process is implemented to all pictures in the input picture string. Thereby, the overall lightness of the three or more pictures can be adjusted.

The typical values mr1 and mc2 are average values mav1 and mav2 of the density values of the overlapping areas qov1 and qov2 for example. This average value may be a simple average or a weighted average. The typical values mr1 and mc2 may be also density values where the number of pixels is maximum in the histogram. Further, it is possible to find an average value of the number of pixels having density values within a predetermined width centering on a certain density value respectively in the histogram by changing the certain centered density value to find a maximum value of those average values and to set the certain centered density value when the maximum value is found as the typical values mr1 and mc2. It allows to prevent a density value which does not represents the distribution and in which the number of pixels has increased exceptionally from becoming the typical value erroneously. Another value may be used also as the typical value as long as it is a value representing the distribution of the density values of the pixels In the overlapping area.

As shown in FIGS. 30A and 30B described above, the average values mav1 and mav2 coincide or are approximate to the values of density which are the maximum values in the histogram and are also close to the centers of the distributions of the values of density. Further, because the average value when the density value of a small number of pixels, e. g. one pixel, within the overlapping area differs largely from that of the other pixels within the overlapping area is almost the same as the average value when there are no such small number of pixels whose density value changes largely, it is stable. Accordingly, it is preferable to use the average values mav1 and mav2 as the typical values mr1 and mc2.

The density value statistical section 251 may calculate the typical values mr1 and mc2 by using only pixels in areas which are located inside of the overlapping areas qov1 and qov2 and are narrower than the overlapping areas qov1 and qov2. The reason and effect thereof will be explained with reference to FIG. 33.

The picture signals of the pictures Pic1 and Pic2 may contain noise components mixed or a signal distortion. Further, the pictures Pic1 and Pic2 may miss density values of a part of pixels composing the pictures Pic1 and Pic2, because they are not actually defined due to the structure and the like of the imaging apparatus 203. The pixels px which are influenced by the noise components and signal distortion and the missing pixels py are located at the peripheral portion of the pictures Pic1 and Pic2 in many cases and their position can be defined uniquely with respect to the imaging apparatus 203.

When the overlapping areas qov1 and qov2 are defined based on the matching information, the pixels px and py may be contained in the overlapping areas qov1 and qov2, because the distribution of the density of pixels of the whole overlapping areas qov1 and qov2 are not actually compared. When the typical values mr1 and mc2 are calculated by using the density values of all the pixels composing the overlapping areas qov1 and qov2 at this time, the typical values mr1 and mc2 may cause an error by being influenced by the noise components and signal distortion as well as by the missing pixels.

Figure 33:
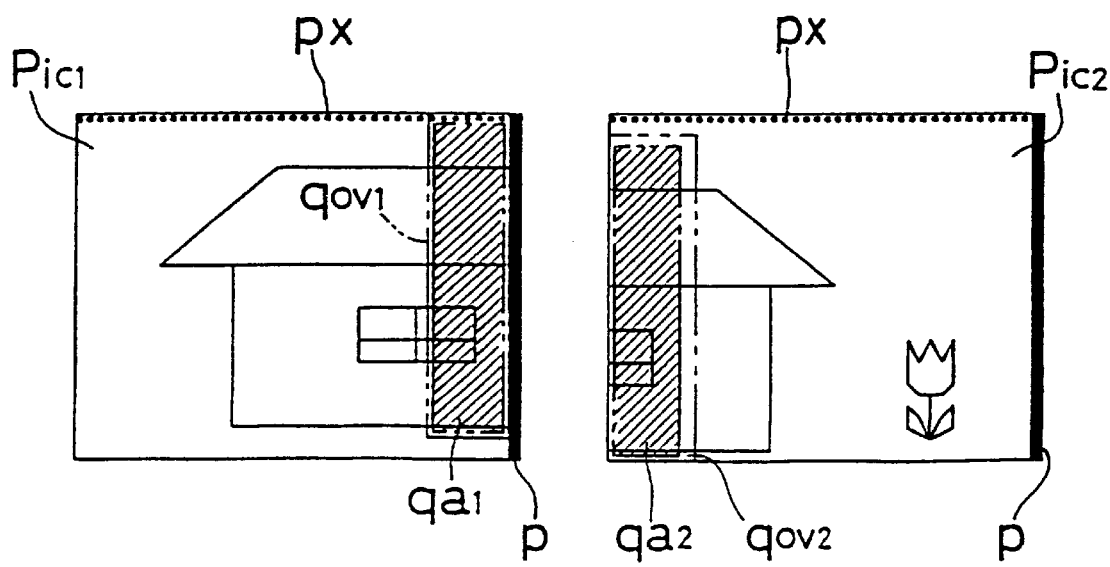
FIG. 33 is a diagram showing the pictures Pic1 and Pic2 in the input picture string.

In order to prevent it, the density value statistical section 251 sets the small areas qa1 and qa2 which are smaller than the overlapping areas qov1 and qov2 within the overlapping areas qov1 and qov2 after defining the overlapping areas qov1 and qov2 and calculates the typical values mr1 and mc2 by using density values of a plurality of pixels composing this small areas qa1 and qa2. FIG. 33 shows the hatched small areas qa1 and qa2. Because the position of the pixels px and py are uniquely determined, the density value statistical section 251 can calculate the typical values mr1 and mc2 without being influenced by the missing pixels, noise components and signal distortion by setting the small areas qa1 and qa2 so as not to contain those pixels px and py.

The density value statistical section 251 may also calculate the typical values mr1 and mc2 by using only density values of pixels whose number is less than the number of all pixels composing the overlapping areas qov1 and qov2. Because it allows the number of pixels used in the process for calculating the typical values mr1 and mc2 to be reduced, the calculation process can be simplified and hence the calculation process can be quickened. The pixels used for calculating the typical values mr1 and mc2 are selected by thinning the pixels at predefined intervals when the pixels are disposed in a matrix for example. They may be also selected by thinning rows and columns of the pixels at predefined intervals.

Furthermore, when the pictures Pic1 and Pic2 are color pictures, the density value is composed of predefined three color components. These components are a red component (R component), a green component (G component) and a blue component (B component) for example and each of those components represents a density value of red, blue and green, respectively. This combination of three colors may be a combination other than that of red, blue and green as long as it is a combination of plurality of colors which turns out to be white when mixed. Further, as those components, a Y component (brightness component) as well as an R-Y component and a B-Y component (color difference component) may be used. In this case, the density value statistical section 251 and the density value compensating section 252 independently perform the processes on each color component. It then allows density values of pixels of the pictures to be compensated by the picture compensating means 222 even when the pictures Pic1 and Pic2 are color pictures.

The process for compositing the pictures Pic1 and Pic.2 performed by the compositing means will be explained below. The compositing means composites the picture Pic1 and the compensated picture Pic2 to obtain a composite picture. In outline, this compositing process is performed by disposing the picture Pic1 and the part of the compensated picture Pic2 from which the overlapping area qov2 is removed so that the reference points of the pictures Pic1 and Pic2 are shifted by the gap of the pictures represented by the matching information, to join. As for the signal processing, the picture signal of the picture Pic1 is combined with the part of the picture signal of the picture Pic2 from which data set concerning to the pixels of the overlapping area qov2 is removed and the coordinate systems of both the picture are unified to transform the coordinate of each pixel. At this time, the pictures can be composited more smoothly by mixing the density values (pixel values) of pixels at the same coordinate in the overlapping areas qov1 and qov2 near the boarder of the overlapping areas qov1 and qov2 and by performing the gradation process for changing that rate stepwise.

When the input picture string is composed of three or more pictures, the first and second pictures Pic1 and Pic2 are composited as described above at first. Then, the composited picture is joined with the third picture by disposing the composited picture and the part of the picture Pic3 from which the overlapping area with the second picture Pic2 is removed so that the reference points of the picture Pic2 and the picture Pic3 are shifted by the gap of the pictures represented by the matching information. All of the three or more pictures can be joined by repeating the latter process one by one on and after the fourth picture.

When the plurality of pictures are composited as described above, the change of density values of pixels at the joint and surrounding part thereof of arbitrary two pictures is smooth within the composite picture, because the overall lightness of each picture to be composited is almost equal. Further, because the overall lightness of each picture is almost equal, density and color tone are equal at any part of the composite picture. Thereby, the picture processing apparatus 205 of the present embodiment allows to obtain the composite picture whose quality is better than a composite picture obtained by the prior art picture compositing apparatus.

A composite picture creating system including a picture processing apparatus of a fifth embodiment of the present invention will be explained below. An electrical structure of the composite picture creating system of the fifth embodiment is the same as that of the composite picture creating system 201 of the fourth embodiment. The functional structure of the picture processing apparatus is the same as that of the picture processing apparatus 205 except that the picture compensating means 222 is replaced with picture compensating means 271. The components, circuits and means which perform the same operations will be denoted by the same reference numerals and an explanation thereof will be omitted here.

Suppose that an input picture string is composed of two or more pictures Pic1 through Picn. n is an integer which is 2 or more. The pictures Pic1 through Picn are obtained by shooting the subject 261 while moving the shooting range 263 of the imaging apparatus 203 along an elapse of time so that the positional relationship among the imaging apparatus 203, the subject 261 and the light source 262 is almost kept as shown in FIG. 34. In the explanation below, suppose that the imaging apparatus 203 is a video imaging apparatus, each picture of the input picture string is each frame of the video and the sequence of the frames is equal with that of the pictures Pic1 through Picn. Numbers of the sequence of the pictures Pic1 through Picn are 1 through n. As shown in FIG. 35A, the same subject or the same part of the subject is imaged in a part of each of two pictures Pick-1 and Pick (k=2 through n) whose sequence numbers continue. Therefore, the pictures Pic1 through Picn overlap one after another as shown in FIG. 35B when the part of the respective pictures where the distribution of density of pixels is the same are overlapped. The part where a pair of pictures Pick and Pick-1 overlap each other will be referred to as an overlapping area.

Further, areas having the same size and imaging the same part of the subject are set in the respective overlapping areas of the pair of pictures Pick-1 and Pick. The area of the picture Pick-1 whose sequence number is smaller will be referred to as a reference area qrk-1 and the area in the picture whose sequence number is larger as a comparison area qck. For instance, in the example shown in FIG. 35A, a reference area qr1 exists in the picture Pic1, a comparison area qc2 and a reference area qr2 exist in the picture Pic2 and a comparison area qc3 exists in the picture Pic3. Among them, the same part of the subject 261 is imaged in the reference area qr1 and the comparison area qc2 and the same part of the subject 261 is imaged also in the reference area qr2 and the comparison area qc3.

Figure 36:
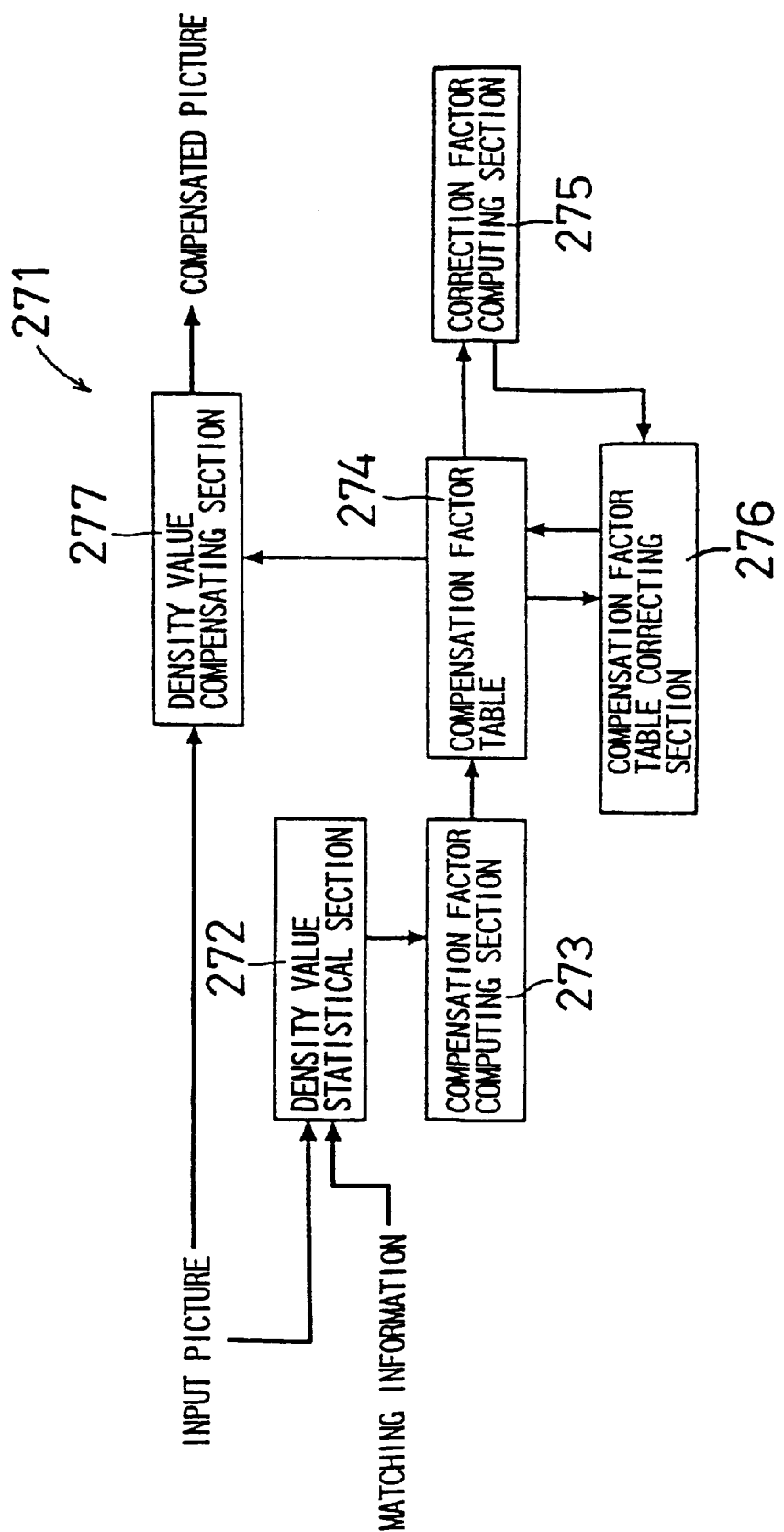
FIG. 36 is a functional block diagram for explaining a density compensating operation of picture compensating means 271.
Figure 37:
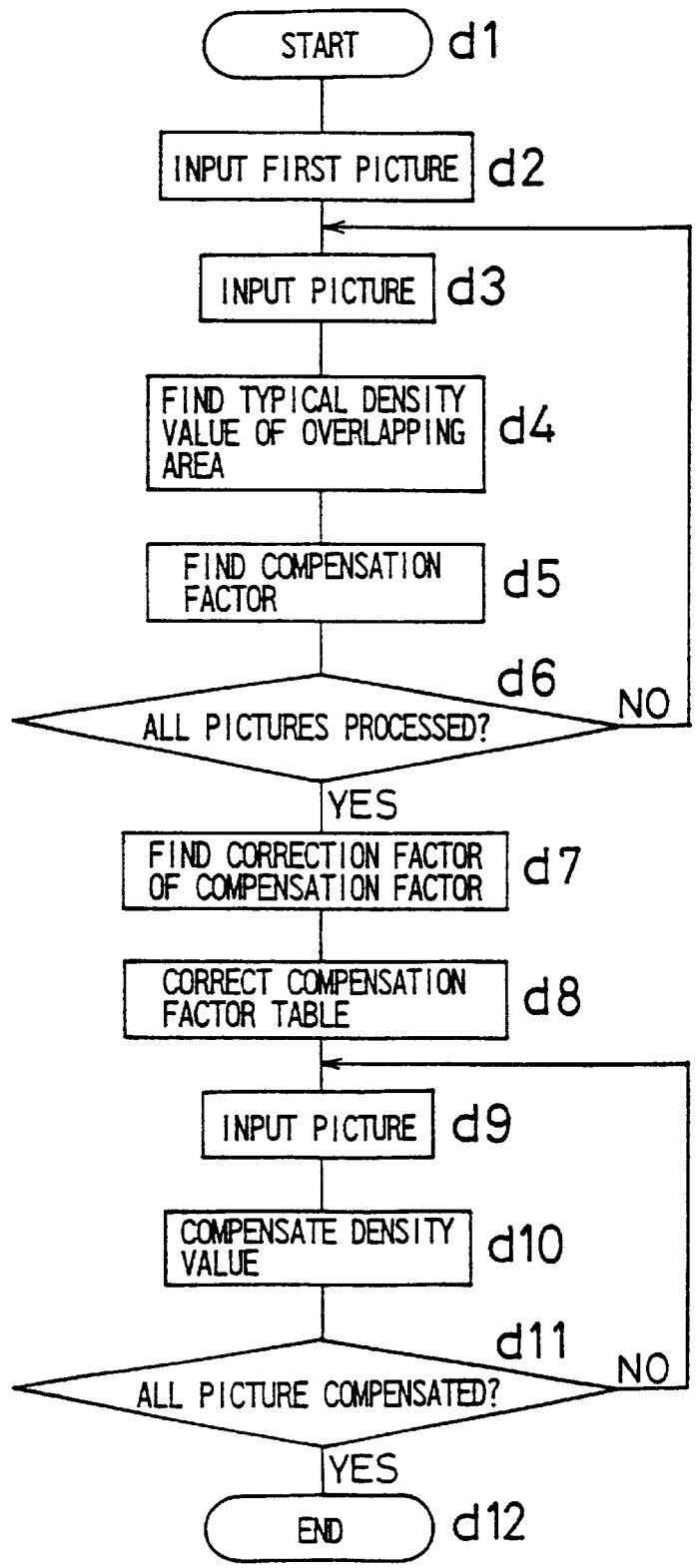
FIG. 37 is a flowchart for explaining the density compensating operation of the picture compensating means 271.

FIG. 36 is a functional block diagram for explaining a process for compensating the density value performed by the central computation processing circuit 209 when it functions as the picture compensting means 271. FIG. 37 is a flowchart for explaining the density compensating operation. This process will be explained with reference to both FIGS. 36 and 37. As premises of the density compensating operation performed by the picture compensting means 271, suppose that the plurality of pictures Pic1 through Picn are stored in the storage unit 210 and matching information of the two consecutive pictures Pick-1 and Pick (k=2 through n) is found. In this state, the process advances from step d1 to step d2.

In step d2, the central computation processing circuit 209 reads the first picture Pic1 whose number of sequence is 1 and inputs it to a picture buffer as a reference picture. The picture buffer is used to store pictures to be processed temporarily and is provided within the central computation processing circuit 209 or the storage unit 210 for example. In step d3, it reads a picture Pick whose sequence number is k and inputs it to the picture buffer as an input picture to be processed. An initial value of k is 2.

In step d4, the central computation processing circuit 209 functions as the density value statistical section 272. Based on the matching information, the density value statistical section 272 sets overlapping areas in the picture Pick input to the picture buffer in step d3 and the picture Pick-1 which has been stored in the picture buffer and whose Number of sequence is smaller by 1 than the picture Pick and sets a reference area qrk-1 and a comparison area qck in those overlapping areas. The method for setting the overlapping areas is the same as the method explained in the fourth embodiment. The areas qrk-1 and qck may be the whole area of the overlapping areas or may be areas smaller than the overlapping areas. When the both areas qrk-1 and qck are smaller than the overlapping areas, both the areas qrk-1 and qck may be considered to be the same ones as the small areas qa1 and qa2 in the fourth embodiment. In this case, it is preferable to set both the areas qrk-1 and qck so as not to contain the pixels influenced by the signal distortion and noise components and the pixels missing the density value in the pictures Pick-1 and Pick from the reason explained in the fourth embodiment.

Next, the density value statistical section 272 finds a typical value mck typifying the distribution of density values of a plurality of pixels composing the comparison area qck and a typical value mrk-1 typifying the distribution of density values of a plurality of pixels composing the reference area qrk-1. The typical values mrk-1 and mck are the same as the typical values mr1 and mc2 explained in the fourth embodiment and may be found by the same method. The typical values mrk-1 and mck are also preferable to be average values of the values of density of the pixels composing the reference area qrk-1 and the comparison area qck, respectively, from the reason explained in the fourth embodiment. Further, the typical values mrk-1 and mck may be found by using only part of pixels of all pixels composing the both areas qrk-1 and qck from the reason explained in the fourth embodiment.

In step d5, the central computation processing circuit 209 functions as the compensation factor computing section 273. Based on the typical values mrk-1 and mrk found in step d4, the compensation factor computing section 273 finds a compensation factor of the picture Pick and stores it in a compensation factor table 274. The compensation factor table 274 is provided within the storage unit 210 or the central computation processing circuit 209.

In step d6, the central computation processing circuit 209 discriminates whether or not the processes in steps d3 through d6 have been implemented on all of the pictures Pic1 through Picn in the input picture string. When a picture not processed yet is left, the central computation processing circuit 209 returns the process from step d6 to step d3 to add 1 to the sequence number k and to implement the processes from steps d3 through d5 on the picture Pick whose sequence number is k after the addition. The circuit 209 repeats the processes of step d3 through d6 until the processes of steps d3 through d5 are implemented on the pictures Pic2 through Picn. When the processes have been done to all of the pictures Pic2 through Picn, the process advances from step d6 to step d7. At this point of time, the compensation factors of the pictures Pic2 through Picn are stored respectively in the compensation factor table 74.

In step d7, the central computation processing circuit 209 functions as a correction factor computing section 275 to find a correction factor Xk of each compensation factor by referring to the compensation factors of the pictures Pic2 through Picn stored in the compensation factor table 274. In step d8, the central computation processing circuit 209 functions as a compensation factor table correcting section 276 to correct the compensation factors of the pictures Pic2 through Picn stored in the compensation factor table 274 respectively based on the correction factor Xk found by the correction factor computing section 275 and stores the corrected compensation factor again.

In step d9, the central computation processing circuit 209 reads the picture Pick whose sequence number is k and inputs to the picture buffer as an input picture to be processed. The initial value of the sequence No. k is 202. This inputting process is not necessary to be executed when pictures input to the picture buffer are stored as they are and is carried out only when a picture is erased from the picture buffer after ending the processes in Steps d4 and d5. In step d10, the central computation processing circuit 209 functions as a density value compensating section 277. The density value compensating section 277 reads the corrected compensation factor from the compenstion factor table 274 and based on the compensation factor, compensates the density values of all pixels of the picture Pick input to the picture buffer in step d9 to outputs a picture thus compensated as a compensated picture. This compensated picture is stored in the storage unit 210 for example.

In step d11, the central computation processing circuit 209 discriminates whether the compensating process of step d10 has been implemented on all of pictures Pic2 through Picn in the input picture string. When a picture not compensated yet is left, it returns the process from step d11 to step d9 to add 1 to the sequence number k and to implement the processes in steps d9 and d10 to the picture Pick whose sequence number is k after the addition. The processes from step d9 through d11 are repeated until the compensating process is implemented to the pictures Pic2 through Picn.

When the compensating process has been done to all of the pictures, the operation for compensating the density value ends in step d12. The density values of pixels in the pictures Pic2 through Picn are compensated on the basis of the picture Pic1 as the reference picture.

An operation for computing the compensation factor performed by the compensation factor computing section 273 will be explained below in detail. When it is assumed that the first picture Pic1 is the reference picture and that the first picture Pic1 overlaps with a k-th picture and the reference and comparison areas qr1 and qck can be set, the compensation factor of the picture Pick may be defined as a ratio (mck/mr1) of the typical value mck representing the distribution of density values of a plurality of pixels composing the comparison area qck of the k-th picture Pick to the typical value mr1 representing the distribution of density values of a plurality of pixels composing the reference area qr1 of the reference picture Pic1. It is difficult to calculate the above-mentioned ratio of the typical values (mck/mc1) directly, because the same part of the subject is not always imaged in two pictures whose sequence numbers are not serial, though two pictures Pick-1 and Pick whose sequence numbers are serial always overlap in the actual input picture string. Therefore, the compensation factor computing section 273 of the present embodiment finds the compensation factor of the pictures Pic2 through Picn in the same order as the sequence of the pictures by using the following method.

In finding the compensation factor of the picture Pick, the compensation factor computing section 273 finds a ratio Rmk of the typical value of the values of density of pixels of the $k^{th}$ picture Pick to the $(k-1)^{th}$ picture Pick-1 at first. The following Expression (14) is an expression for calculating the ratio Rmk of the typical values. Next, a ratio Rk of values of density of each pixel of the k-th picture Pick is found on the basis of the reference picture Pic1 based on the following Expression (15). This ratio Rk of the density values is stored in the compenstion factor table 274 as the compensation factor of the picture Pick. It then allows the compensation factor of that picture to be found regardless whether or not the picture whose compensation factor is to be calculated overlaps the reference picture. In the following expression, "Rk−1" is a ratio of density values of each pixel of the $(k-1)^{th}$ picture Pick-1 on the basis of the reference picture Pic1.

$$Rmk = \frac{mck}{mrk-1} \quad (k=2,3,\ldots,n) \tag{14}$$

$$\begin{cases} R1 = 1 \\ Rk = Rk-1 \times Rmk \quad (k=2,3,\ldots,n) \end{cases} \tag{15}$$
$$= (Rm1 \times \ldots \times Rmk-1) \times Rmk$$

Figure 38:
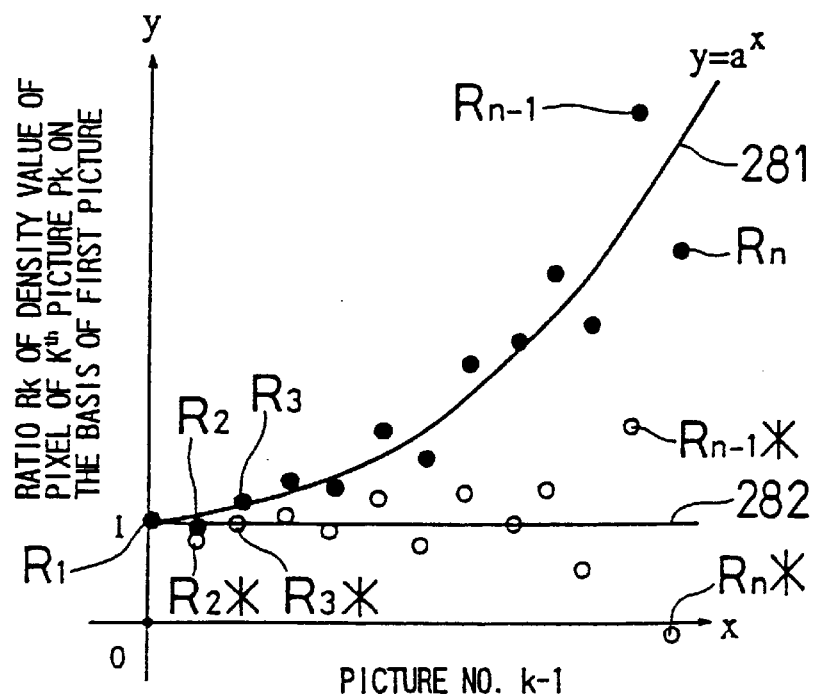
FIG. 38 is a graph showing a relationship between ratios R1 through Rn of density of each pixel of first through n-th pictures Pic1 through Picn based on a reference picture and Nos. 1 through n of order of the arranged pictures.

FIG. 38 is a graph showing a relationship among the ratios R2 through Rn of density values of pixels of the pictures Pic2 through Picn based on the reference picture, i.e. the first picture, and the sequence numbers 2 through n of the pictures. The vertical axis represents the ratios of density values and the horizontal axis represents numbers obtained by subtracting 1 from the sequence numbers. Black dots are what the ratios R2 through Rn of respective density values are plotted with respect to numbers obtained by subtracting 1 from the sequence numbers 2 through n. A black dot R1 on the vertical axis represents the ratio of density value of a pixel of the reference picture on the basis of the reference picture and is actually 1. In the graph, the black dots are distributed on and in the vicinity of a curve 281. The curve 281 is defined by an expression of exponential function ($y=a^x$), where the number obtained by subtracting 1 from the sequence of picture, which is k−1, is an exponent x. That is, the distribution of the ratios R2 through Rn of density values is close to that of the exponential function. The ratios R2 through Rn of density values are distributed as described above by the following reason.

Figure 39:
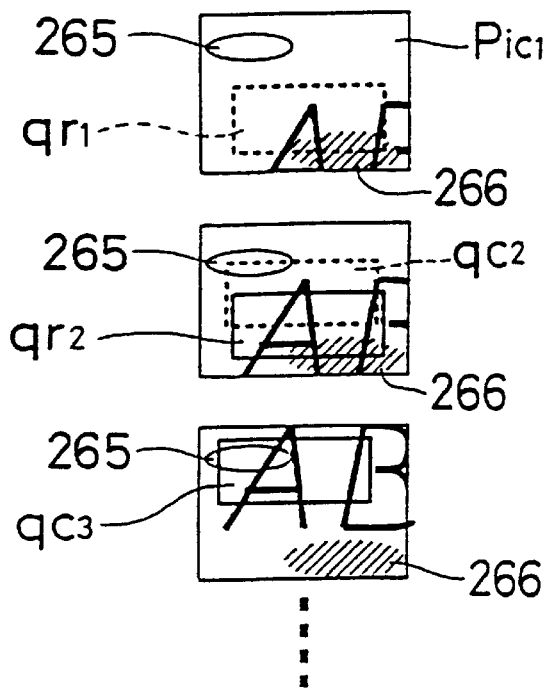
FIG. 39 is a diagram showing the pictures Pic1 through Pic3 in the input picture string for explaining effects of reflection and shadow of the subject.

As shown in FIG. 39, a reflection 265 and a shadow 266 on the surface of the subject 261 may be imaged on the pictures Pic1 through Picn. When the positional relationship among the imaging apparatus 203, the subject 261 and the light source 262 has barely changed in shooting the pictures Pic1 through Picn, the positions of the reflection 265 and the shadow 266 imaged within each of the pictures Pic1 through Picn barely change, so that the reflection 265 may enter one of the reference area qrk-1 and not enter the comparison area qck and the shadow 266 may enter one and not enter the other. Further, the density value of pixels at the peripheral portion of each of the pictures Pick-1 and Pick may drop more than its original density value due to shading of a lens of the imaging apparatus 203 and to shading of the image pickup device. In this case, the positions of the reference area qrk-1 and the comparison area qck to the reference points of the pictures Pick-1 and pick are different, one of them may be located at the peripheral portion of the picture and the other around the center of the picture.

When it is assumed that the overall lightness is equal in the respective pictures Pic1 and Pic2, the typical values mrk-1 and mck may differ by around 1 to 9%, when the pictures are influenced by the reflection, shadow and shading as described above. An error in estimation er is contained in the ratio Rmk of the typical values of density value of pixels of the $k^{th}$ picture Pick to the $(k-1)^{th}$ picture Pick-1 due to the difference between the typical values mrk-1 and mck. When the error in estimation er is greater than −1 and less than 1, it means that the overall lightness of the picture Pick is judged to be lighter or darker than the picture Pick-1 by a rate "1+er" in average even though the overall lightness of the picture Pick-1 and of the picture Pick are equal.

$$-1 < er < 1 \tag{16}$$

As described above, the compensation factor of the $k^{th}$ picture Pick is a product of ratios Rm1 through Rmk of the typical values. Accordingly, when the rate a of the error in estimation contained in the ratio Rmk of the typical values is assumed as shown in the following expression (17), the larger the sequence number of the picture Pick, the more the rate a, the influence of the error in estimation to the compensation factor, increases geometrically. Therefore, the distribution of the ratios Rk of density values to the sequence number k is close to an exponential function as shown in FIG. 38. It means that the overall lightness of the picture Pick is judged to be lighter or darker than the picture Pic1 by a rate $(1+er)^{k-1}$ even though the overall lightness of the picture Pic1 is equal to that of the picture Pick.

$$a = 1+er \tag{17}$$

Therefore, when the density value of a pixel of the picture is compensated by using the compensation factor as it is, the larger the sequence number of the pictures, the more the influence of the reflection, shadow and shading increases exponentially. For instance, when the rate a is larger than 1, each picture of the input picture string is compensated to be dark gradually as the sequence number increases, because the pictures having larger sequence numbers are judged erroneously to be lighter than the reference picture. When the rate a is less than 1 in contrary, each picture of the input picture string is compensated to be light gradually as the sequence number increases because the pictures having larger sequence numbers are judged erroneously to be darker than the reference picture. The more a number of pictures of the input picture string, the greater the influence of the error in estimation becomes, because the greater the sequence number of the picture, the greater the error of this compensation becomes. Then, according to the picture processing apparatus of the present embodiment, the compensation factor is compensated by the correction factor.

An operation for computing the correction factor performed by the correction factor computing section 275 will be explained below in detail. The correction factor computing section 275 reads the compensation factors of the pictures Pic2 through Picn stored in the compenstion factor table 274 at first and then based on these compensation factors, finds an approximate expression showing a relationship between the compensation factors and the sequence numbers of the pictures. This approximate expression is an exponential function, a monotonic increasing function or a monotonic decreasing function for example. When the compensation factor is the ratio Rk of the density values of the $k^{th}$ picture Pick on the basis of the reference picture, it is preferable most to approximate the above-mentioned relationship by the exponential function because the ratio Rk of the density values increases/decreases geometrically as described above. The case when it is preferable to approximate the ratio Rk of the density values by the exponential function is the case where the positional relationship among the imaging apparatus 203, the subject 261 and the light source 262 is almost equal during shooting and the position of the pixels influenced by the reflection, shadow and shading within the two pictures Pick-1 and Pick whose sequence Nos. continue is almost equal for example. The following explanation will be made by exemplifying the case of approximating the above-mentioned relationship by exponential function.

It is assumed that the approximate expression is an exponential function as shown in the following Expression (18), where the ratio Rk of the density value is a variable y, the rate a of the error in estimation of the ratio Rmk of the typical values is the base and a number obtained by subtracting 1 from the sequence number k is a variable x, i.e. an exponent. Then, when logarithms of both sides of Expression (18) are taken as shown in Expression (19) and log y is replaced by a variable Y, log a by a constant A and a variable x by a variable X, the expression turns out to be a linear expression as shown in Expression (20). From this fact, the correction factor computing section 275 takes logarithms of the ratios R2 through Rn stored in the compensation factor table, respectively, and finds the constant A in Expression (20) by using those logarithms and the value obtained by subtracting 1 from the sequence number k. For the computation of this time, the method of least square is used by substituting the logarithms into the variable y and by substituting the value obtained by subtracting 1 from the sequence No. k into the variable X. Further, the rate a is found by substituting the found constant A into Expression (21). "e" is a base of a natural logarithm.

$$y+a^x \tag{18}$$

$$\log y = x \log a \tag{19}$$

$$Y=AX \tag{20}$$

$$a=e^A \tag{21}$$

It is considered that the error in estimation caused by the influence of the reflection, shadow and shading is contained in the compensation factor before compensated with the rate of a per picture. Therefore, errors in estimation of the power of k−1 of the rate a are contained in the ratio Rk which is the compensation factor of the $k^{th}$ picture. Accordingly, the correction factor Xk of the compensation factor of the $k^{th}$ picture Pick is defined by the following expression:

$$Xk=a^{k-1} \tag{22}$$

An operation for correcting the compensation factor performed by the compensation factor table correcting section 276 will be explained below. The compensation factor table correcting section 276 corrects the ratios R2 through Rn of density values stored in the compensation factor in the compenstion factor table 274 respectively by using the rate a found by the correction factor computing section 275 based on the following expression and stores corrected compensation factors R2* through Rn* again in the compenstion factor table 274:

$$Rk^* = \frac{Rk}{a^{k-1}} = \frac{Rk}{Xk} \quad (k=2, 3, \ldots, n) \tag{23}$$

White circles in FIG. 38 are what the corrected compensation factors R2* through Rn* are plotted. It can be seen from the graph that the corrected compensation factors R2* through Rn* are distributed in the vicinity of a straight line 282 which passes through a point on the vertical axis where the ratio of density value is 1 and which is parallel to the horizontal axis. A distance between the respective white circles in the direction parallel to the vertical axis corresponds to a difference of overall lightness of the pictures Pick-1 and Pick from which the influence of the reflection and shadow as well as the shading is removed. This difference is produced because the AGC circuit is operated and by flicker caused by the difference between a cycle of light and darkness of a fluorescent lamp and a storage time and a cycle of photoelectric transformation of the image pickup device for example. Therefore, the values of density of the pixels of the pictures Pick-1 and Pick are compensated so that the distance between the white circles and the straight line 282 is zeroed.

The process for compensating the density values of the pictures performed by the density value compensating section 277 will be explained below in detail. At first, the density value compensating section 277 reads the corrected compensation factor Rk* of the picture Pick to be compensated from the compenstion factor table 274 and compensates the density value of each pixel of the picture Pick by the compensation factor Rk*. In concrete, because the ratio of density values of each pixel of the $k^{th}$ picture Pick and the reference pixel Pic1 is considered to be the compensated compensation factor Rk*, the overall lightness of the $k^{th}$ picture Pick may be adjusted to the overall lightness of the reference picture Pic1 by dividing the density value of each pixel of the $k^{th}$ picture Pick by the compensated compensation factor Rk*, respectively. Expression 24 is an expression for compensating the density value of a certain pixel within the $k^{th}$ picture Pick. In Expression 24, p denotes the density value of the certain pixel of the picture Pick to be compensated before the compensation, p* denotes a density value of the certain pixel of the compensated picture and pmax is a maximum value which the density value can take. Normally, because the density value can take only a finite integer, e.g. a value which is 0 or more and 255 or less, it is preferable to round a fraction of less than a decimal point to a natural number when the quotient contains it. Further, because the density value p* of the compensated picture is preferable to saturate with the maximum value pmax, the quotient is replaced by the maximum value pmax when the quotient is greater than the maximum value pmax.

$$p^* \begin{cases} = \dfrac{1}{Rk^*} \times p & \left(\dfrac{1}{Rk^*} \times p < pmax\right) \\ = pmax & \left(\dfrac{1}{Rk^*} \times p \geq pmax\right) \end{cases} \quad (24)$$

The quotient thus found is assumed to be the density value after compensated, the density value of each pixel of the picture signal of the $k^{th}$ picture Pick before compensated is replaced with density value after compensated. Thereby, the picture Pick whose density value has been compensated, i.e. the picture signal of the compensated picture, can be obtained.

The above-mentioned compensation can be carried out by the density value compensating section 277 also by omitting the compenstion factor table 274 and the compensation factor table correcting section 276 and by dividing the density value of each pixel of the picture Pick by an inverse number of the correction factor Xk and the compensation factor one by one after the compensation factor and the correction factorare found. In this case, the amount of calculation of the compensating process can be reduced because the number of numerical values of the expression for compensating the density value decreases by finding the corrected compensation factors R2* through Rn* before the density compensating process and by storing them in the compenstion factor table 274 as described above. Accordingly, the compensating process can be simplified and the burden of the density value compensating section 277 can be reduced.

When the pictures Pic1 through Picn are color pictures, the density value is composed of predefined three color components. These components are the same as those explained in the fourth embodiment. In this case, the density value statistical section 272, the compensation factor computing section 273, the correction factor computing section 275, the compensation factor table correcting section 276 and the density value compensating section 277 perform the respective processes independently to each component and the compenstion factor table 274 stores the compensation factor of picture per component. Thereby, the picture compensting means 271 can compensates the density value of each pixel of the pictures even when the pictures Pic1 through Picn are color pictures.

While each picture of the input picture string has been assumed to be each of a plurality of consecutive frames of a motion picture filmed by the video imaging apparatus in the explanation described above, frames overlapping each other may be thinned out of the motion picture to use them as the input picture string.

Figure 40:
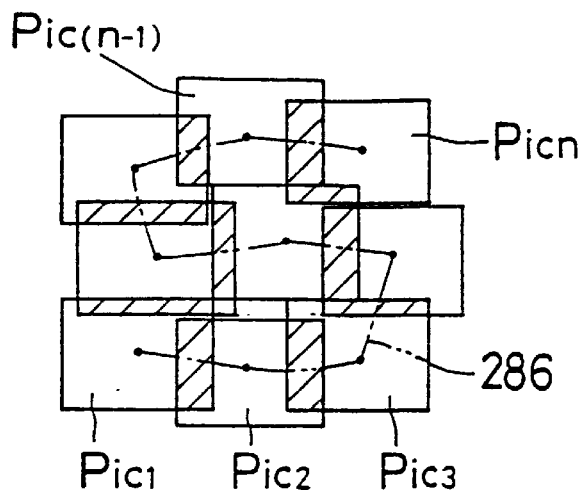
FIG. 40 is a diagram for explaining a positional relationship of the input picture string.

Further, as for the pictures of the input picture string of the picture processing apparatus of the fifth embodiment, each picture of the input picture string may have any kind of positional relationship each other as long as the overlapping areas can be set in the two pictures Pick-1 and Pick whose sequence numbers are serial when they are arranged by overlapping the mutually overlapping parts. For instance, an imaginary line 286 connecting the center points of the respective pictures Pic1 through Picn may meander as shown in FIG. 40. Further, as for the sequence of the pictures, it may be any kind of order regardless the picture shooting order as long as the overlapping areas may be set in the two pictures Pick-1 and Pick whose sequence continues. Still more, the reference picture may be a picture other than the first picture Pic1. In this case, the calculation of the approximate expression may be conducted by the above-mentioned method by adjusting the horizontal axis of the graph in FIG. 38 so that the ratio R1 of the density value of each pixel of the reference picture to the reference picture comes on the vertical axis. Further, the pictures Pic1 through Picn may be pictures created by any creating method as long as the overlapping areas can be set as described above and may be still pictures, beside the frames of the motion picture, taken by a digital still imaging apparatus, a scanner and the like.

The compositing means 223 composites the plurality of pictures Pic1 and Pic2 whose density values have been thus compensated to obtain one composite picture. Because the overall lightness of the reference picture Pic1 is almost equal to that of the compensated pictures Pic2 through Picn at this time, the change of density of pixels at the joint and surround part thereof of the respective pictures Pick-1 and Pick becomes smooth. Further, because the overall lightness of the pictures Pick-1 and Pick are almost equal, density and color tone of the composite picture become equal at any part. When the AGC circuit of the imaging apparatus 203 operates during shooting or the picture has an influence of flicker caused by a fluorescent lamp in particular, the overall lightness of the whole composite picture may be equalized. Thus, the picture compensating means 271 of the present embodiment allows the composite picture whose quality is better than that of the composite picture obtained by the prior art picture compositing apparatus to be obtained.

Further, in the fourth and fifth embodiments, it is preferable to correct the density value by either one of the following first and second procedures when the plurality of pictures Pic1 through Picn to be processed are arrayed in a matrix when they are disposed so that the overlapping areas overlap each other. According to the first procedure, the plurality of pictures to be processed are divided into a group of pictures composing separate rows or columns and the pictures of each group are set as an input picture string to composite by compensating the density values by the above-mentioned picture processing operation. Then, the composited pictures of each group are set as pictures of the input picture string anew to composite by compensating the density values by the above-mentioned picture processing operation.

Figure 41A:
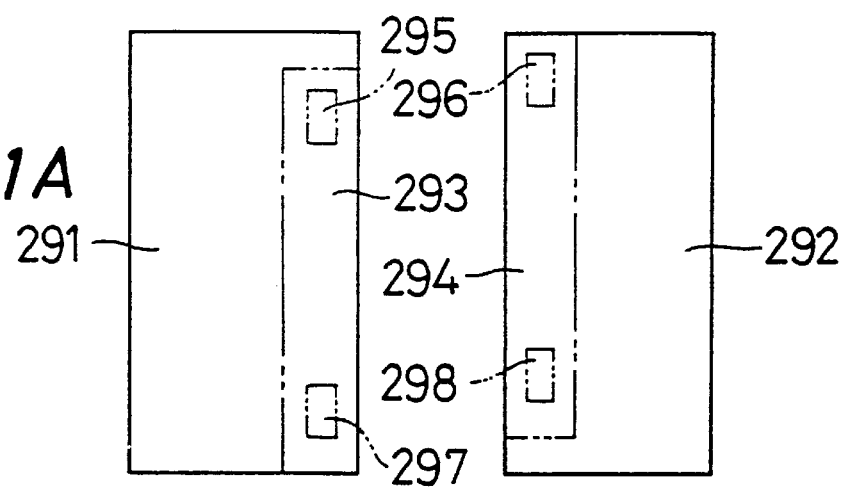
FIGS. 41A and 41B are diagrams for explaining a density compensating technique aiming at a plurality of pictures Pic1 through Picn arranged in a matrix as pictures to be processed.

According to the second procedure, a plurality of pictures to be processed are divided into a group of pictures composing separate rows or columns and the pictures of each group are set as an input picture string to composite by compensating the density values by the above-mentioned picture processing operation. Then, the composited pictures 291 and 292 of each group are set as pictures of a new input picture string to find overlapping areas 293 and 294 of those pictures 291 and 292 and to set two sets of internal areas imaging the same part of the subject within the overlapping areas 293 and 294 as shown in FIG. 41A. One set of the internal areas 295 and 296 and the other set of internal areas 297 and 298 are disposed in the longitudinal direction of the pictures 291 and 292, i.e. at both ends in the direction in which the original pictures are put side by side when the pictures 291 and 292 are composited. Then, a compensation factor is found per set by setting the internal areas 295 and 297 of each set as the reference areas and the internal areas 296 and 298 as the comparison areas.

Figure 41B:
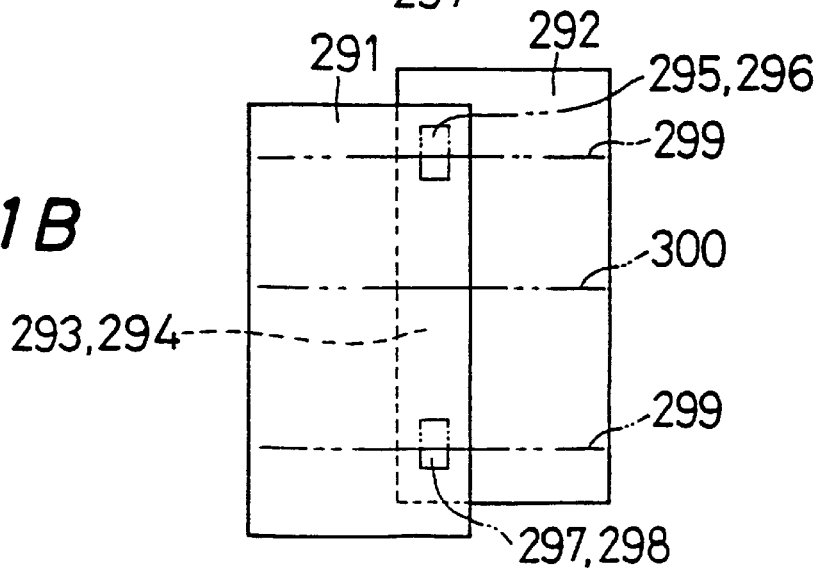

Finally, as shown in FIG. 41B, the density values of pixels are compensated in unit of the column or row so that the density values of pixels composing the same column or the same row coincide when the pictures 291 and 292 are disposed so that the overlapping areas overlap. At this time, what has been calculated by using the internal areas 295 and 296 and 297 and 298 is used as the compensation factor of the column or row 299 which passes through the internal areas 295 and 296 and 297 and 298 and the compensation factor calculated by using the internal areas 295 and 296 and 297 and 298 and interpolated corresponding to a distance between the columns or rows 299 and 300 is used as the compensation factor of the column or the row 300 between the lines 299. The use of either of these two procedure allows the overall lightness of the plurality of pictures disposed in a matrix to coincide.

A composite picture creating system including a picture processing apparatus of a sixth embodiment of the invention will be explained below. An electrical structure of the composite picture creating system of the sixth embodiment is the same as the composite picture creating system of the fourth embodiment. The same components or circuits performing the same operations in the both embodiments will be denoted by the same reference numerals and an explanation thereof will be omitted here.

Figure 42:
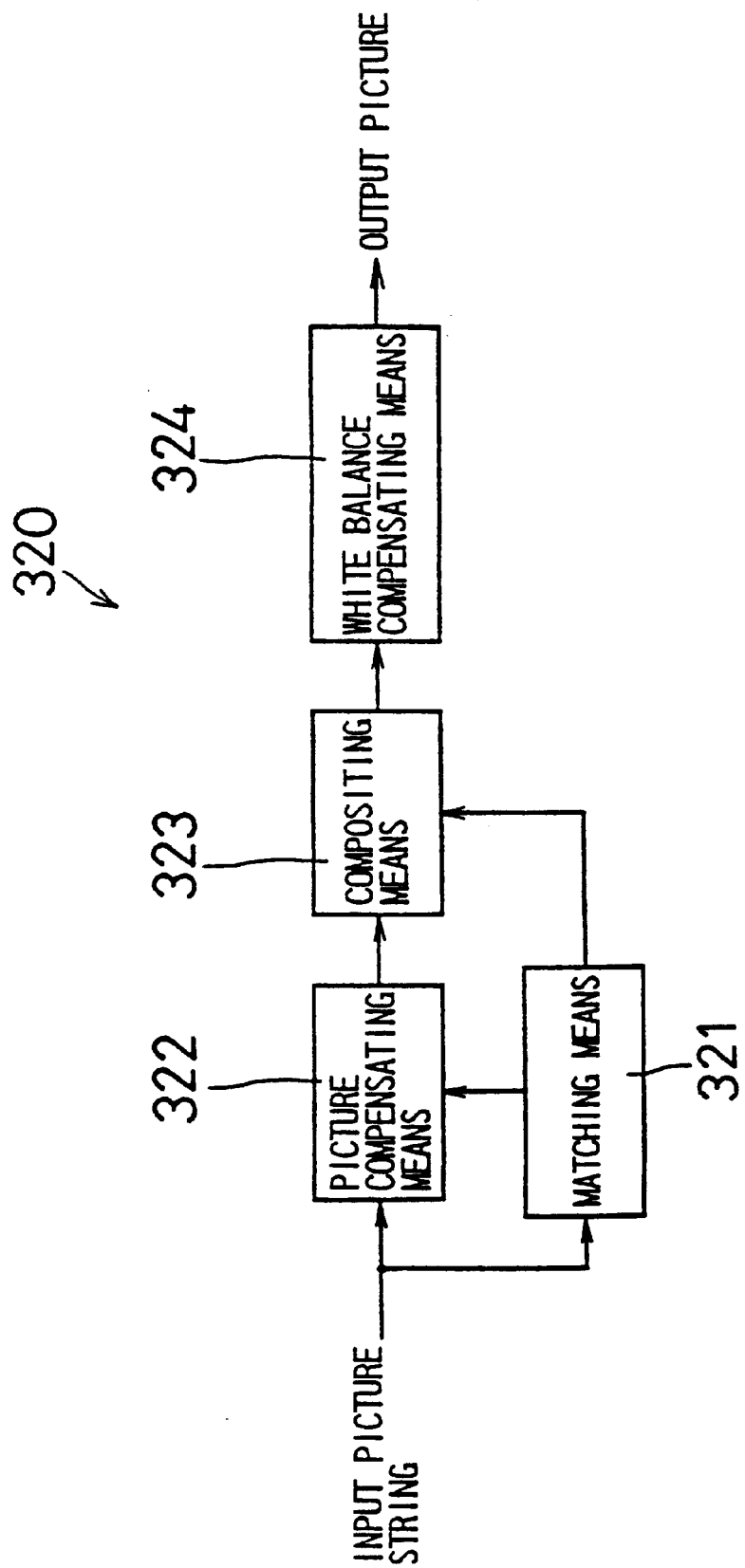
FIG. 42 is a functional block diagram for explaining a picture processing operation of a picture processing apparatus 320 according to a sixth embodiment of the invention.

FIG. 42 is a functional block diagram for explaining a picture processing operation of the picture processing apparatus 320. When the central computation processing circuit 209 executes the operation program, the central computation processing circuit 209 functions as matching means 321 at first to find matching information representing a mutual correspondence of respective pictures of an input picture string based on the input picture string. Next, the central computation processing circuit 209 functions as picture compensating means 322 to adjust an overall lightness of each picture by implementing the density compensating process to each picture of the input picture string by referring to the matching information of each picture. Next, the central computation processing circuit 209 functions as compositing means 323 to create a composite picture by compositing a plurality of pictures whose density has been compensated by referring to the matching information. Finally, the central computation processing circuit 209 functions as white balance compensating means 324 to perform white balance compensation to the composite picture. The composite picture whose white balance has been compensated is stored in the storage unit 210 as an output picture. The detailed operation of the matching means 321, the picture compensating means 322 and the compositing means 323 are the same as the matching means 221, the picture compensating means 222 and 271 and the compositing means 223 in the fourth and fifth embodiments.

The method for compensating the white balance of the composite picture performed by the white balance compensating means 324 will be explained below. The white balance compensating means 324 performs the white balance compensation by using a so-called video signal detecting method based on the picture signal representing the composite picture. According to the video signal detecting method, the compensation is performed by utilizing that when a sum of colors of all pixels of one picture is found, the sum turns out to be white. For instance, a white part detecting method which is one example of the video signal detecting method will be explained below.

According to the white part detecting method, a color difference component of pixels of a white color or a color close to that is extracted from a Y signal (brightness signal) as well as an R–Y signal and a B–Y signal (color difference signal) composing the picture signal and the picture is compensated so that an average value of the extracted color difference components is zeroed. In concrete, the density value of each pixel of the composite picture is replaced in a coordinate of a two-dimensional coordinate system whose vertical axis represents a quotient "(B–Y)/Y" obtained by dividing the B–Y signal by the Y signal and whose horizontal axis represents a quotient "(R–Y)/Y" obtained by dividing the R–Y signal by the Y signal and then pixels whose coordinate after the replacement is contained in a color temperature area of white color are extracted. The color temperature area of white color is an area containing a color temperature locus of white color and is expressed by Expressions (25) through (28). $\alpha$, $\beta$, $\gamma$, and $\delta$ are predefined constants, respectively, and are all positive values. In the following expressions, "2Y–R–B" is a sum of the R–Y signal and the B–Y signal.

$$-(R-Y) < \alpha Y \qquad (25)$$

$$-(B-Y) < \beta Y \qquad (26)$$

$$2Y-R-B < \gamma Y \qquad (27)$$

$$-(2Y-R-B) < \delta Y \qquad (28)$$

Concretely, the pixels contained in the color temperature area of white color can be extracted by comparing the R–Y signal, the B–Y signal and the 2Y–R–B signal as well as inverted signals of those signals with the signals in which the value of the Y signal has been changed. Further, an average value of the color difference signal of the extracted pixels is found and a compensating signal for compensating the color difference signals of those pixels so that the average value becomes the origin of the above-mentioned coordinate system. Finally, all of the pixels composing the composite picture are compensated by this compensating signal. Thereby, the color of the pixels of the composite picture can be compensated accurately.

The white balance compensating means 324 also aims at processing the composite picture. Because a range in which the subject and part of the subject imaged in the composite picture exist is wider than a range in which the subject and the part of the subject imaged in each of the pictures Pic1 through Picn of the input picture string exist, no color of the pixels composing the composite picture is biased in many cases even when the color of the pixels composing each of the pictures Pic1 through Picn is biased. Accordingly, when the white balance compensation using the video signal detecting method is performed, color may be compensated more accurately by processing the composite picture rather than the pictures Pic1 through Picn. Further, the same effect can be obtained even when the density compensating process of the picture compensating means 322 is replaced with the prior art density compensating process because the white balance compensating means 324 performs the white balance compensation to the composited picture.

The compositing means 223 can be omitted in the picture processing apparatus 205 of the fourth embodiment. In this case, the picture processing apparatus 205 is used to adjust the overall lightness of a plurality of pictures for comparison and can compensate the overall lightness of the pictures Pic1 through Picn reliably so that the overall lightness of the plurality of pictures Pic1 through Picn is equalized by the simple process. The compositing means 223 can be also omitted in the picture processing apparatus 271 of the fifth embodiment by the same purpose. In this case, the overall lightness of a large number of pictures can be reliably compensated and can be almost equalized even when the pictures are influenced by the reflection and the shadow as well as the shading.

The picture processing apparatuses 205, 271 and 320 of the fourth through sixth embodiments are examples of the picture processing apparatus of the invention and may be realized in other various ways as long as their main operation is the same. The detailed operation of each means in particular may be realized by another operation as long as the same processing result can be obtained. Further, the picture processing apparatus 205, 271 and 320 may be constructed such that the operation of each means and each circuit is executed by a dedicated individual circuit. Still more, the picture processing apparatus 205, 271 and 320 may be realized by storing a software for causing the CPU to perform the above-mentioned picture processing operations in a computer readable storage medium and by installing the software in this storage medium into the computer. As this storage medium, a CD-ROM, a magneto-optic disk and a floppy disk can be cited.

Still more, a picture processing apparatus for compositing a plurality of pictures may be constructed by adequately combining the components each composing the picture compositing apparatus in the first through third embodiments and the composite picture creating system of the fourth through sixth embodiments. For instance, such picture processing apparatus compensates overall lightness of a pair of pictures to be composited by the methods explained in the fourth and fifth embodiments, detects the mismatch and distortion of the images of the pair of pictures by the methods explained in the first through third embodiments, composites the compensated pair of pictures by superimposing based on the detected mismatch of the images while deforming them based on the detected distortion of the images and implements the white balance compensation to one composited picture as explained in the sixth embodiment. As a result, the picture processing apparatus can composite the plurality of pictures readily and smoothly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A picture processing apparatus comprising:
    overlapping area deciding means for finding overlapping areas where two pictures composed of a plurality of pixels overlap each other;
    density value statistic means for finding typical values typifying a distribution of density values of the pixels in the overlapping area of each picture; and
    density value compensating means for multiplying the density value of each pixel of one picture by a ratio of the typical value of the other picture to the typical value of one picture.

2. The picture processing apparatus of claim 1, wherein each typical value is an average value of the density values of the pixels in the overlapping area of each picture.

3. The picture processing apparatus of claim 1, wherein the overlapping area deciding means finds a mismatch of origins of coordinate systems of the respective pictures when parts having the same distribution of the density values within the two pictures are overlapped with each other and regards all areas that overlap when the two pictures are overlapped with each other by shifting the origins of the coordinate systems by the found mismatch, as overlapping areas, and the density value statistic means finds typical values of density values of pixels in areas further inside of the overlapping areas.

4. The picture processing apparatus of claim 1, wherein the density value statistic means finds the typical value of the density values of pixels a number of which is smaller than that of all pixels in the overlapping area.

5. The picture processing apparatus of claim 1, wherein the density value is composed of predefined three color components, and the density value statistic means and the density value compensating means perform processing for each component of the density value.

6. A picture processing apparatus comprising:
    overlapping area deciding means for finding overlapping areas in successive pairs of pictures where said successive pairs are selected from among a plurality of pictures each composed of a plurality of pixels and with one picture in each pair being a reference picture and the other being a search picture;
    density value statistic means for finding typical values typifying a distribution of density values of pixels in the overlapping areas of said successive pairs of pictures;
    compensation factor computing means for finding ratios of a density value of each pixel in each search picture in each of said pair of pictures from among the plurality of pictures in which one of said reference and search pictures out of the plurality of pictures is set to be standard, based on a ratio of the typical values of said each pair of pictures;
    correction factor computing means for finding correction factors of each said ratio based on the distribution of a plurality of said ratios; and
    density value compensating means for compensating the density value of each pixel for each said search picture, based on the ratio of each said search picture and each said correction factor.

7. The picture processing apparatus of claim 6, the picture processing apparatus further comprising:
    a table for storing the plurality of ratios; and
    correcting means for correcting each ratio stored in the table based on the each correction factor,
    wherein the density value compensating means compensates the density value of each pixel based on the corrected ratio stored in the table for each picture.

8. The picture processing apparatus of claim 6, wherein the correction factor computing means approximates a relationship between an arrangement order of the pictures when arranged by sequentially overlapping the overlapping areas and a ratio of each picture, by a predefined approximate expression, and defines each correction factor based on a constant of the approximate expression and the arrangement order.

9. The picture processing apparatus of claim 8, wherein the approximate expression is an exponential function ($y=a^x$) and the constant is a base a of the exponential function.

10. The picture processing apparatus of claim 6, wherein the density value is composed of predefined three color components, and the density value statistic means, the compensation factor computing means, the correction factor computing means and the density value compensating means perform processing for each component of the density value.

11. The picture processing apparatus of claim 6, the picture processing apparatus further comprising compositing means for compositing the pictures in which the density value of each pixel is compensated, by sequentially overlapping the overlapping areas.

12. The picture processing apparatus of claim 11, the picture processing apparatus further comprising white balance compensating means for compensating white balance of the composited picture.

13. A picture processing apparatus comprising:

overlapping area deciding means for finding overlapping areas in successive pairs of pictures where said successive pairs are selected from among a plurality of pictures each composed of a plurality of pixels and with one picture in each pair being a reference picture and the other being a search picture;

density value statistic means for finding typical values typifying a distribution of density values of pixels in the overlapping areas of said successive pairs of pictures;

compensation factor computing means for finding ratios of a density value of each pixel in each search picture in each of said pair of pictures from among the plurality of pictures in which one of said reference and search pictures out of the plurality of pictures is set to be standard, based on a ratio of the typical values of said each pair of pictures;

correction factor computing means for finding correction factors of each said ratio based on the distribution of a plurality of said ratios wherein the correction factor computing means approximates a relationship between an arrangement order of the pictures when arranged by sequentially overlapping the overlapping areas and a ratio of each picture, by a predefined approximate expression, and defines each correction factor based on a constant of the approximate expression and the arrangement order, and wherein the approximate expression is an exponential function ($y=a^x$) and the constant is a base a of the exponential function; and density value compensating means for compensating the density value of each pixel for each said search picture, based on the ratio of each said search picture and each said correction factor.

14. The picture processing apparatus of claim 13, wherein each typical value is an average value of the density values of the pixels in the overlapping area of each picture.

15. The picture processing apparatus of claim 13, wherein the overlapping area deciding means finds a mismatch of origins of coordinate systems of the respective pictures when parts having the same distribution of the density values within the two pictures are overlapped with each other and regards all areas that overlap when the two pictures are overlapped with each other by shifting the origins of the coordinate systems by the found mismatch, as overlapping areas, and the density value statistic means finds typical values of density values of pixels in areas further inside of the overlapping areas.

16. The picture processing apparatus of claim 13, wherein the density value statistic means finds the typical value of the density values of pixels a number of which is smaller than that of all pixels in the overlapping area.

* * * * *

UNITED STATES PATENT AND TRADEMARK OFFICE
CERTIFICATE OF CORRECTION

PATENT NO. : 6,215,914 B1
DATED : April 10, 2001
INVENTOR(S) : Kazuyuki Nako and Mituaki Nakamura It is certified that error appears in the above-identified patent and that said Letters Patent is hereby corrected as shown below:

<u>Title page,</u>
Item [75] Inventors, delete the following inventors:

Yasuhisa Nakamura
    Yoshihiro Kitamura
    Hiroshi Akagi
    Masashi Hirosawa

Signed and Sealed this

Sixth Day of November, 2001

*Attest:*

*Nicholas P. Godici*

*Attesting Officer*

NICHOLAS P. GODICI
*Acting Director of the United States Patent and Trademark Office*